(12) United States Patent
Peters

(10) Patent No.: US 12,505,434 B2
(45) Date of Patent: Dec. 23, 2025

(54) REVOCATION OF CRYPTOGRAPHIC KEYS BY WAY OF A BLOCKCHAIN-BASED BANKNOTE

(71) Applicant: Bundesdruckerei GmbH, Berlin (DE)

(72) Inventor: Florian Peters, Berlin (DE)

(73) Assignee: Bundesdruckerei GmbH, Berlin (DE)

( * ) Notice: Subject to any disclaimer, the term of this patent is extended or adjusted under 35 U.S.C. 154(b) by 40 days.

(21) Appl. No.: 18/578,971

(22) PCT Filed: Jul. 6, 2022

(86) PCT No.: PCT/EP2022/068722
§ 371 (c)(1),
(2) Date: Jan. 12, 2024

(87) PCT Pub. No.: WO2023/285232
PCT Pub. Date: Jan. 19, 2023

(65) Prior Publication Data
US 2024/0386422 A1 Nov. 21, 2024

(30) Foreign Application Priority Data
Jul. 13, 2021 (DE) ...................... 10 2021 118 104.6

(51) Int. Cl.
| | | |
|---|---|---|
| G06Q 20/00 | (2012.01) | |
| G06Q 20/38 | (2012.01) | |
| G06Q 20/40 | (2012.01) | |
| H04L 9/00 | (2022.01) | |
| H04L 9/08 | (2006.01) | |
| H04L 9/30 | (2006.01) | |

(52) U.S. Cl.
CPC ....... *G06Q 20/3829* (2013.01); *G06Q 20/401* (2013.01); *H04L 9/0825* (2013.01); *H04L 9/3073* (2013.01); *H04L 9/50* (2022.05)

(58) Field of Classification Search
None
See application file for complete search history.

(56) References Cited

U.S. PATENT DOCUMENTS

| | | | | |
|---|---|---|---|---|
| 7,366,677 | B1 * | 4/2008 | Liu | G06Q 10/02 |
| | | | | 709/204 |
| 11,544,731 | B2 * | 1/2023 | Arora | G06Q 30/0225 |
| 2005/0145696 | A1 * | 7/2005 | Ichihara | G07D 11/22 |
| | | | | 235/440 |

(Continued)

OTHER PUBLICATIONS

Anderson; On_the_reliability_of_electronic_payment_systems; IEEE; pp. 294-301; 1996.*

(Continued)

*Primary Examiner* — Radu Andrei
(74) *Attorney, Agent, or Firm* — Harness, Dickey & Pierce, P.L.C.

(57) ABSTRACT

In one embodiment, the method sending a revocation request to the banknote, in response to the revocation request, receiving a cryptogram signed by the banknote, wherein the first cryptogram includes an identification number of the banknote and a revocation confirmation, and forwarding the signed cryptogram to a blockchain server of a blockchain for entering the revocation confirmation of the banknote identified by the identification number in the blockchain.

23 Claims, 22 Drawing Sheets

(56) References Cited

U.S. PATENT DOCUMENTS

Figure 1:
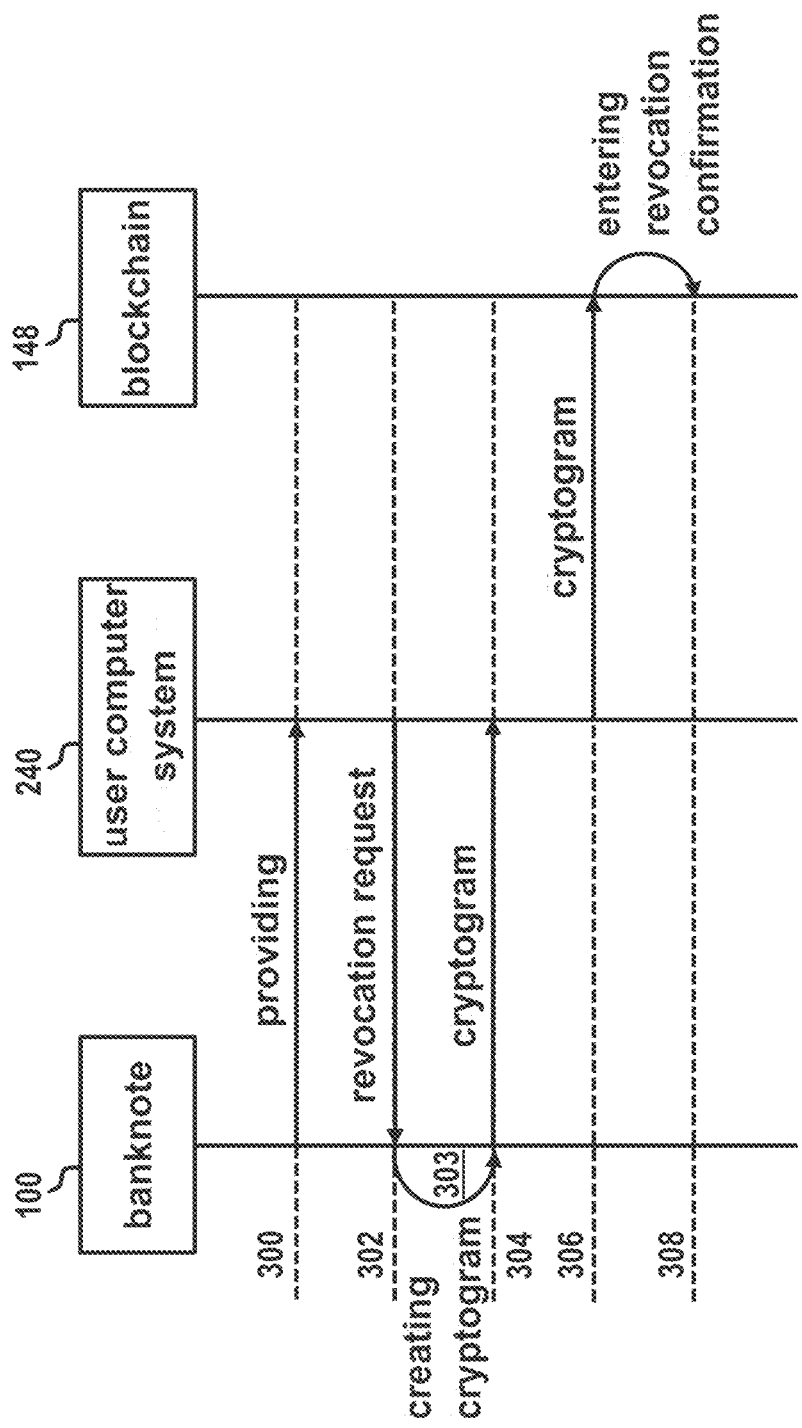

| | | | | |
|---|---|---|---|---|
| 2005/0150740 A1* | 7/2005 | Finkenzeller | ............ | G07D 7/01 194/207 |
| 2008/0272189 A1* | 11/2008 | Shite | ..................... | G07F 7/0866 235/379 |
| 2009/0201131 A1* | 8/2009 | Delia | ....................... | G07D 7/01 340/10.1 |
| 2010/0004996 A1* | 1/2010 | Fujita | ................... | G06Q 20/322 705/41 |
| 2012/0330845 A1* | 12/2012 | Kang | ................. | G06Q 20/3274 235/494 |
| 2014/0069997 A1* | 3/2014 | Eldefrawy | ............... | G07D 7/01 235/375 |
| 2016/0012465 A1* | 1/2016 | Sharp | ................... | G06Q 20/321 705/14.17 |
| 2018/0181739 A1* | 6/2018 | Zhong | ................... | H04L 9/3247 |
| 2018/0183771 A1 | 6/2018 | Campagna et al. | | |
| 2019/0052470 A1* | 2/2019 | Park | ....................... | H04L 9/3255 |
| 2019/0236594 A1* | 8/2019 | Ehrlich-Quinn | ..... | G06Q 20/401 |
| 2020/0143222 A1* | 5/2020 | Kutter | .............. | G06K 19/07788 |
| 2020/0151682 A1* | 5/2020 | Hurry | ................. | G06Q 20/0655 |
| 2021/0342830 A1* | 11/2021 | Ferenczi | .............. | G06Q 20/401 |
| 2022/0382872 A1* | 12/2022 | Sakib | ..................... | H04L 9/3247 |
| 2022/0391510 A1* | 12/2022 | Sakib | ....................... | G06F 21/57 |

OTHER PUBLICATIONS

Balagurusamy; Crypto_anchors; IBM, 12 pages; 2019.*
Kemmoe; Recent_Advances_in_Smart_Contracts_A_Technical_Overview; IEEE Access; pp. 117782-117801; 2020.*
Kopp; Design_of_a_Privacy-Preserving_Decentralized_File_Storage; IEEE; pp. 14-22; 2017.*
International Preliminary Report on Patentability for PCT/EP2022/068722 dated Jan. 25, 2024.
International Search Report for International Application No. PCT/EP2022/068722 dated Nov. 7, 2022.

* cited by examiner

REVOCATION OF CRYPTOGRAPHIC KEYS BY WAY OF A BLOCKCHAIN-BASED BANKNOTE

CROSS-REFERENCE TO RELATED APPLICATIONS

This application is a national phase under 35 U.S.C. § 371 of PCT International Application No. PCT/EP2022/068722 which has an International filing date of Jul. 6, 2022, which claims priority to German Application No. 10 2021 118 104.6, filed Jul. 13, 2021, the entire contents of each of which are hereby incorporated by reference.

The invention relates to a method for revoking an asymmetric key pair of a user computer system using a banknote and to a corresponding user computer system for revoking an asymmetric key pair of a user computer system using a banknote. The invention also relates to a banknote for revoking an asymmetric key pair of a user computer system and a system comprising a corresponding user computer system and a corresponding banknote for carrying out the method.

In the course of increasing digitalization, cashless payment instruments are increasingly coming to the fore, especially those based on electronic payment processing methods. In cashless payment transactions, means of payment are transferred without cash being transferred. In the case of cash payments, cash, i.e. banknotes or coins, is exchanged between the payer and the payee, whereas there is no such exchange of cash in the case of a cashless payment.

Cash has the advantage, for example, that it is available to everyone and can be used quickly and everywhere. For example, a bank account is not required for cash-based payment processing. In addition, cash is often valued by its owners as a store of value.

In contrast, cashless payment methods have the advantage that they enable efficient payment processing, even if the payer and payee are in distant locations, as is the case with online purchases, for example. This is not possible with conventional banknotes.

It is therefore an object of the present invention to enable the use of an improved banknote.

The task underlying the invention is solved in each case with the features of the independent patent claims. Some embodiments of the invention are given in the dependent claims.

Some embodiments comprise a method for revoking a first asymmetric key pair of a first user computer system using a banknote. The first asymmetric key pair comprises a first private cryptographic key and a first public cryptographic key. The first asymmetric key pair is assigned to a first blockchain address in a blockchain. Furthermore, an assignment to the banknote is registered in the blockchain for the first asymmetric key pair, which is signed using a banknote-individual second private cryptographic key of a banknote-individual second asymmetric key pair of the banknote.

The banknote comprises a security element with a processor and a memory with program instructions. An identification number that uniquely identifies the banknote is stored in the memory. The second private cryptographic key is stored in a protected memory area of the memory. The second asymmetric key pair is assigned to a banknote-individual second blockchain address in the blockchain.

The method comprises using a second user computer system:

Sending a revocation request to revoke the first asymmetric key pair from the second user computer system to the banknote, in response to the revocation request, receiving a first cryptogram signed using the second private cryptographic key from the banknote by the second user computer system, the first cryptogram comprising the identification number of the banknote and a revocation confirmation of the banknote, forwarding the signed first cryptogram by the second user computer system to a blockchain server of the blockchain for entering the revocation confirmation of the banknote identified by the identification number into the blockchain, wherein by entering the revocation confirmation the first asymmetric key pair and, as a result of the revocation, entries of transactions into the blockchain are blocked whose releases are based on a signature using the revoked first private cryptographic key.

Some embodiments may have the advantage that banknotes comprising cryptographic keys can be used to provide a digital currency that closely resembles cash. In addition to the classic cashless payment process with the transfer of the banknote, this digital cash in the form of the banknote also offers the option of communicating with the outside world via digital communication channels and thus processing a payment. A blockchain can be used to process payments, in which transactions between blockchain addresses are recorded, with one of the blockchain addresses being assigned to the corresponding banknote. For example, this blockchain address is linked to a public cryptographic key of the banknote.

Such a banknote can be available to anyone and can be used quickly and everywhere. Even cashless payment transactions are possible with such a banknote, without the need for additional measures such as setting up a bank account. Instead, a blockchain address is assigned to the banknote itself, which the user can use for cashless payments. In addition, the user can independently set up further blockchain addresses for processing cashless payments, for example with user computer systems, using the banknote alone.

The banknote is equipped with a processor and an asymmetric key pair, for example. The banknote is configured to create signatures using asymmetric key pairs, more precisely the private cryptographic key of the corresponding key pair. Furthermore, the banknote is equipped with a digital identification number, such as a digital copy of the serial number.

Furthermore, a corresponding banknote can be used to register cryptographic keys of user computer systems, which means that the corresponding cryptographic keys of the user computer systems can be used in the same way as the cryptographic keys of the banknote for payment processing by means of the blockchain. A prerequisite for this is, for example, registration of the corresponding cryptographic keys of the user computer systems using the banknote in the blockchain. Exemplary payment methods with such a user computer system, such as a smartphone, can comprise payments to third parties, which are triggered via a payment application installed on the user computer system using a private cryptographic key of a registered asymmetric key pair of the user computer system. Furthermore, exemplary payment methods can comprise direct payments with the payment application on site via a so-called point of sale. For this purpose, the user computer system establishes a wireless communication connection, in particular an encrypted communication connection, with a computer system at the point of sale, such as a cash register.

The banknote is available to the user in physical form and can be linked by the user to the user computer system, such as a smartphone, by registering an assignment of an asymmetric key pair of the user computer system in the blockchain. This allows the user to conveniently use the user computer system for payments. Instead of the banknote, the user can also process payments with the user computer system. If the user computer system, such as a smartphone, is lost, a blockchain address of the asymmetric key pair lost with the user computer system is retained. This does not require data about the user, such as a name, or data about the user computer system, such as a device number, to be registered in the blockchain. For example, only identification numbers of the banknotes and public cryptographic keys of the banknotes and user computer systems are registered in the blockchain for the banknotes and user computer systems. For example, only public cryptographic keys of the banknotes and user computer systems are registered in the blockchain for the banknotes and user computer systems. The aforementioned procedure for revoking asymmetric key pairs from user computer systems also provides a convenient way of revoking. It is possible to revoke both an asymmetric key pair of another, e.g. lost, user computer system and the user's own asymmetric key pair of the same user computer system.

Using a user computer system for payments can be advantageous as, for example, protocols for payment processing do not have to be implemented on the banknote. It is sufficient, for example, for the relevant protocols to be stored on the user computer system. Protocols for re-registering and revoking asymmetric key pairs from user computer systems are sufficient on the banknote itself. In this case, for example, the banknote provides no or only limited payment capability. However, the banknote can also be used to implement the full payment processing protocols, for example.

Payment processing can also be simplified with a payment application on a user computer system, such as a smartphone. In particular, the input and output devices of such a user computer system simplify use. In addition, a corresponding user computer system can have one or more biometric sensors which, as a prerequisite for a payment using the user computer system, check whether a current user of the user computer system is also a user registered on the user computer system and thus legitimized. This can prevent misuse without the user's data being stored on the banknote or centrally in the blockchain.

At the same time, the banknote is the sole anchor and the only security holding value in this system. The asymmetric key pairs of the user computer systems and their use in the blockchain are dependent on the banknotes to which they are assigned.

Some embodiments may have the advantage that a corresponding banknote with a processor can not only be used as a means of cash payment in the usual sense but can also be used to make cashless payments. When used as a means of cash payment in the usual sense, the banknote is handed over by a debtor to a creditor in the course of payment processing or the creditor hands over the corresponding banknote to the debtor as change in the course of payment processing. When the banknote is handed over, ownership of the banknote is transferred from the transferor to the recipient. Ownership of the banknote also transfers ownership of the current nominal value of the banknote, i.e. the nominal value assigned to the blockchain address of the banknote, to the recipient.

When used for a cashless payment, i.e. without handing over the banknote or transferring ownership of the banknote, the payment is made by the banknote providing a payment-specific cryptogram. This cryptogram releases a transaction in which the amount to be paid is transferred from the blockchain address of the banknote to a blockchain address of the payee or assigned to the blockchain address of the payee.

Providing an asymmetric key pair on a user computer system, for which an assignment to the banknote is registered in the blockchain, allows the cashless payment functionality of the banknote to be transferred to the corresponding user computer system. The asymmetric key pair and thus the blockchain address of the user computer system is dependent on the banknote and its individual blockchain address as a result of the registered assignment. The blockchain address of the user computer system is dependent on the banknote to the extent that transactions whose releases are based on a signature using the private cryptographic key of the user computer system can only be entered into the blockchain if a valid registration of an assignment of the asymmetric key pair to the banknote is entered into the blockchain. If no such registration is entered into the blockchain or a registered registration has been revoked, entries of transactions of the user computer system whose releases are based on a signature using the private cryptographic key of the user computer system are blocked. For example, a blockchain server responsible for entering the corresponding transaction checks whether a valid registration of an assignment to the banknote has been entered into the blockchain for the private cryptographic key of the user computer system on whose signature the release of the transaction is based. For example, the blockchain server executes a smart contract which is configured to cause the blockchain server to check the existence of a corresponding valid registration when it is executed by the blockchain server or its processor. A corresponding transaction is only entered if such a valid registration exists, otherwise the entry is blocked. Registration using the banknote is therefore a prerequisite for the use of the asymmetric key pair of the user computer system for transactions with the blockchain address of the user computer system and thus for the use of the corresponding blockchain address itself.

As a result, control over the banknote or its private cryptographic key also grants control over the blockchain address of the user computer system, as the banknote can be used to register the asymmetric key pair of the user computer system in the blockchain for use and a corresponding registration can also be revoked. Whoever owns the banknote can unlock the blockchain address and lock it again by registering or revoking the corresponding asymmetric key pair of the user computer system.

For example, a revocation of the blockchain address of the banknote automatically results in a revocation of the corresponding account. This can be implemented, for example, by ensuring that a valid registration of the assignment of the asymmetric key pair of the user computer system to the banknote in the blockchain not only requires that the corresponding assignment of the banknote, i.e. using the private cryptographic key of the banknote, is signed and entered into the blockchain and not revoked, but also that a valid registration of the banknote itself is entered into the blockchain. This registration of the banknote comprises, for example, a registration entry with the individual identification number of the banknote and/or the public cryptographic key of the banknote. The registration entry or the data covered by the registration entry is signed, for example, using a private cryptographic key of an issuer computer system or manufacturer computer system of an issuer or manufacturer of the banknote. To revoke the banknote, the issuer computer system/manufacturer computer system can, for example, create a revocation confirmation of a revocation of the banknote with the individual identification number of the banknote and/or with the public cryptographic key of the banknote and sign it using the private cryptographic key of the issuer computer system/manufacturer computer system. The signed revocation confirmation for revoking the banknote is sent by the issuer computer system/manufacturer computer system, for example, to a blockchain server for entry into the blockchain. By entering the revocation confirmation for revoking the banknote, the banknote or the second asymmetric key pair of the banknote is revoked and, as a result of the revocation, entries of transactions in the blockchain whose releases are based on a signature using the revoked second private cryptographic key are blocked. Furthermore, as a result of the revocation of the banknote, the first asymmetric key pair, for example, is revoked, as the valid registration is no longer valid for it. Alternatively, the banknote could also be revoked by another authorized computer system that has a corresponding private cryptographic key to prove this authorization. Such an authorized computer system could, for example, be a computer system of the central bank issuing the banknote.

Some embodiments may have the advantage that a banknote can be used to set up a blockchain address for a user computer system, in particular a mobile portable device, such as a smartphone, and thus an account based on the blockchain, which is dependent on the banknote or its release. The private cryptographic key of the banknote serves as a master key. This is securely stored on the banknote and can be kept independently of the user computer system. If it is necessary for a user computer system to authorize the use of the blockchain or a blockchain address, this can be done using the banknote's master key, with which an assignment of an asymmetric key pair of the user computer system is signed and thereby confirmed for registration in the blockchain. If the corresponding asymmetric key pair of the user computer system or its use in the blockchain is to be revoked, this can also be done using the master key.

If the banknote is stored independently of the user computer system, for example in a safe or safe deposit box, the probability of simultaneous compromise or damage to both the user computer system and the banknote can be significantly reduced. The banknote thus serves as a security anchor.

Some embodiments may have the advantage of enabling simple, convenient and secure use of an account in the form of a blockchain address by means of the user computer system, such as a smartphone: For such a blockchain address, no data of the user computer system or the user thereof is stored in the blockchain apart from the public cryptographic key of the user computer system, for example. Such a blockchain address thus allows the user computer system to make anonymous payments. If the user computer system is a mobile portable device, such as a smartphone, anonymous payments can be made anywhere and at any time. At the same time, a high level of security is offered, as the banknote itself serves as a backup.

Even if the user's computer system is lost or damaged, the user can use the banknote to independently revoke the asymmetric key pair of the user's computer system and thus revoke the use of the blockchain. This revocation takes place in the event of a loss or damage to the user computer system, for example by another user computer system of the user. For example, a new asymmetric key pair can be generated independently by the user with the additional user computer system and registered in the blockchain using the banknote. This new asymmetric key pair, which is assigned a new blockchain address in the blockchain, can be used to replace the revoked asymmetric key pair. Similarly, if the asymmetric key pair is compromised, for example in the event of a security breach, it can be revoked. In this case, the revocation can be carried out using the user computer system, for example. For example, a new asymmetric key pair can be generated independently by the user with the additional user computer system and registered in the blockchain using the banknote. This new asymmetric key pair of the additional user computer system, which is assigned a new blockchain address in the blockchain, can be used to replace the revoked asymmetric key pair.

In addition, a banknote can offer a high level of security in the event of damage, for example if a level 3 feature is implemented, as it can be replaced even if it is damaged. For example, the central bank can have access to the blockchain address of the banknote and/or to the dependent blockchain addresses of asymmetric key pairs of user computer systems for which a registration of an assignment to the banknote is entered into the blockchain. This allows the central bank to grant the user access to their money even if the banknote and/or the user computer system is damaged.

For example, by using a banknote with a processor for a smartphone, an asymmetric key pair of the smartphone can be registered in the blockchain, thus enabling the use of a blockchain address assigned to the asymmetric key pair. Furthermore, the banknote with processor enables the re-registration or the asymmetric key pair to be revoked, for example if the smartphone is lost, which also allows the asymmetric key pair to be blocked.

For example, a user takes a banknote with a processor from an ATM. The user loads an application for registering and revoking asymmetric key pairs in the blockchain using a banknote onto their user computer system, such as a smartphone. The user establishes a wireless communication link between the banknote and the user computer system. For example, the banknote is placed on an NFC interface of the user computer system. After a registration process of an asymmetric key pair of the user computer system in the blockchain using the application and the banknote, the user can, for example, pay directly with their user computer system, such as a smartphone, using the registered asymmetric key pair. If the user loses the user computer system, for example, or if it is stolen or has a defect, the user can replace the previous user computer system with a new user computer system. For example, the user buys a new computer system, such as a new smartphone. The user loads the application for registering and revoking asymmetric key pairs in the blockchain onto their new user computer system using a banknote, establishes a wireless communication connection to the banknote and revokes the previous asymmetric key pair of the previous user computer system. Furthermore, as described above, the user can repeat the registration process for a new asymmetric key pair of the new user computer system in the blockchain using the application and the banknote. The registration of the new asymmetric key pair enables the user to pay directly with their new user computer system, such as a smartphone, using the registered new asymmetric key pair. In this way, asymmetric key pairs of different user computer systems, such as smartphones, smartwatches, tablets, laptops or desktop PCs, can be registered, used for payment and, if necessary, revoked using a banknote.

If the user loses the smartphone with the asymmetric key pair for which an assignment to the banknote is registered in the blockchain, for example due to loss or theft, the user still has the banknote. This is stored in a secure location independently of the smartphone, for example. For example, it is possible to register exactly one asymmetric key pair for a user computer system using the banknote in the blockchain. For example, it is possible to register several asymmetric key pairs for one or more user computer systems using one and the same banknote in the blockchain. The user can now, for example, use another user computer system, such as a smartphone, to revoke the registered asymmetric key pair(s). The user opens an application on the other user computer system to revoke cryptographic keys for the corresponding bank accounts. To initiate the process, the user taps a button in a graphical user interface, for example "Revoke ALL assigned keys" or "Revoke ALL assigned keys". The user attaches the banknote to the user computer system. The application provided on the user computer system can now directly use the banknote or its private cryptographic key to sign a revocation confirmation to revoke the asymmetric key pairs assigned to the banknote, whose registrations are signed using the banknote's private cryptographic key. This would allow the asymmetric key pairs assigned to the banknote and thus the corresponding blockchain addresses to be revoked. The credit balances or amounts of money assigned to the corresponding blockchain addresses can, for example, be transferred back to the banknote or the blockchain address assigned to the banknote. Alternatively, the user can also specify an IBAN, for example, to transfer the money from the assigned blockchain addresses to be revoked to the IBAN. However, this would require additional information to be provided with the IBAN, thereby removing anonymity. In contrast, a transfer to a blockchain address would have the advantage that anonymity can be maintained.

The private cryptographic key of the banknote is securely stored in a security element of the banknote so that it cannot be read, for example. If the banknote's private cryptographic key cannot be read, transactions from the banknote account can only be carried out with the direct involvement of the banknote and not via a third-party application. Registering an asymmetric key pair of a user computer system, such as a smartphone, and thus releasing it for use in the blockchain enables transactions without the direct involvement of the banknote. For example, an application provided on the smartphone in the form of a corresponding application or payment application can be used for this purpose. In addition, the banknote with processor itself can be used both as a cash-based means of payment and as a cashless means of payment.

In particular, the advantages of cashless payment with the banknote can be transferred to the corresponding user computer system, such as a smartphone, by registering an asymmetric key pair of a user computer system in the blockchain. The blockchain address of the banknote account, which is assigned only to the identification number of the banknote, as well as the blockchain address of the asymmetric key pair of the user computer system, which is assigned only to the identification number of the banknote, are anonymous to the same degree as cash. In addition, they can in principle be passed on at will: The banknote can be passed on like normal banknotes. The asymmetric key pair of the user computer system could also be passed on in principle. However, this can reduce the security of the private cryptographic key of the asymmetric key pair. For example, all asymmetric key pairs assigned to the banknote are revoked before and/or after a transfer of the banknote.

Some embodiments provide, in particular, a backup mechanism in the event of a loss of the user computer system with the private crypto-graphic key assigned to the banknote. For example, a smartphone may be lost, severely damaged, destroyed or fall into the wrong hands. Although modern smartphones and in particular their security elements are protected against unauthorized access with PINs and biometric verification methods, such as FaceID, there is still a residual risk.

Electronic payment using the banknote is based on a blockchain. For example, an asymmetric cryptographic key pair is generated on the user computer system, such as a smartphone. This initially has no connection to the banknote, for example. For example, an application on the user computer system sends a signature request to the banknote with the generated public cryptographic key to sign the public cryptographic key and provide the identification number of the banknote so that an assignment of the generated asymmetric key pair confirmed by the banknote with the signature can be re-registered in the blockchain. The banknote creates a cryptogram with the signed public cryptographic key of the user computer system and with the identification number of the banknote. The user computer system or the application installed on the user computer system receives the cryptogram from the banknote, for example via NFC, and forwards it to a blockchain server for registration of the assignment in the blockchain by means of a corresponding entry. By entering the corresponding cryptogram into the blockchain, the assignment of the asymmetric key pair of the user computer system to the identification number of the banknote is registered in the blockchain. As a result of the registrations, entries of transactions into the blockchain are enabled, the releases of which are based on a signature using the registered private cryptographic key of the user computer system.

For example, the user computer system or the application determines a blockchain address assigned to the registered asymmetric key pair, for example using the public cryptographic key. This blockchain address is then used by the user computer system for payments, for example. Money can then be transferred from the blockchain address of the banknote account to the blockchain address of the user computer system or its asymmetric key pair, for example by making a payment, in particular a one-off payment. With the money assigned to the blockchain address of the user computer system as a result of the banknote payment, the user computer system is now able to make payments and transactions independently using the blockchain without needing the banknote or its cryptographic key.

If the registered asymmetric key pair of the user computer system or the user computer system is lost or compromised, for example, the user can use the banknote or the private cryptographic key securely stored in the banknote to revoke, i.e., lock, the registered asymmetric key pair.

In some embodiments, the first asymmetric key pair of the first user computer system and, in particular, the first public and/or private cryptographic key of the first asymmetric key pair is independent of the second asymmetric key pair of the banknote, i.e., in particular, the second public and/or private cryptographic key of the second asymmetric key pair. In this context, independent means that the first public and/or private cryptographic key cannot be derived or generated from the present second public and/or private cryptographic key. Rather, the first asymmetric key pair is generated independently of the banknote and the second asymmetric key pair by the first user computer system, for example, without the need for further aids.

In some embodiments, the first blockchain address is the first public cryptographic key or a blockchain address derived from the first public cryptographic key.

In some embodiments, the second blockchain address is the second public cryptographic key or a blockchain address derived from the second public cryptographic key.

In some embodiments, the identification number of the banknote is independent of the public cryptographic key of the banknote. For example, the banknote identification number is a serial number of the banknote.

In some embodiments, the identification number of the banknote is dependent on the public cryptographic key of the banknote. In some embodiments, the identification number is the public cryptographic key of the banknote or a number derived from the public cryptographic key of the banknote.

In some embodiments, the identification number is a serial number of the banknote or a number derived from the serial number of the banknote.

In some embodiments, the confirmation of revocation further comprises a time stamp. In some embodiments, the revocation confirmation is entered into the blockchain with a timestamp assigned to the entry. For example, a block of the blockchain created by the blockchain server, which comprises the entry of the revocation confirmation, comprises a timestamp.

Based on the corresponding timestamp, it is possible, for example, to determine which assignments of asymmetric keys or assigned asymmetric keys are revoked by the revocation confirmation. For example, the revocation confirmation can revoke all assigned asymmetric keys whose assignment registration is prior to the revocation confirmation. The time relevant for the revocation is identified by the corresponding time stamp. Alternatively, the last one or more assigned asymmetric keys can be revoked, the assignment registration of which precedes the revocation confirmation.

In some embodiments, the entry of the revocation confirmation revokes all asymmetric key pairs for whose public cryptographic key an assignment to the banknote is registered in the blockchain at the time of the entry, which is signed using the banknote-individual second private cryptographic key. As a result of the revocations, entries of transactions into the blockchain whose releases are based on a signature using a private cryptographic key of one of the revoked asymmetric key pairs are blocked.

Some embodiments may have the advantage that all assigned asymmetric key pairs are revoked by a corresponding revocation, thus ensuring that no assigned asymmetric keys are overlooked during revocation. This applies in particular if a number of asymmetric key pairs from one or more user computer systems are assigned to the corresponding banknote. In this case, for example, the keys to be revoked do not need to be identified in detail. For example, all asymmetric key pairs assigned so far, e.g. up to the time identified by the time stamp of the revocation confirmation, are revoked. When a transaction is entered into the blockchain, for example, a blockchain server making the entry checks whether a release of the transaction is based on a signature using a private cryptographic key, since the registration of which a revocation of all previous asymmetric key pairs for the corresponding banknote has been entered into the blockchain. If this is the case, the corresponding private cryptographic key is considered revoked and the entry is blocked. If this is not the case, the corresponding private cryptographic key is still valid, and the entry can be made.

In some embodiments, the entry of the revocation confirmation revokes all asymmetric key pairs up to a predefined maximum number for whose public cryptographic key an assignment to the banknote is registered in the blockchain at the time of the entry, which assignment is signed using the banknote-individual second private cryptographic key.

Some embodiments may have the advantage that not necessarily all assigned asymmetric key pairs are revoked, but at most up to the predefined maximum number. For example, the most recently assigned (and not yet revoked) maximum of N asymmetric key pairs could be revoked, where N is a natural number. Alternatively, the oldest assigned (and not yet revoked) N asymmetric key pairs could be revoked, where N is a natural number.

In some embodiments, the predefined maximum number, i.e. N, of asymmetric key pairs is one or more asymmetric key pairs, for example two, three, four, five, six, seven, eight, nine, ten, or more asymmetric key pairs.

Depending on the actual number of asymmetric key pairs for whose public cryptographic key an assignment to the banknote signed using the banknote-individual second private cryptographic key is registered in the blockchain at the time of entry of the revocation confirmation, the number of revoked asymmetric key pairs is thus less than or equal to the predefined maximum number.

In some embodiments, the revocation is performed up to the predefined maximum number of asymmetric key pairs in ascending chronological order, starting with the asymmetric key pair for whose public cryptographic key the earliest assignment to the banknote is registered in the blockchain and which has not been revoked. For example, the maximum of N oldest assigned (and not yet revoked) asymmetric key pairs are revoked, where N is a natural number.

In some embodiments, the revocation is performed up to the predefined maximum number of asymmetric key pairs in descending chronological order, starting with the asymmetric key pair for whose public cryptographic key the latest assignment is registered in the blockchain and which has not been revoked. For example, the maximum of N most recently assigned (and not yet revoked) asymmetric key pairs are revoked, where N is a natural number.

In some embodiments, the entry of the revocation confirmation revokes all asymmetric key pairs for whose public cryptographic key an assignment to the banknote is registered in the blockchain within a certain time interval and the assignment is signed using the banknote-individual second private cryptographic key.

The corresponding time interval can, for example, extend from a start time to an end time. For example, the start time and end time can be selected within the time interval from the registration of the corresponding banknote in the blockchain to the time of revocation.

For example, the time of registration of the corresponding banknote in the blockchain can be selected as the start time and the time of revocation as the end time. This allows, for example, all asymmetric key pairs assigned to the banknote to be revoked. For example, the time of registration of the corresponding banknote in the blockchain can be selected as the start time and a time that is older than the time of revocation can be selected as the end time. This allows, for example, all asymmetric key pairs assigned to the banknote whose assignment is older than the selected end time to be revoked.

For example, a time older than the time of revocation can be selected as the start time and the time of revocation can be selected as the end time. This means that, for example, all asymmetric key pairs assigned to the banknote whose assignment is more recent than the selected start time can be revoked. For example, all asymmetric key pairs assigned to the banknote that have been assigned within the last hour, the last hours, the last day, the last days, the last week, the last weeks, the last month, the last months, the last year or the last years can be revoked.

In some embodiments, the revocation confirmation comprises the first public cryptographic key identifying the revoked first asymmetric key pair. Some embodiments may have the advantage that the revocation confirmation identifies the asymmetric key pair being revoked. Thus, revocation can be performed on an individual key pair basis.

In some embodiments, the revocation request comprises the first public cryptographic key for identifying the first asymmetric key pair to be revoked by the banknote. Some embodiments may have the advantage that the revocation request defines which asymmetric key pair is to be revoked. This means that a key pair-individual revocation can be requested. In addition, the banknote can be provided with an identifier of the asymmetric key pair to be revoked in the form of the corresponding public cryptographic key. This means that the corresponding public cryptographic key does not have to be stored on the banknote, for example.

For example, the banknote can be configured to create a blockchain request signed with the private cryptographic key of the banknote, for example, at the request of a user computer system, which queries which asymmetric key pairs are assigned to the corresponding banknote. To identify the banknote, the blockchain request comprises, for example, the identification number of the banknote or the identification number of the banknote is provided by the banknote, for example, together with the signed blockchain request. The user computer system forwards the blockchain request, for example, to a blockchain server which, in response to the blockchain request, determines for which asymmetric key pairs an assignment to the corresponding banknote is stored in the blockchain. The corresponding asymmetric key pairs are identified, for example, using the respective public cryptographic key. For example, the user computer system receives the public cryptographic keys of the specific asymmetric key pairs in response to the forwarding. For example, the blockchain server additionally determines the times of the entries of the assignments and sends them together with the public cryptographic keys to the user computer system.

In some embodiments, the first public cryptographic key is stored in the memory of the banknote. Some embodiments may have the advantage that the banknote has information about which asymmetric key pairs are assigned to it. For example, in the course of each assignment, the public cryptographic key of the corresponding asymmetric key pair is stored in the memory of the banknote. For example, the banknote indicates which public cryptographic keys are assigned to it on request, for example on request from a user computer system.

Furthermore, the memory of the banknote stores, for example, a time of assignment for the asymmetric key pairs, which is output on request together with the public cryptographic key of the corresponding asymmetric key pair.

For example, the public cryptographic key of the corresponding asymmetric key pair is deleted from the memory of the banknote in response to a revocation of an asymmetric key pair or to the creation of a revocation confirmation for an asymmetric key pair.

In some embodiments, an assignment of the first public cryptographic key to the first user computer system is stored in the memory of the banknote. The assignment comprises an identifier of the first user computer system, wherein the revocation request uses the identifier of the first user computer system to identify the first asymmetric key pair to be revoked by the banknote.

Some embodiments may have the advantage that the identifier of the user computer system can be used to identify which asymmetric key pair(s) are to be revoked. For example, all asymmetric key pairs of the user computer system identified by the identifier are deleted. For example, the identifiers of user computer systems are only stored locally on the banknote that is in the possession of the user. For example, no identifiers of user computer systems are stored in the blockchain.

In some embodiments, the first user computer system and the second user computer system are the same user computer system. Some embodiments may have the advantage that a revocation of the first asymmetric key pair can be initiated and controlled by the first user computer system itself using the banknote. This may be necessary, for example, if the corresponding asymmetric key pair, in particular the first private cryptographic key, has been compromised. It can be ensured, for example, that a user computer system can only revoke its own asymmetric key pair for use in the blockchain using the banknote to which the corresponding asymmetric key pair is assigned.

In some embodiments, the first user computer system and the second user computer system are different user computer systems. Embodiments may have the advantage that the second user computer system can be used to revoke the asymmetric key pair of the first user computer system. This can be advantageous, for example, if the first user computer system is no longer functioning, for example due to a defect, or is no longer available, for example due to loss or theft.

In some embodiments, the first user computer system is a first mobile portable device, for example a smart device, such as a smart phone or a smart watch.

In some embodiments, the second user computer system is a second mobile portable device, for example a smart device, such as a smart phone or a smart watch.

In some embodiments, the blockchain is a blockchain managed by a central bank issuing the banknote. Some embodiments may have the advantage that the blockchain is an official technical infrastructure provided by the central bank for using the digital payment options of the issued banknotes. In some embodiments, the blockchain servers are a server of the central bank issuing the banknote. Some embodiments may have the advantage that entries in the blockchain are thus only possible via technical infrastructure components of the central bank, for example.

This blockchain managed by a central bank is, for example, a public permissioned blockchain or a private blockchain, which is managed on the central bank's blockchain servers. For example, new blocks are entered exclusively by these blockchain servers managed by the central bank. In this case, for example, computationally intensive processes can be omitted when adding additional blocks. For example, only a signature with a signature key assigned to the central bank is required to add additional blocks. In the case of a private blockchain, for example, only selected participants may access the blockchain, and they must prove that they are authorized to do so. For example, a banknote may only access its blockchain address and/or blockchain addresses of asymmetric key pairs assigned to it. In addition, a banknote may only register assignments of asymmetric key pairs to itself, for example. For example, a user computer system with an asymmetric key pair may only access the blockchain address assigned to the corresponding asymmetric key pair. In the case of a public access-restricted blockchain, for example, read access is possible without restriction.

For example, read access is permitted without restriction for certain categories of data. For example, unrestricted read access to banknote registration data is permitted in order to check which banknotes are registered in the blockchain. For example, write access in general and/or read access to certain categories of data is only permitted with proof of appropriate authorization. Write access or requests to enter certain data, such as transactions and/or registrations, for example, require proof of corresponding authorization. Such authorization can be proven, for example, by means of a signature with a private cryptographic key, the assigned public cryptographic key of which is registered in the blockchain together with an assignment of the type of write accesses to which signatures with the corresponding private cryptographic key authorize. For example, only limited read access is given to transaction data and/or assignment data of assignments between blockchain addresses of banknotes and blockchain addresses of user computer systems, for which proof of authorization is required.

In some embodiments, an amount of money assigned to the first blockchain address at the time of revocation of the first asymmetric key pair is transferred to the second blockchain address of the banknote.

Some embodiments may have the advantage that if the asymmetric key pair is revoked, money assigned to the blockchain address of the revoked asymmetric key pair remains available to the user even if transactions whose releases are based on a signature using the revoked private cryptographic key are blocked. By transferring the money to the blockchain address of the banknote, the user can continue to dispose of the money using the banknote.

For example, if the asymmetric key pair is revoked, the amount of money can be transferred automatically. The transfer of the amount of money to the blockchain address of the banknote can, for example, be based on a transaction release of the banknote if the banknote has power of disposal over the blockchain address of the asymmetric key pair assigned to it. The transfer of the amount of money to the blockchain address of the banknote may, for example, be based on a transaction release of the central bank if the central bank, as the entity managing the blockchain, has power of disposal over the blockchain address of the asymmetric key pair assigned to it.

In some embodiments, the banknote has power of disposal over the first blockchain address of the first asymmetric key pair assigned to it. For example, transactions of amounts to be paid from the first blockchain address to other blockchain addresses are also entered in the blockchain if the transaction is released by the banknote, i.e. is signed using the second private cryptographic key of the banknote.

In some embodiments, the method further comprises manufacturing the banknote, wherein the manufacturing comprises:
Receiving the identification number by the banknote, storing the identification number in the memory of the banknote,
generating the second asymmetric key pair by the security element of the banknote,
Storing the second private cryptographic key in the protected memory area of the banknote's memory,
storing the second public cryptographic key in the memory of the banknote,
generating, by the banknote, a registration request signed using the second private cryptographic key, the re-registration request comprising the identification number and the second public cryptographic key of the banknote,
in response to receiving the identification number, sending the re-registration request to register the identification number and the second public cryptographic key in the blockchain by a blockchain server.

Some embodiments may have the advantage that the identification number and the public cryptographic key of the banknote are registered in the blockchain in the course of manufacturing. Successful registration of the banknote in the blockchain is, for example, a prerequisite for use of the blockchain by the banknote. A use of the blockchain by the banknote comprises, for example, a transfer of funds from a blockchain address of the banknote to other blockchain addresses, a receipt of monetary transactions with the blockchain address of the banknote from other blockchain addresses, a registration of assignments of asymmetric key pairs to the banknote and a revocation of assigned asymmetric key pairs, i.e. a revocation of the assignments of the asymmetric key pairs to the banknote.

In some embodiments, the generation and storage of the second asymmetric key pair by the banknote may occur before or after receiving the identification number.

In some embodiments, a manufacturer computer system of a manufacturer of the banknote sends the identification number to the banknote and receives the registration request in response to the sending of the identification number. The manufacturer computer system comprises a processor and a memory with program instructions. A third private cryptographic key of a third asymmetric key pair assigned to a third blockchain address of the manufacturer in a blockchain is stored in a protected memory area of the memory.
The method also comprises:
Signing the registration request using the third private cryptographic key by the manufacturer computer system,
forwarding the registration request signed by the manufacturer computer system to a blockchain server for registering the identification number and the second public cryptographic key in the blockchain.

By forwarding the registration request to the blockchain server, the manufacturer computer system initiates the registration of the identification number and the second public cryptographic key in the blockchain. For a valid registration request, for example, a signature from a manufacturer computer system authorized to make registration requests is required. This ensures that only official banknotes issued by a central bank are entered into the blockchain. For example, the manufacturer computer system, such as the central bank, is registered in the blockchain as a manufacturer computer system. The corresponding registration comprises, for example, a public cryptographic key of the manufacturer computer system. The corresponding registration comprises, for example, a signature with a private cryptographic key of the central bank.

In some embodiments, the registration of the identification number and the second public cryptographic key is performed at a third blockchain address of the manufacturer of the banknote. In some embodiments, the third blockchain address is the third public cryptographic key or a blockchain address derived from the third public cryptographic key.

In some embodiments, the method further comprises registering the assignment of the first asymmetric key pair with the banknote in the blockchain. The registering comprises:
- generating the first asymmetric key pair by the first user computer system,
- storing the first private cryptographic key in a protected memory area of a memory of the first user computer system,
- storing the first public cryptographic key in the memory of the first user computer system,
- sending a signature request for signing the first public cryptographic key to the banknote, the signature request comprising the first public cryptographic key,
- in response to the signature request, receiving a second cryptogram with the signed first public cryptographic key and with the identification number of the banknote, wherein the first public cryptographic key is signed with the second private cryptographic key of the banknote,
- forwarding the second cryptogram to a blockchain server of the blockchain for registration, the registration of the second cryptogram registering the assignment of the first asymmetric key pair to the identification number of the banknote in the blockchain and, as a result of the registration, enabling entries of transactions into the blockchain, the releases of which are based on a signature using the registered first private cryptographic key.

Some embodiments may have the advantage that asymmetric key pairs can be registered in the blockchain by user computer systems using the banknote. The asymmetric key pairs of the user computer systems are assigned to the registering banknote. This enables a user who has a corresponding banknote to generate one or more asymmetric key pairs on one or more user computer systems and register them for use in the blockchain using their banknote. The registered asymmetric key pairs are dependent on the banknote, for example in that they are assigned to the banknote and can be revoked by the banknote. The asymmetric key pairs are each assigned a blockchain address, for example. This blockchain address can, for example, be the public cryptographic key of the respective asymmetric key pair or the blockchain address can be derived from the corresponding public cryptographic key. To use a corresponding blockchain address, for example, it is necessary to register the corresponding public cryptographic key. If a transaction is to be made from or to a blockchain address, it is checked, for example, whether a corresponding public cryptographic key is registered in the blockchain.

In some embodiments, a payment of an amount using the first private cryptographic key of the first user computer system comprises:
- creating a transaction release by the first user computer system for a transaction of the amount to be paid from the first blockchain address to a fourth blockchain address of a payee, wherein the transaction release comprises the first blockchain address to which the first private cryptographic key is assigned, the fourth blockchain address of the payee, and the amount to be paid,
- signing the transaction release with the first private cryptographic key of the first user computer system,
- sending the signed transaction release to a blockchain server of the blockchain for entering the transaction into the blockchain, wherein by entering the transaction, the amount to be paid is assigned to the fourth blockchain address of the payee.

Some embodiments may have the advantage that the corresponding asymmetric key pair can be used to execute payments in the form of transactions in the blockchain. For example, only the user computer system, such as a smartphone, with the corresponding private cryptographic key is required to execute payments. The user computer system can, for example, be carried by the user as a mobile, portable device and used for payments. If the user computer system and/or private cryptographic keys are lost, stolen, compromised or damaged, for example, the banknote can be used to revoke the corresponding asymmetric key pair. A new asymmetric key pair can then be registered as a replacement for the revoked asymmetric key pair and subsequently used for payments using the blockchain. The new asymmetric key pair may be an asymmetric key pair of the same or a different user computer system, i.e. the private cryptographic key of the corresponding asymmetric key pair may be stored in a protected memory area of a memory of the same or a different user computer system.

In some embodiments, the method further comprises receiving a payment request for payment of the amount to be paid by the first user computer system, wherein the payment request specifies the amount to be paid and the fourth blockchain address of the payee. The user computer system can receive a corresponding payment request via a network such as the Internet, for example. This may be the case for an online purchase, for example. The user computer system can also receive a corresponding payment request via a wireless communication link, for example by means of NFC. This can be the case, for example, when making a payment on site at a point of sale with the user computer system, such as a smartphone or a smartwatch.

In some embodiments, the fourth blockchain address is a fourth public cryptographic key of a fourth asymmetric key pair of the payee or a blockchain address derived from the fourth public cryptographic key.

Some embodiments further comprise a user computer system for revoking a first asymmetric key pair of another user computer system using a banknote. The first asymmetric key pair comprises a first private cryptographic key and a first public cryptographic key. The first asymmetric key pair is assigned to a first blockchain address in a blockchain. The user computer system comprises a processor and a memory with program instructions.

Furthermore, an assignment to the banknote is registered in the blockchain for the first asymmetric key pair, which is signed using a banknote-individual second private cryptographic key of a banknote-individual second asymmetric key pair of the banknote.

The banknote comprises a security element with a processor and a memory with program instructions. An identification number that uniquely identifies the banknote is stored in the memory. The second private cryptographic key is stored in a protected memory area of the memory. The second asymmetric key pair is assigned to a banknote-individual second blockchain address in the blockchain.

Execution of the program instructions by the processor causes the processor to control the user computer system to revoke the first asymmetric key pair. The revocation comprises:
- Sending a revocation request to revoke the first asymmetric key pair from the user computer system to the banknote, in response to the revocation request, receiving a cryptogram signed using the second private cryptographic key from the banknote by the user computer system, the cryptogram comprising the identification number of the banknote and a revocation confirmation of the banknote, forwarding of the signed cryptogram by the user computer system to a blockchain server of the blockchain for entry of the revocation confirmation of the banknote identified by the identification number into the blockchain, the entry of the revocation confirmation revoking the first asymmetric key pair and, as a result of the revocation, blocking entries of transactions into the blockchain whose releases are based on a signature using the revoked first private cryptographic key.

In some embodiments, the user computer system is configured to perform each of the previously described embodiments of revoking an asymmetric key pair of another user computer system using a banknote.

Some embodiments further comprise a banknote for revoking a first asymmetric key pair of a first user computer system using a second user computer system. The first asymmetric key pair comprises a first private cryptographic key and a first public cryptographic key. The first asymmetric key pair is assigned to a first blockchain address in a blockchain. Furthermore, an assignment to the banknote is registered in the blockchain for the first asymmetric key pair, which is signed using a banknote-individual second private cryptographic key of a banknote-individual second asymmetric key pair of the banknote.

The banknote comprises a security element with a processor and a memory with program instructions. An identification number that uniquely identifies the banknote is stored in the memory. The second private cryptographic key is stored in a protected memory area of the memory. The second asymmetric key pair is assigned to a banknote-individual second blockchain address in the blockchain.

Execution of the program instructions by the processor causes the processor to control the banknote to revoke the first asymmetric key pair. The revoking comprises:
receiving, by the banknote, a revocation request to revoke the first asymmetric key pair from the second user computer system,
generating a cryptogram signed using the second private cryptographic key from the banknote by the banknote, wherein the cryptogram comprises the identification number of the banknote and a revocation confirmation of the banknote
in response to the revocation request, sending the signed cryptogram from the banknote to the second user computer system for forwarding to a blockchain server of the blockchain for entering the revocation confirmation of the banknote identified by the identification number into the blockchain, wherein the entry of the revocation confirmation revokes the first asymmetric key pair and, as a result of the revocation, entries of transactions in the blockchain whose releases are based on a signature using the revoked first private cryptographic key are blocked.

In some embodiments, the banknote is configured to perform any of the previously described embodiments of revoking an asymmetric key pair of a first user computer system by a second user computer system.

Some embodiments further comprise a system for revoking a first asymmetric key pair of a first user computer system, the system comprising a second user computer system according to any of the embodiments described above and a banknote according to any of the embodiments described above.

In some embodiments, the system is configured to perform any of the previously described embodiments of revoking an asymmetric key pair of a first user computer system using the second user computer system and the banknote.

In some embodiments, the system further comprises a blockchain server. The blockchain server comprises a processor and a memory with program instructions. Execution of the program instructions by the processor causes the processor to control the blockchain server to revoke the first asymmetric key pair.

The revocation comprises:
receiving the signed cryptogram from the user computer system by the blockchain server to enter the revocation confirmation of the banknote identified by the identification number into the blockchain,
verification of the signature of the cryptogram by the blockchain server using the second public cryptographic key,
upon successful verification, entering the revocation confirmation in the blockchain, wherein the entry of the revocation confirmation revokes the first asymmetric key pair and, as a result of the revocation, entries of transactions in the blockchain whose releases are based on a signature using the revoked first private cryptographic key are blocked.

In some embodiments, the blockchain server is configured to make each of the previously described entries in the blockchain.

In some embodiments, the system further comprises the first user computer system.

In some embodiments, the first user computer system is configured to perform each of the previously described embodiments of method steps of a user computer system with an asymmetric key pair to be registered and/or a registered asymmetric key pair.

A banknote according to the invention may also itself be configured to pay using the blockchain. The processor of the banknote is configured to execute a payment method with the banknote upon execution of corresponding program instructions. The payment procedure comprises:
receiving a payment request for a payment with the banknote in the form of a transaction of an amount to be paid from the blockchain address of the banknote to a blockchain address of a payee, wherein the payment request specifies the amount to be paid and the blockchain address of the payee,
signing the transaction release with the private cryptographic key of the banknote, wherein the transaction release comprises the blockchain address of the banknote, the blockchain address of the payee and the amount to be paid,
sending the signed transaction release.

In some embodiments, a further transaction-individual value is also sent together with the signed transaction release. For example, the further transaction-individual value is comprised in the signature of the transaction release and/or attached to the signed transaction release. The further transaction-individual value is, for example, a timestamp and/or a random number.

In some embodiments, the banknote comprises, for example, a visual indication of a serial number uniquely identifying the banknote. In some embodiments, the banknote comprises, for example, a visual indication of an initial nominal value assigned to the banknote.

Some embodiments may have the advantage that the banknote can be used not only as a means of payment in cash, but that the banknote can also be used to make a cashless payment via the blockchain.

For example, the amount of money in circulation that can be transferred both cash-based and cashless is defined by the amount of money or the sum of the nominal values assigned to blockchain addresses of banknotes in the blockchain managed by the central bank. For example, the amount of money in circulation remains the same if the banknotes in circulation are retained. This means, for example, that the banknotes in circulation can remain the same, but the nominal values assigned to the individual banknotes can change as a result of transactions. For example, it would also be possible to change the money supply assigned to the banknotes without the banknotes in circulation if the central bank were to allow payment transfers from the blockchain to other systems, such as the GIRO SEPA system. To transfer money from the blockchain, for example, special blockchain addresses could be provided to which payments can only be sent and from which it is not possible to send payments. For example, these could be blockchain addresses created by the central bank, which are assigned to the central bank, for example. The corresponding blockchain addresses could also be assigned to other legal or natural persons. For example, the central bank creates the corresponding blockchain addresses, but destroys or deletes the assigned private cryptographic keys whose signatures would be necessary for transactions from the corresponding blockchain addresses. For example, an account in another system is assigned to such a blockchain address. If money is transferred to the corresponding blockchain address, the central bank transfers an identical amount to the assigned account in the other system, for example.

Money can be added to the blockchain, for example, by the central bank initializing additional banknotes or blockchain addresses assigned to the additional banknotes. Furthermore, the central bank could, for example, have one or more blockchain addresses assigned to it, which are not subject to any restrictions regarding the amount of money that can be transferred, for sending payments to other blockchain addresses. For example, the central bank sends money to a blockchain address if an identical amount has been sent to another system to a designated account of the central bank, for example with the corresponding blockchain address as the intended use.

As neither the banknote nor its blockchain address are assigned to a legal or natural person, the banknote enables, for example, both cash-based and cashless anonymous payments, which are currently only possible with cash. In order to prevent misuse, additional restrictions could be implemented in the blockchain or the underlying blockchain network, for example, which limit the amount of money that can be transferred and/or provide additional verification mechanisms for certain amounts of money and above. Corresponding verification mechanisms could, for example, require confirmation of the transaction by the central bank on the basis of a review of additional information on the corresponding transaction that has been defined as necessary.

The banknote and thus its nominal value according to the blockchain can, for example, be passed on by manual physical transfer, i.e. a digital currency can be transferred. This does not, for example, require an account in the traditional sense, i.e. an account assigned to a legal or natural person. For example, material and effort can be saved by reducing the purely analog currency. In particular, the effort involved in the physical transfer and transportation of banknotes can be reduced. For example, such a banknote can be revalued and used for direct contactless payment, with no or only limited control or tracking, as an individual banknote can be passed on at any time as in the case of classic cash.

For example, the current nominal value of the banknote is also stored in the memory of the security element. The actual nominal value of the banknote is determined by its nominal value according to the blockchain. For example, the nominal value stored in the banknote can be used to determine the current nominal value offline. For example, the nominal value stored in the banknote is updated when a transaction confirmation and/or registration confirmation signed by the central bank is forwarded to the banknote to complete a transaction. For example, the security element has a signature verification key for verifying digital signatures from the central bank.

For example, the banknote may be paper and/or plastic-based. For example, the banknote comprises one or more layers of material. The materials used for the material layers can be paper, plastics and/or metal foils, for example. A material layer can also comprise combinations of several of these materials. For example, the material layers are laminated together. In particular, the material layers can comprise electronic components, such as a security element with processor and memory, an antenna, a display, an input device and/or sensors, or form them in combination with each other. The banknote is flexible, for example.

The banknote comprises, for example, a plurality of security features that make it possible to check the authenticity and validity of the banknotes. The plurality of security features may, for example, comprise one or more level 1, level 2 and/or level 3 security features. Level 1 security features are security features that can be recognized directly by humans and checked without any further aids. Level 2 security features are machine-readable security features that are used, for example, for commercial requirements for checking the authenticity of banknotes. Level 3 security features are security features that are only known to the issuing central bank. Central banks use such secret machine-readable security features to ensure the integrity of the cash cycle and to guarantee that only genuine banknotes are put back into circulation. Furthermore, central banks use such level 3 security features to remove genuine banknotes from circulation if necessary and to destroy them in a controlled manner if the fitness for circulation of the corresponding banknotes is no longer sufficient, for example due to soiling and/or wear and tear.

The security features can comprise tactile, acoustic or visible features, for example. For example, materials such as security paper with a characteristic haptic impression and/or a characteristic sound when rubbed and/or crumpled are used for manufacturing the banknote. For example, haptically perceptible embossing is applied to the banknote. For example, visually detectable security features such as watermarks, see-through windows, see-through registers, register printing elements, foil elements, guilloches, iris printing elements, anti-copying screens, melier fibers, micro-perforations, micro-lettering, optically variable printing inks, pearlescent strips, security thread and/or special inks are used. For example, security elements such as metamerism color combinations, fluorescent colors, diffractive optical elements and/or scrambled indicia microprint patterns are used.

For example, machine-readable security elements are used, such as infra-red properties of the printing ink, phosphorescent inks, magnetic elements, elements with characteristic electrical conductivity and/or copy protection elements, such as a digital watermark and/or standardized patterns, for example a EURion constellation or Omron rings.

For example, the banknote comprises one or more security features that are known only to the issuing central bank and/or can be verified by it, i.e. Level 3 security features, such as the ECB's M feature.

Security features, in particular Level 1 and Level 2 security features, can have the advantage that they enable the parties involved to check the authenticity and validity of a banknote without much effort. This enables the banknote to be used for cash payments, which involve a transfer of the banknote from a payer to a payee.

A "blockchain" is understood here and in the following as an organized data structure that comprises a number of interlinked data blocks. In particular, a blockchain is understood to be an ordered data structure in which each of the blocks (except the first block) comprises a check value, for example a hash value, of its predecessor block and thus the validity of all its predecessor blocks can be checked and, if necessary, confirmed using each block. For examples of a blockchain, see https://en.wikipedia.org/wiki/Block_chain_ (database) and "Mastering Bitcoin", Chapter 7, The Blockchain, page 161 ff. The concept of the blockchain was described, for example, in 2008 in a white paper on Bitcoin under the pseudonym Satoshi Nakamoto ("Bitcoin: Peer-to-Peer Electronic Cash System" (https://bitcoin.org/bitcoin.pdf)). The blockchain described therein consists of a series of data blocks, in each of which one or more entries or transactions are summarized and provided with a checksum in the form of a hash value. Additional blocks of the blockchain are generated, for example, in a computationally intensive process known as mining. These additionally generated blocks are then added to the blockchain and distributed to all participants or nodes of the network via a network.

In some embodiments, the blockchain can have the advantage of offering a high degree of security against subsequent manipulation by storing cryptographic checksums, i.e. hash values, of the preceding block in each subsequent block. The chaining of the blocks can then be checked using these root hash values. Each block in the blockchain contains the hash of the entire previous block header in its header. This clearly defines the order of the blocks and creates a chain structure. The linking of the individual blocks with each other implemented in this way ensures that subsequent modification of previous blocks or individual entries is practically impossible, as the hash values of all subsequent blocks would also have to be recalculated in a short time.

A blockchain can also be implemented in the form of a blockchain, for example, wherein only a selected group of participants is authorized to add valid blocks. A corresponding authorization can be verified, for example, by means of a signature using a private cryptographic key. The private cryptographic key can belong to an asymmetric key pair, which also comprises a public cryptographic key that can be used to verify the signature. The asymmetric key pair can also be assigned a certificate, for example, which proves the authorization to create a valid block in the blockchain. This certificate can also be assigned to a PKI that proves the authenticity of the certificate. In some embodiments, for example, a public key can be stored in the blockchain in an initialization entry for further participants who are to be added to the selected group. These public keys can be used to check whether signatures of blocks and thus the corresponding blocks themselves are valid. Public keys of original participants of the selected group can, for example, be stored in a genesis block of the blockchain.

This blockchain managed by a central bank is, for example, a private or public access-restricted blockchain that is managed on the central bank's blockchain servers. For example, new blocks are entered exclusively by these blockchain servers managed by the central bank. In this case, for example, computationally intensive processes can be omitted when adding additional blocks. For example, adding additional blocks only requires a signature with a signature key assigned to the central bank.

Consensus can also be implemented in a blockchain in other ways. For example, consensus can be achieved by voting on the inclusion of proposed entries in the blockchain. For example, each participant or blockchain server maintains a unique list of other participants that it trusts as a group. Each participant can propose additional entries to be included in an additional block of the blockchain. The inclusion and thus the recognition of the validity of the proposed entries is voted on. For example, each participant only votes on those proposals that originate from participants on their list. In other words, when deciding whether a proposal for an additional entry is recognized as valid, i.e. whether there is a consensus among the participants regarding the validity of this entry, only the votes of those participants who are included in the list of the participant making the corresponding proposal are taken into account. For a proposal for an entry to be accepted as valid, a certain minimum percentage of voting participants must vote in favor, for example 80%, 90%, 95% or 100%. All proposed entries that fulfill this criterion are included in the blockchain. Such a vote can comprise several rounds. All other proposals that do not meet the aforementioned criterion are rejected or put to the vote again when the next block in the blockchain is voted on. The aforementioned lists represent subgroups of the blockchain network, which the participant leading the respective list trusts as a group as a whole, without this requiring them to trust each individual participant on the list. The Ripple Protocol Consensus Algorithm (David Schwartz et al.: "The Ripple Protocol Consensus Algorithm", Ripple Labs Inc., 2014, https://ripple.com/files/ripple_consensus_whitepaper.pdf) provides an example of such a consensus procedure.

A "communication interface" is understood here to mean, for example, an interface via which data can be received and sent, wherein the communication interface can be configured to be contact-based or contactless.

Communication can take place via a network, for example. A "network" is understood here to mean any transmission medium with a connection for communication, in particular a local connection or a local network, in particular a local area network (LAN), a private network, in particular an intranet, and a digital private network (virtual private network—VPN). For example, a computer system can have a standard radio interface for connection to a WLAN. It can also be a public network, such as the Internet. Depending on the embodiment, this connection can also be established via a mobile network.

Contactless communication with the banknote is possible using Near Field Communication (NFC), for example. This is communication based on RFID technology for the contactless exchange of data by electromagnetic induction using loosely coupled coils over short distances, for example a few centimeters. NFC can, for example, be implemented in accordance with one of the standards ISO 14443, 18092, 21481, ECMA 340, 352, 356, 362 or ETSI TS 102 190.

The communication interface of the banknote comprises, for example, an antenna for contactless communication. The antenna comprises, for example, an induction coil. The induction coil can also be configured for the external power supply of the banknote, for example by means of energy harvesting. For example, the induction coil is configured so that a terminal couples energy into the banknote.

A "processor" is understood here and in the following to mean a logic circuit that is used to execute program instructions. The logic circuit can be implemented on one or more discrete components, in particular on a chip. A processor comprises, for example, an arithmetic unit, a control unit, registers and data lines for communication with other components. In particular, a "processor" is understood to mean a microprocessor or a microprocessor system comprising several processor cores and/or several microprocessors.

A "memory" is understood here in particular to be a non-volatile memory. A "non-volatile memory" is understood here to mean, for example, an electronic memory for the permanent storage of data. A non-volatile memory can be configured as a non-changeable memory, which is also referred to as read-only memory (ROM), or as a changeable memory, which is also referred to as non-volatile memory (NVM). In particular, this can be an EEPROM, for example a flash EEPROM, referred to as flash for short. A non-volatile memory is characterized by the fact that the data stored on it is retained even after the power supply is switched off.

A "protected memory area" is defined here as an area of an electronic memory that can only be accessed, i.e. read or write access, via a processor of the security element. For example, no external access is possible to the protected memory area, i.e. data can neither be brought in from outside nor output to the outside. For example, data can be read out externally from the protected memory area via the processor. For example, data can be introduced into the protected memory area from the outside via the processor. In some embodiments, access from or via the processor coupled to the memory is only possible if a condition required for this is fulfilled. This may, for example, be a cryptographic condition, in particular successful authentication and/or a successful authorization check. Such a check can, for example, be based on an electronic signature with a signature key.

Asymmetric key pairs are used for a variety of cryptosystems and also play an important role in the signature of electronic documents. An asymmetric key pair consists of a public key, which is used to encrypt and/or decrypt data and may be passed on to third parties, and a private key, which is used to encrypt and/or decrypt data and must generally be kept secret. The public key enables anyone to encrypt data for the holder of the private key and to verify digital signatures created with the private key. A private key enables its holder to decrypt data encrypted with the public key or to create digital signatures. A signature created with a private key can be verified with the corresponding public key.

The creation of a digital signature, also referred to hereinafter simply as a "signature", is a cryptographic process in which a further data value, referred to as a "signature", is calculated for any data. A signature can, for example, be a hash value of the source data encrypted with a private cryptographic key.

A security element is understood here to mean, for example, an electronic component which comprises a processor and a memory and to which only certain predefined accesses are possible. For example, only certain data values, which are stored in certain areas of the memory, can be read out. For example, data values stored in a protected memory area cannot be read out. For example, to write a data value to the memory of the security element, a digital signature is required, the verification key of which is stored in the security element. For example, only the processor has write authorization to write data to a protected memory area.

The security element also provides, for example, cryptographic core routines in the form of cryptographic program instructions with cryptographic algorithms for signature creation and/or verification, key generation and/or random number generation and can also serve as a secure memory for cryptographic keys.

For example, at least parts of the security element are signed. Before the security element is used, it is checked whether the signature or signatures are valid. If one of the signatures is not valid, the use of the security element is blocked, for example.

For example, the security element has physically restricted access options. Furthermore, the security element can have additional measures against misuse, in particular against unauthorized access to data in the memory of the security element. For example, a security element comprises sensors for monitoring the status of the security element and its environment in order to detect deviations from normal operation, which may indicate attempts at manipulation. Corresponding sensor types comprise, for example, a clock frequency sensor, a voltage sensor and/or a light sensor. Clock frequency sensors and voltage sensors detect, for example, deviations of the clock frequency, temperature and/or voltage upwards or downwards from a predefined normal range. In particular, a security element may comprise non-volatile memories with a protected memory area.

For example, the means for protecting the security element against unauthorized manipulation comprise mechanical means that are intended, for example, to prevent the security element or its parts from being opened, or that render the security element unusable if an attempt is made to tamper with the security element, for example by causing a loss of data. For example, at least parts of the security element can be enclosed, cast and/or laminated in a material, the attempted removal of which leads to the unavoidable destruction of the corresponding parts of the security element.

The visual indication is, for example, information that is incorporated into the banknote in an optically legible form. For example, this information is printed, embossed, engraved, punched out of, cut out of or inserted into the banknote and/or a material layer of the banknote in another optically detectable manner. These visual features can be detected using an optical sensor, such as a camera.

For example, the current nominal value of the banknote can first be checked during payment processing. For example, a blockchain request for the current nominal value of the blockchain address of the banknote is used. In response to the request, the current nominal value, which is assigned to the blockchain address of the banknote, is received. To create the request, for example, the serial number of the banknote can be detected electronically, i.e., read from the banknote's memory, and/or a visual indication of the serial number can be detected using an optical sensor. For example, both can also be performed, i.e. reading from the memory and scanning the visual indication, with a subsequent comparison of the result from both detection methods. If the read serial number matches the scanned serial number, it is accepted, otherwise not. This can provide protection against manipulation of the banknote. In particular, this could prevent the insertion of a security element from another banknote with a different serial number, whose blockchain address is assigned a much lower current nominal value, in the case of a counterfeit banknote with a visual indication of a serial number whose blockchain address is assigned a high current nominal value. In the case of a cash payment with such a manipulated banknote, there would otherwise be a risk that the payee would assume a current nominal value of the bank when receiving the banknote, which is significantly higher than the actual nominal value of the banknote. The serial number of the banknote is assigned to the blockchain address of the banknote, for example in an initialization entry of the blockchain address in the blockchain.

Instead of the serial number, another identifier of the blockchain address of the banknote can also be detected and used in the manner described above. The corresponding identifier can, for example, be the public cryptographic key of the banknote, from which the blockchain address can be derived using a hash function, for example. The corresponding identifier can, for example, be the corresponding blockchain address itself.

The actual nominal value of a banknote is determined, for example, solely by the nominal value of the blockchain address assigned to the banknote. In order to be able to dispose of the nominal value assigned to the corresponding blockchain address, it is necessary to possess a real banknote with a private cryptographic key assigned to the corresponding blockchain address. in a payment procedure with the banknote, one or more security features of the banknote can also be checked before a payment request is sent in order to ensure that the banknote is genuine, i.e. authentic and valid.

For example, a decision can be made on the basis of the determined current nominal value as to whether a cash payment or a cashless payment should be made with the banknote. If the current nominal value is identical to the amount to be paid, a cash payment is made, for example, in which the banknote is handed over to the payee and ownership of it is transferred to the payee. If the current nominal value is greater than the amount to be paid, a cashless payment is made, for example. In a cashless payment, for example, a corresponding payment request is sent to the banknote for a payment in the form of a transaction of an amount to be paid from the blockchain address of the banknote to a blockchain address of a payee. The banknote can authorize this transaction with a signed transaction release.

If the current nominal value is greater than the amount to be paid, it would also be possible for a cash payment to be made and the excess amount to be repaid by the payee as change, for example in the form of cash, such as banknotes with a matching nominal value.

For example, the current nominal value can take on any positive value including zero. For example, the current nominal value can take on any value between zero and a predetermined maximum nominal value. For example, the current nominal value can take on any value greater than or equal to a predetermined minimum nominal value. For example, the current nominal value can take on any value from and including a predetermined minimum nominal value up to and including a predetermined maximum nominal value.

For example, the nominal value of the banknote may comprise a guaranteed minimum nominal value and a variable additional nominal value component. The minimum nominal value can, for example, only be paid in the form of a cash payment with the transfer of the banknote, while the variable additional nominal value portion can be used in the course of cash-based or cashless payment processing. In other words, the banknote can only be used for cashless payments where the remaining nominal value of the banknote is greater than or equal to the minimum nominal value. If the banknote is to be used to pay an amount that would result in a remaining nominal value that would be less than the minimum nominal value, a cashless payment is blocked via the blockchain, for example. A cash-based payment must therefore be made, for example, in which the banknote is handed over. If the current nominal value of the banknote is greater than the amount to be paid, the difference can be refunded by the payee, for example in the form of change.

For example, the initial nominal value of the banknote or its blockchain address is entered in the blockchain. For example, the visual design, the embedded security features and/or the format of the banknote depend on its initial nominal value. This means that banknotes with different initial nominal values differ from one another, for example in terms of their visual design, the security features and/or the format. Banknotes with an identical initial nominal value have, for example, an identical visual design, identical security features and/or formats apart from one or more banknote-individual details, such as serial number, details of the year of issue, etc.

For example, the banknote comprises a visual indication of the minimum nominal value. For example, the minimum nominal value for the banknote or its blockchain address is entered in the blockchain. For example, the visual design, the security features and/or the format of the banknote depend on its minimum nominal value. This means that banknotes with different minimum nominal values differ from each other, for example in terms of their visual design, the security features and/or the format. Banknotes with identical minimum nominal values have, for example, an identical visual design, identical security features and/or formats apart from one or more banknote-individual details, such as serial number, details of the year of issue, etc.

For example, the initial nominal value assigned to the banknote, which the banknote comprises as visual indication, is the total nominal value that is assigned to the banknote in the course of its initialization in the blockchain. For example, the total nominal value initially assigned to the banknote is the guaranteed minimum nominal value and an initial additional nominal value share. The additional nominal value portion is variable, for example, depending on the transactions that are executed using the blockchain address of the banknote. For example, the visually indicated initial nominal value is a proportion of the total nominal value that is assigned to the banknote in the course of its initialization in the blockchain. For example, the corresponding share is the minimum nominal value, wherein the actual total nominal value may initially be greater, i.e. may comprise an initial additional nominal value share. For example, the total nominal value that is assigned to the banknote in the course of its initialization in the blockchain is a minimum nominal value of the banknote, which is visually indicated on the banknote, for example. In this case, the visual indication of the initial nominal value is, for example, also a visual indication of the minimum nominal value of the banknote. For example, the minimum nominal value differs from the initial nominal value. In this case, the banknote comprises, for example, a visual indication of the minimum nominal value in addition to the visual indication of the initial nominal value.

A variable additional nominal value portion is added, or an existing variable additional nominal value portion is increased, for example, by a transaction of a corresponding amount to the blockchain address of the banknote. The transaction may originate from another blockchain address, such as a blockchain address of another banknote or the central bank. For example, the variable additional nominal value portion can be increased indefinitely. For example, the variable additional nominal value portion can be increased depending on the minimum nominal value and/or the initial nominal value. For example, a maximum permissible variable additional nominal value share is entered in the blockchain for the blockchain address of the corresponding banknote. For example, the maximum permissible variable additional nominal value of the banknote is 100%, 200%, 300%, 400%, 500%, 600%, 700%, 800%, 900% or 1000% of the minimum nominal value of the banknote. For example, in the case of a transaction to a blockchain address of a banknote, the system checks whether the transaction exceeds the maximum permissible variable additional nominal value share as a prerequisite for executing the transaction. If the maximum permissible variable additional nominal value share is not exceeded, the transaction is executed, i.e. entered in the blockchain. If the maximum permissible variable additional nominal value portion is exceeded, the transaction is not executed, i.e. not entered in the blockchain.

In some embodiments, the banknote comprises the visual indication of the serial number multiple times distributed across the banknote. Some embodiments may have the advantage that even if the banknote is partially damaged, the serial number can be detected. For example, details of the serial number are incorporated into the banknote in combination with and/or as part of several security features of the banknote. This could have the advantage that as long as there are sufficient security features to confirm the authenticity and validity of the banknote, the serial number of the banknote can be detected.

In some embodiments, the banknote comprises the visual indication of the initial nominal value and/or the minimum nominal value also distributed multiple times across the banknote. For example, indications of the initial nominal value and/or the minimum nominal value are incorporated into the banknote in combination with and/or as part of several security features of the banknote. For example, one or more of the security features of the banknote are dependent on the initial nominal value and/or the minimum nominal value of the banknote.

In some embodiments, the plurality of serial number details is distributed across the banknote in such a way as to ensure that the serial number of the banknote can be determined as long as more than 50% of the banknote is present. Some embodiments may have the advantage that in the event of a loss of part of the banknote, it can be ensured that as long as more than 50% of the banknote is present, which is a prerequisite for replacing the banknote, for example, the present more than 50% comprise the serial number of the banknote. Thus, even if the banknote is partially lost, it can be ensured that as long as the remaining part or parts of the banknote are valid, the serial number can be detected, and the current nominal value of the banknote can be determined according to the blockchain address of the banknote.

In some embodiments, a banknote-individual public cryptographic key of the asymmetric key pair of the banknote is also stored in the memory, from which the blockchain address of the banknote can be derived. In some embodiments, the blockchain address of the banknote is also stored in the memory.

In some embodiments, the banknote further comprises a visual indication of the banknote-individual public cryptographic key. In some embodiments, the banknote further comprises a visual indication of the blockchain address of the banknote.

In some embodiments, the banknote comprises a plurality of security features. Some embodiments may have the advantage that using the security features, which are for example level 1, level 2 and/or level 3 security features, it may be possible to verify the authenticity and validity of the banknote. In some embodiments, one or more security features of the plurality of security features comprise an indication of the serial number, the banknote-individual public cryptographic key and/or the blockchain address of the banknote. Some embodiments may have the advantage that the serial number, the banknote-individual public cryptographic key and/or the blockchain address of the banknote can also be detected when the corresponding one or more security features are detected. As part of the corresponding security features, the security features can be used to check not only the authenticity and validity of the banknote itself, but also the authenticity and validity of the serial number of the banknote-individual public cryptographic key and/or the blockchain address of the banknote. Thus, for example, a connection or assignment of the physical banknote and the blockchain address of the banknote secured by the corresponding security features can be provided, which can be identified, for example, using the serial number of the banknote-individual public cryptographic key and/or the blockchain address of the banknote. In some embodiments, the one or more security features comprising an indication of the serial number of the banknote-individual public cryptographic key and/or the blockchain address of the banknote are, for example, level 1, level 2 and/or level 3 security features.

In some embodiments, the banknote comprises the visual indication of the public cryptographic key and/or the blockchain address distributed multiple times across the banknote. Some embodiments may have the advantage that even if the banknote is partially compromised, the public cryptographic key and/or the blockchain address can be detected. For example, details of the public cryptographic key and/or the blockchain address are incorporated into the banknote in combination with and/or as part of several security features of the banknote. This could have the advantage that as long as there are sufficient security features to confirm the authenticity and validity of the banknote, the public cryptographic key and/or the blockchain address of the banknote can be detected.

In some embodiments, the plurality of public cryptographic key and/or blockchain address details are distributed across the banknote such that it can be ensured that the public cryptographic key and/or blockchain address of the banknote can be determined as long as more than 50% of the banknote is present. Some embodiments may have the advantage that in the event of a loss of part of the banknote, it can be ensured that as long as more than 50% of the banknote is present, which is, for example, a prerequisite for replacing the banknote, the present more than 50% comprises the public cryptographic key and/or the blockchain address of the banknote. Thus, even if the banknote is partially lost, it can be ensured that as long as the remaining part or parts of the banknote are valid, the public cryptographic key and/or the blockchain address can be detected and the current nominal value of the banknote can be determined according to the blockchain address of the banknote.

In some embodiments, the banknote creates the transaction release using the payment request information. Some embodiments may have the advantage that the banknote can take the corresponding information directly from the payment request. In some embodiments, the payment request comprises the complete transaction details, which the banknote signs as a transaction release. In addition to the amount to be paid and the blockchain address of the payee, the complete transaction details comprise, for example, the blockchain address of the banknote.

In some embodiments, the public cryptographic key of the banknote is provided by the banknote to derive the blockchain address of the banknote for the payment request. In some embodiments, the public cryptographic key of the banknote is provided as a visual indication for reading, in particular machine reading. For example, the visual indication comprises an alphanumeric string, a bar code, or a QR code of the public cryptographic key. In some embodiments, the public cryptographic key is sent from the banknote to the originator of the payment request. The sending occurs, for example, in response to a request for the public cryptographic key. Some embodiments may have the advantage that the blockchain address of the banknote that can be derived from the public cryptographic key can be provided to create the payment request without the need for an entity other than the banknote.

In some embodiments, the blockchain address of the banknote is provided by the banknote for the payment request. In some embodiments, the blockchain address of the banknote is provided as visual indication for reading, in particular machine reading. For example, the visual indication comprises an alphanumeric character string, a bar code or a QR code of the blockchain address of the banknote. In some embodiments, the blockchain address of the banknote is sent from the banknote to the issuer of the payment request. The sending takes place, for example, in response to a request for the blockchain address of the banknote. Some embodiments may have the advantage that the blockchain address of the banknote can be provided to create the payment request without the need for an entity other than the banknote.

In some embodiments, the banknote comprises a communication interface for communicating with a terminal. The banknote receives the payment request from the terminal via the communication interface and/or sends the signed transaction release to the terminal via the communication interface. The terminal may, for example, be a terminal of a seller at a point of sale (PoS), i.e. at the place where a sale is made. The terminal can also be a terminal that is connected to a user computer system via which a payment is to be processed with the banknote. For example, this may involve payment processing via a network, such as the Internet, to a service provider, be it a seller or a payment service provider. The terminal could also be provided in the form of a user's mobile portable communication device, such as a smartphone. For example, the user could use the mobile portable communication device to process a payment over a network, such as the Internet, to a service provider, be it a vendor or a payment service provider.

In some embodiments, the banknote comprises a user interface for communicating with a user of the banknote, wherein the banknote receives the payment request from a user via an input device of the user interface and/or sends the signed transaction release to the user interface for issuance via a display device of the user interface. Some embodiments may have the advantage that the user can see and/or control which data is entered into the banknote and which data the banknote outputs.

The input device may, for example, comprise a touch pad. The display device can, for example, comprise a display. The input device can be combined with the display device, for example in the form of a touch display. The user enters the payment request data in banknotes, for example, using the input device.

For example, the payment request and/or the transaction release is displayed to the user on the display device of the banknote. Confirmation of the displayed payment request and/or transaction release by the user using the input device of the banknote is, for example, a prerequisite for generating and/or signing the transaction release.

For example, the signed transaction release is sent to the display device of the banknote for display, for example as an alphanumeric character string, bar code or QR code. The signed transaction release displayed on the display device can, for example, be scanned or read using an optical sensor, such as a sensor on a terminal.

In some embodiments, a current nominal value of the banknote is also stored in the memory of the security element. Some embodiments may have the advantage that the current nominal value can be read from the banknote. For example, the actual binding nominal value of the banknote is determined by the blockchain using the current nominal value stored under the blockchain address of the banknote, i.e. the current nominal value resulting from the balance of transactions stored in the blockchain using the blockchain address of the banknote.

For example, the current nominal value is stored in the protected memory area of the memory of the security element. For example, the current nominal value is not stored in the protected memory area of the memory of the security element. For example, the current nominal value of the banknote stored in the memory of the security element can be read externally. For example, the current nominal value of the banknote stored in the memory of the security element cannot be read from the outside. For example, the current nominal value of the banknote stored in the memory of the security element is used solely for an internal check, such as whether an amount to be paid is less than or equal to the current nominal value of the banknote.

In some embodiments, the serial number of the banknote is also stored in the memory of the security element.

In some embodiments, the initial nominal value of the banknote is initially stored as the current nominal value in the memory of the security element. Some embodiments may have the advantage that, based on this initial nominal value, the stored nominal value is adjusted for each successfully processed payment and thus the current nominal value can be tracked on the banknote side.

In some embodiments, the processor is further configured to compare the amount to be paid with the stored current nominal value of the banknote when executing the program instructions and to create the signed transaction release for authorizing the transaction only under the condition that the stored current nominal value is greater than or equal to the amount to be paid. Some embodiments may have the advantage of ensuring that the current nominal value is sufficient for the payment to be executed.

In some embodiments, the processor is further configured to perform, upon execution of the program instructions, an update procedure for updating the stored current nominal value of the banknote. The updating procedure comprises:

receiving an update request for updating the current nominal value of the banknote stored in the memory of the security element, wherein the update request comprises an updated nominal value of the banknote together with a cryptographically secured confirmation from the central bank of issue for the updated nominal value, verifying the cryptographically secured confirmation using a cryptographic verification key stored in the memory of the security element, in the case of a successful check, replacing the current nominal value of the banknote stored in the memory of the security element with the received updated nominal value.

Some embodiments may have the advantage of ensuring that the stored nominal value is updated. In some embodiments, the cryptographic verification key is a cryptographic verification key stored in the memory of the security element in addition to the asymmetric key pair of the banknote, for example a public cryptographic key of an asymmetric key pair assigned to the central bank. The signature verification key is, for example, stored in the security element during the manufacturing of the banknote.

In some embodiments, the update request is received in response to sending the signed transaction release. For example, the central bank's confirmation of the updated nominal value is a transaction confirmation from the central bank, in particular a confirmation of an entry of the transaction in the blockchain. For example, the updated nominal value is the previous nominal value of the banknote minus the amount paid.

In some embodiments, the update request is made in response to a transaction of an additional amount to the blockchain address of the banknote. For example, the updated nominal value is the previous nominal value of the banknote plus the additional amount.

Some embodiments may have the advantage that changes to the nominal value in the course of a transaction of an additional amount to the blockchain address of the banknote are also taken into account.

Some embodiments comprise a method of issuing a banknote. The issuing process comprises:

Manufacturing the banknote, wherein the banknote further comprises a security element comprising a processor and a memory with program instructions, generating a banknote-individual asymmetric key pair with a private and a public cryptographic key by the banknote, storing the generated banknote-individual asymmetric key pair in the memory by the banknote, wherein the private cryptographic key is stored in a protected memory area of the memory, outputting the generated public cryptographic key by the banknote for initializing a banknote-individual blockchain address derived from the public cryptographic key by a central bank issuing the banknote and/or a manufacturing company of the banknote in a blockchain, wherein the initial nominal value is assigned to the blockchain address of the banknote in the course of the initialization.

In some embodiments, the manufactured banknote comprises, for example, a visual indication of a serial number that uniquely identifies the banknote. In some embodiments, the manufactured banknote comprises, for example, a visual indication of an initial nominal value assigned to the banknote.

Some embodiments may have the advantage that the banknote or the banknote body is manufactured or printed. In addition to visual indication and security elements, such as those also found on known banknotes, the banknote also comprises, for example, a security element with a processor and a memory with program instructions. These program instructions comprise, for example, cryptographic program instructions for generating a banknote-individual asymmetric key pair with a private and a public cryptographic key by the banknote. In order for the banknote to be valid, it must be entered into the blockchain, for example. For this purpose, a banknote-individual blockchain address is derived from the public cryptographic key. This derivation can be carried out by the banknote itself and/or by an external computer system, for example a central bank computer system, which manages the blockchain. In the course of initialization of the blockchain address of the banknote by the issuing central bank, for example, an initial nominal value assigned to the banknote or the serial number of the banknote is entered into the blockchain. This entry can be made, for example, in the form of a transaction with the corresponding amount and possibly further information from a blockchain address of the central bank to the blockchain address of the banknote. The further information comprises, for example, the serial number of the banknote, a minimum nominal value of the banknote and/or an additional nominal value portion of the banknote. Alternatively, the initial nominal value could also be assigned to the blockchain address by means of an entry by the central bank, e.g. an entry signed by the central bank, which comprises the blockchain address, the initial nominal value and/or further information relating to the banknote initialized by the entry. The further information comprises, for example, the serial number of the banknote, a minimum nominal value of the banknote and/or an additional nominal value portion of the banknote.

In some embodiments, the issuing method is configured to issue or manufacture each of the previously described embodiments of the banknote. In some embodiments, the banknote issued using the issuing method is a banknote according to one of the embodiments described above.

In some embodiments, the method further comprises sending a manufacturing confirmation to the issuing central bank to confirm the manufacturing of the banknote. The manufacturing confirmation comprises the serial number and the public cryptographic key of the manufactured banknote for initializing a banknote-individual blockchain address derived from the public cryptographic key by the issuing central bank in the blockchain. In some embodiments, the manufacturing confirmation further comprises an indication of an initial nominal value and/or a minimum nominal value of the banknote.

Some embodiments may have the advantage that the central bank is provided with all the information required to initialize the banknote in the blockchain by the manufacturing confirmation. Alternatively or additionally, information characterizing the banknote is confirmed to the central bank by the manufacturing confirmation. For example, the central bank specifies in an order to a banknote manufacturer which serial numbers are to be used for manufacturing banknotes with which initial nominal values and/or minimum nominal values. The manufacturing confirmation confirms to the central bank which banknotes with which serial numbers and which initial nominal values and/or minimum nominal values have actually been manufactured.

In some embodiments, the initialization comprises registering the blockchain address of the banknote by means of an initialization or registration entry of the issuing central bank in the blockchain. In some embodiments, the registration entry comprises the blockchain address of the banknote and the initial nominal value assigned to the banknote. In some embodiments, the registration entry is signed using a private cryptographic key of the issuing central bank. In some embodiments, the registration entry has the form of a transaction of the initial nominal value from the issuing central bank, for example from a blockchain address assigned to the central bank, to the blockchain address of the banknote. In some embodiments, the registration entry comprises the serial number of the banknote. In some embodiments, an assignment of the serial number of the banknote to the blockchain address of the banknote and/or the public key of the banknote is stored in an additional register of the issuing central bank, wherein the serial number serves as a database access key for reading the blockchain address and/or the public key of the banknote.

In some embodiments, the banknote is manufactured upon receipt of an order from a central bank issuing the banknote. In some embodiments, an indication of the predefined range of serial numbers is received. In some embodiments, an indication of the initial nominal value and/or minimum nominal value intended for the banknote is received.

Some embodiments comprise a method of using a banknote. The banknote comprises a security element with a processor and a memory. A banknote-individual private cryptographic key of an asymmetric key pair of the banknote is stored in a protected memory area of the memory. The asymmetric key pair is assigned to a banknote-individual blockchain address of a blockchain managed by a central bank issuing the banknote.

The processor is configured to execute a payment procedure with the banknote when the program instructions are executed. The payment procedure comprises:
- receiving a payment request for a payment with the banknote in the form of a transaction of an amount to be paid from the blockchain address of the banknote to a blockchain address of a payee, wherein the payment request specifies the amount to be paid and the blockchain address of the payee,
- Signing the transaction release with the private cryptographic key of the banknote, wherein the transaction release comprises the blockchain address of the banknote, the blockchain address of the payee and the amount to be paid,
- sending the signed transaction release.

In some embodiments, a further transaction-individual value is also sent together with the signed transaction release. For example, the further transaction-individual value is comprised in the signature of the transaction release and/or attached to the signed transaction release. The further transaction-individual value is, for example, a timestamp and/or a random number.

In some embodiments, the banknote comprises, for example, a visual indication of a serial number uniquely identifying the banknote. In some embodiments, the banknote comprises, for example, a visual indication of an initial nominal value assigned to the banknote.

Some embodiments may have the advantage that the banknote, as described above, can be used not only for a cash payment, but also for a cashless payment.

In some embodiments, the banknote used for payment is a banknote according to one of the embodiments described above.

In some embodiments, the memory further stores a banknote-individual public cryptographic key of the asymmetric key pair of the banknote, from which the blockchain address of the banknote can be derived. In some embodiments, the blockchain address of the banknote is also stored in the memory. Embodiments may have the advantage that the banknote has the blockchain address and/or can derive it.

In some embodiments, the banknote further comprises a visual indication of the banknote-individual public cryptographic key. In some embodiments, the banknote further comprises a visual indication of the blockchain address of the banknote. If the banknote comprises a visual indication of the banknote-individual public cryptographic key and/or the blockchain address of the banknote, the banknote-individual asymmetric key pair is generated, for example, in the course of manufacturing of the banknote, so that the banknote-individual public cryptographic key and/or the blockchain address of the banknote can be printed on the banknote or otherwise incorporated into the banknote in the course of manufacturing, for example. Alternatively or additionally, the banknote may comprise a display device on which the banknote-individual public cryptographic key and/or the blockchain address of the banknote stored in the memory of the security element can be displayed as a visual indication.

In some embodiments, the banknote creates the transaction release using the payment request information. In some embodiments, the payment request comprises the complete transaction details, which the banknote signs as the transaction release.

In some embodiments, the public cryptographic key of the banknote is provided by the banknote to derive the blockchain address of the banknote for the payment request. In some embodiments, the public cryptographic key of the banknote is provided as a visual indication for reading. In some embodiments, the banknote public cryptographic key is sent by the banknote.

In some embodiments, the blockchain address of the banknote is provided by the banknote for the payment request. In some embodiments, the blockchain address of the banknote is provided as a visual indication for reading. In some embodiments, the blockchain address of the banknote is sent by the banknote.

In some embodiments, the banknote comprises a communication interface for communicating with a terminal. The banknote receives the payment request from the terminal via the communication interface and/or sends the signed transaction release to the terminal via the communication interface.

In some embodiments, the banknote comprises a user interface for communicating with a user of the banknote, wherein the banknote receives the payment request from a user via an input device of the user interface and/or sends the signed transaction release to the user interface for issuance via a display device of the user interface.

Some embodiments comprise a payment processing method using a terminal. Payment is made with a banknote comprising a communication interface for communicating with the terminal and a security element comprising a processor and a memory. A banknote-individual private cryptographic key of an asymmetric key pair of the banknote is stored in a protected memory area of the memory. The asymmetric key pair is assigned to a banknote-individual blockchain address of a blockchain managed by a central bank issuing the banknote. The terminal comprises a processor, a memory and a communication interface for communicating with the banknote.

The method for processing a payment transfer through the terminal comprises:
- Sending a payment request to the banknote in the form of a transaction of an amount to be paid from the blockchain address of the banknote to a blockchain address of a payee, the payment request specifying the amount to be paid and the blockchain address of the payee, Receiving a transaction release signed with the private cryptographic key of the banknote, the transaction release comprising the blockchain address of the banknote, the blockchain address of the payee and the amount to be paid, forwarding the signed transaction release of the banknote to a blockchain server of the blockchain for verification and entry of the transaction into the blockchain, upon successful verification of the signed transaction release, receiving a first transaction confirmation.

In some embodiments, a further transaction-individual value is also received together with the signed transaction release. For example, the further transaction-individual value is comprised in the signature of the transaction release and/or attached to the signed transaction release. The further transaction-individual value is, for example, a timestamp and/or a random number.

In some embodiments, the banknote comprises, for example, a visual indication of a serial number that uniquely identifies the banknote. In some embodiments, the banknote comprises, for example, a visual indication of an initial nominal value assigned to the banknote.

Some embodiments may have the advantage of enabling cashless payment processing via a terminal. In some embodiments, the banknote used for payment processing is a banknote according to one of the embodiments described above.

Some embodiments may have the advantage that the central bank, in addition to its role as the institution issuing the banknote, additionally provides services in the field of payment transactions or payment processing to the banknote and/or the terminal or a payee using the banknote and thus acts as a traditional bank or a commercial bank.

A central bank is understood here to be a national or supranational institution that has the monopoly right to issue coins and banknotes as legal tender. A central bank can also perform monetary and currency policy tasks. For example, a central bank holds the currency reserve of a currency area, for example it regulates the money supply, for example it influences the creation of money by granting loans to commercial banks and/or refinances these commercial banks and the state. For example, the central bank issues banknotes and puts them into circulation.

The terminal may, for example, be a terminal of a seller at a point of sale (PoS), i.e. at the place where a sale is made. The terminal can also be a terminal that is connected to a user computer system via which a payment is to be processed with the banknote. For example, this may involve payment processing via a network, such as the Internet, to a service provider, be it a seller or a payment service provider. The terminal could also be provided in the form of a user's mobile portable communication device, such as a smartphone. For example, the user could use the mobile portable communication device to process a payment over a network, such as the Internet, to a service provider, be it a seller or a payment service provider.

In some embodiments, verifying the signed transaction release comprises verifying the signature of the transaction release and verifying that a current nominal value of the banknote assigned to the blockchain address of the banknote is greater than or equal to the amount to be paid. Some embodiments may have the advantage that an effective check can be carried out. For example, the transaction can be confirmed before the transaction is entered into the blockchain. This may be the case, for example, if it is ensured that no other preceding transactions from the blockchain address of the banknote are in a queue for entry into the blockchain and/or the confirmation is made subject to the requirement that further preceding transactions from the blockchain address of the banknote may be in a queue for entry into the blockchain.

In some embodiments, the first transaction confirmation is a preliminary transaction confirmation in which the current nominal value of the banknote is checked using a register which is updated at regular intervals and which comprises a current nominal value for each of the blockchain addresses of the blockchain, which results from the balances of the transactions stored in the blockchain using the corresponding blockchain addresses. The first transaction confirmation is accepted as sufficient transaction confirmation if the amount to be paid does not exceed a threshold value.

Some embodiments can have the advantage that a quick check of the current nominal value of the banknote can be carried out without first having to calculate the complete balance of transactions stored in the blockchain using the corresponding blockchain addresses.

For example, a decision can also be made on the basis of the determined current nominal value as to whether a cash or cashless payment should be made with the banknote. If the current nominal value is identical to the amount to be paid, a cash payment is made, for example, in which the banknote is handed over to the payee and ownership of it is transferred to the payee. If the current nominal value is greater than the amount to be paid, a cashless payment is made, for example, in which a corresponding payment request for a payment in the form of a transaction of an amount to be paid is sent from the blockchain address of the banknote to a blockchain address of a payee to the banknote. The banknote can authorize this transaction with a signed transaction release.

If the current nominal value is greater than the amount to be paid, it would also be possible for a cash payment to be made and the excess amount to be repaid by the payee as change, for example in the form of cash.

For example, the nominal value of the banknote can also comprise a guaranteed minimum nominal value and a variable additional nominal value component. The minimum nominal value can, for example, only be paid in the form of a cash payment with the transfer of the banknote, while the variable additional nominal value portion can be used in the course of cash-based or cashless payment processing. In other words, the banknote can only be used for cashless payments where the remaining nominal value of the banknote is greater than or equal to the minimum nominal value. If the banknote is to be used to pay an amount that would result in a remaining nominal value that would be less than the minimum nominal value, a cashless payment is blocked via the blockchain, for example. A cash-based payment must therefore be made, for example, in which the banknote is handed over. If the current nominal value of the banknote is greater than the amount to be paid, the difference can be refunded by the payee, for example in the form of change.

For example, the register used for preliminary transaction confirmation further comprises an indication of the minimum nominal value of the banknote with the corresponding blockchain address.

In some embodiments, the first transaction confirmation is not accepted as sufficient if the amount to be paid exceeds the threshold value. A second transaction confirmation is received that confirms an entry of the transaction into the blockchain, which is accepted as sufficient. Some embodiments may have the advantage that it can be safely assumed that the transaction was successful if the transaction was actually entered into the blockchain.

In some embodiments, the public cryptographic key is further received. For example, the public cryptographic key is received before the payment request is sent. For example, the public cryptographic key is scanned or read in as visual indication provided by the banknote. For example, the public cryptographic key is received from the banknote in response to a request sent to the banknote. Some embodiments may have the advantage that the public cryptographic key can be used by the terminal to derive the blockchain address of the banknote. The derived blockchain address of the banknote or the public cryptographic key may be sent to the banknote as part of the payment request. For example, the payment request may comprise the full transaction details, which only need to be signed by the banknote to create the signed transaction confirmation.

In some embodiments, receiving the public cryptographic key comprises reading the visual indication of the public cryptographic key using a sensor of the terminal. For example, the visual indication comprises an alphanumeric string, a bar code, or a QR code of the public cryptographic key. In some embodiments, receiving the public cryptographic key comprises receiving the public cryptographic key sent using the communication interface of the banknote using the communication interface of the terminal.

In some embodiments, the payment processing method further comprises deriving the blockchain address of the banknote from the public cryptographic key of the banknote. The payment request comprises, for example, the complete transaction details with the blockchain address derived from the public cryptographic key of the banknote, which the banknote signs as a transaction release.

In some embodiments, the banknote comprises a plurality of security features. For example, as a prerequisite for sending the payment request, the method comprises successfully detecting and validating one or more predefined security features of the plurality of security features of the banknote. For example, as a prerequisite for forwarding the signed transaction release of the banknote, the method comprises successfully detecting and validating one or more predefined security features of the multiple security features of the banknote. Some embodiments may have the advantage that the security features can be used to check the authenticity and validity of the banknote.

In some embodiments, the method comprises as a prerequisite for sending the payment request
  detecting an identifier that uniquely identifies the blockchain address of the banknote, wherein the detected identifier is one of the following: the serial number of the banknote, the public cryptographic key of the banknote, the blockchain address of the banknote,
  sending a blockchain request for the current nominal value of the banknote's blockchain address,
  receiving the current nominal value of the banknote's blockchain address,
  checking whether the received current nominal value is greater than or equal to the amount to be paid, wherein sending the payment request to the banknote is performed upon a successful check.

Some embodiments may have the advantage of ensuring that the current nominal value assigned to the banknote is greater than or equal to the amount to be paid. In other words, it can be ensured that the banknote actually has sufficient value to pay the amount to be paid.

In some embodiments, detecting the identifier comprises reading a visual indication of the identifier comprised by the banknote using a sensor of the terminal. The sensor is, for example, an optical sensor. In some embodiments, detecting the identifier comprises receiving the identifier transmitted using the communication interface of the banknote using the communication interface of the terminal. For example, the identifier is stored in the memory of the security element.

In some embodiments, the received current nominal value of the banknote is a nominal value of the blockchain address of the banknote read from the register. The register is updated at regular intervals and comprises a current nominal value for each of the blockchain addresses of the blockchain, which is derived from the balances of the transactions stored in the blockchain using the corresponding blockchain addresses. In some embodiments, the received current nominal value of the banknote is a nominal value of the blockchain address of the banknote read from the blockchain. The read-out current nominal value of the banknote results, for example, from the balance of the transactions stored in the blockchain involving the blockchain address of the banknote.

Some embodiments can have the advantage that a current nominal value can be determined efficiently. For example, it is not necessary to first calculate the complete balances of the transactions stored in the blockchain using the corresponding blockchain addresses.

In some embodiments, a plurality of banknotes is received. The identifiers of the blockchain addresses of the banknotes are detected, for example serial numbers, public cryptographic keys and/or the blockchain addresses themselves, and a current nominal value is determined for each of the banknotes using a blockchain request for the banknotes according to the assigned blockchain addresses. From the plurality of banknotes received, a set of banknotes is selected and retained whose summed current nominal values result in an amount that is less than an amount to be paid. Any remaining difference between the amount to be paid and the summed amount of the set of selected banknotes is less than a current nominal value of another banknote of the plurality of banknotes that is not included in the set of selected banknotes. The payment request is sent to the further banknote to pay the difference.

Some embodiments may have the advantage that a combination of cash-based and cashless payment could be enabled. For the retained set of banknotes, there is no need for transaction authorizations and/or entries of corresponding transactions into the blockchain. Rather, payment with these banknotes is made by handing over the banknotes, as is usual for cash payments. If the amount to be paid does not add up, i.e. the sum of the nominal values of the banknotes of the retained set of banknotes is less than the amount to be paid and there is no other banknote whose nominal value corresponds to the difference amount, the payment of the difference amount is made cashless using another banknote whose nominal value is greater than the corresponding difference value. Alternatively, the difference can also be paid by retaining the additional banknote and refunding the excess amount paid. For example, by a transaction from a blockchain address of the payee to a blockchain address of a non-withheld banknote, which remains the property of the payer. In some embodiments, all non-withheld banknotes are returned.

In some embodiments, the banknotes of the plurality of banknotes each comprise a plurality of security features. For example, the method comprises a validity check for each of the banknotes. The validation of the banknotes comprises, for example, successfully detecting and validating one or more predefined security features of the plurality of security features of the respective banknote. Some embodiments may have the advantage that the authenticity and validity of all banknotes can be ensured, in particular the retained banknotes.

Some embodiments comprise a method for determining a current nominal value of a banknote using a terminal. The banknote comprises a communication interface for communicating with the terminal and a security element with a processor and a memory. A banknote-individual private cryptographic key of an asymmetric key pair of the banknote is stored in a protected memory area of the memory. The asymmetric key pair is assigned to a banknote-individual blockchain address of a blockchain managed by a central bank issuing the banknote. The terminal comprises a processor, a memory and a communication interface for communicating with the banknote.

Determining the current nominal value by the terminal comprises:
  detecting an identifier that uniquely identifies the blockchain address of the banknote, wherein the detected identifier is one of the following: the serial number of the banknote, the public cryptographic key of the banknote, the blockchain address of the banknote,
  sending a blockchain request for the current nominal value of the banknote's blockchain address,
  receiving the current nominal value of the blockchain address of the banknote.

In some embodiments, the banknote comprises, for example, a visual indication of a serial number uniquely identifying the banknote. In some embodiments, the banknote comprises, for example, a visual indication of an initial nominal value assigned to the banknote.

Some embodiments may have the advantage that the terminal can use the identifier, such as the serial number, the public cryptographic key or the blockchain address itself, to determine the current nominal value of the banknote. For this purpose, the banknote comprises, for example, visual details of the corresponding identifier and/or reads this from the security element. Using the serial number can have the advantage that the serial number can be available independently of the generation of the public cryptographic key of the banknote and thus the blockchain address of the banknote. This means that the serial number can be printed on the banknote and/or otherwise incorporated into the banknote before the banknote's asymmetric cryptographic key pair is generated. This makes it possible to first complete the manufacturing of the banknote and then generate the asymmetric cryptographic key pair of the banknote. Otherwise, for example, the asymmetric cryptographic key pair of the banknote is generated by the security element before or at the beginning of the manufacturing of the banknote and the public cryptographic key and/or the blockchain address derived therefrom is provided for use in the manufacturing of the banknote. For example, the public cryptographic key is generated by the security element before or at the beginning of the manufacturing of the banknote. The generated public cryptographic key is assigned, for example, to the serial number of the banknote to be manufactured, wherein the security model is assigned to the serial number of the banknote to be manufactured.

In some embodiments, detecting the identifier comprises reading a visual indication of the identifier using a sensor of the terminal. In some embodiments, detecting the identifier comprises receiving the identifier transmitted using the communication interface of the banknote using the communication interface of the terminal.

For example, the current nominal value is determined in the course of a cash-based payment transaction with the transfer of the corresponding banknote in order to determine the actual value and thus the amount of money actually transferred on a cash basis.

In some embodiments, the current nominal value of the banknote received is a nominal value of the blockchain address of the banknote read from the register. The register is updated at regular intervals and comprises a current nominal value for each of the blockchain addresses of the blockchain, which is derived from the balances of the transactions stored in the blockchain using the corresponding blockchain addresses. In some embodiments, the received current nominal value of the banknote is a nominal value of the blockchain address of the banknote read from the blockchain. The read-out current nominal value of the banknote results, for example, from the balance of the transactions stored in the blockchain involving the blockchain address of the banknote.

In some embodiments, the banknote whose current nominal value is determined is a banknote according to one of the embodiments described above.

Some embodiments comprise a method for replacing a banknote. The banknote comprises a visual indication of a serial number uniquely identifying the banknote and an initial nominal value assigned to the banknote. The banknote comprises the visual indication of the serial number distributed multiple times across the banknote. The banknote comprises a plurality of security features distributed across the banknote: The banknote comprises a security element with a processor and a memory with program instructions. A banknote-individual private cryptographic key of an asymmetric key pair of the banknote is stored in a protected memory area of the memory. The asymmetric key pair is assigned to a banknote-individual blockchain address in a blockchain managed by a central bank issuing the banknote. The banknote is also damaged.

Replacing the banknote by the central bank issuing the damaged banknote comprises
  checking a degree of damage to the banknote,
  if the degree of damage of the banknote does not exceed a predefined maximum permissible degree of damage, detecting an identifier that uniquely identifies the blockchain address of the damaged banknote, wherein the detected identifier is one of the following: the serial number of the damaged banknote, the public cryptographic key of the damaged banknote, the blockchain address of the damaged banknote,
  initializing a block on the blockchain address of the banknote using the detected identifier,
  sending a blockchain request for the current nominal value of the blockchain address of the damaged banknote,
  receiving the current nominal value of the blockchain address of the damaged banknote,
  paying out the current nominal value of the damaged banknote.

Some embodiments may have the advantage that the actual nominal value of the banknote can be replaced in the event of damage. This actual nominal value can deviate significantly from the initial nominal value of the banknote and/or a minimum nominal value of the banknote. In some embodiments, for the degree of damage of the banknote not to exceed a predefined maximum permissible degree of damage, it is necessary that more than 50% of the banknote is present and/or the banknote comprises one or more valid security features necessary for replacement.

In some embodiments, the replaced banknote is a banknote according to one of the embodiments described above. In some embodiments, the damaged banknote is retained.

In some embodiments, paying out the current nominal value of the damaged banknote comprises providing one or more banknotes as a replacement, the current nominal values of which correspond in total to the current nominal value of the damaged banknote. In some embodiments, the one or more banknotes as replacements are banknotes according to one of the embodiments described above. In some embodiments, paying out the current nominal value of the damaged banknote comprises entering a transaction of an amount equal to the current nominal value from a blockchain address of the central bank issuing the damaged banknote to a blockchain address specified by an owner of the damaged banknote. For example, the specified blockchain address is assigned to another banknote of the holder, i.e. owner, of the damaged banknote, to the owner of the damaged banknote personally or to another institution chosen by the owner of the damaged banknote.

In some embodiments, the damage comprises damage to the security element such that the security element can no longer provide signed transaction releases. For example, the processor, the memory and/or a communication interface of the security element is damaged. For example, the security element is missing.

In some embodiments, the plurality of details of the identifier is distributed across the banknote in such a way that it can be ensured that the identifier and thus the blockchain address of the banknote can be determined as long as more than 50% of the banknote is present. In some embodiments, the plurality of security elements is distributed across the banknote in such a way that it can be ensured that valid security features necessary for replacement are present as long as more than 50% of the banknote is undamaged.

In some embodiments, the replacement of the banknote by the central bank issuing the damaged banknote further comprises a blocking entry in the blockchain by the central bank managing the blockchain and issuing the banknote. The blocking entry blocks the corresponding blockchain address. The blocking entry indicates, for example, that the blockchain address of the banknote is invalid. In the case of a blocking entry for the blockchain address of the banknote by the central bank, it can be ensured, for example, that no money can be transferred from the invalid blockchain address to another blockchain address, i.e. that no payments can be sent, and/or that no money can be transferred from another blockchain address to the invalid blockchain address, i.e. that no payments can be received.

Some embodiments could have the advantage that when the banknote is replaced, the processor and/or the security element of the damaged banknote is not retained, and payments can continue to be made with it after the (last) current nominal value of the damaged banknote has been paid out, i.e. signed transaction confirmations can be issued. It is also possible, for example, to prevent payments from being inadvertently made to the blockchain address of the damaged banknote after the (last) current nominal value has already been paid out and the damaged banknote has been retained. In this case, for example, there would no longer be any way of accessing the accidentally transferred money.

For example, when a transaction is carried out from a blockchain address of a banknote, the system checks whether the corresponding blockchain address is blocked as a prerequisite for executing the transaction. If the blockchain address is not blocked, the transaction is executed, i.e. entered into the blockchain. If the blockchain address is blocked, the transaction is not executed, i.e. not entered into the blockchain.

For example, for a transaction to a blockchain address of a banknote, the system checks whether the corresponding blockchain address is blocked as a prerequisite for executing the transaction. If the blockchain address is not blocked, the transaction is executed, i.e. entered into the blockchain. If the blockchain address is blocked, the transaction is not executed, i.e. not entered into the blockchain.

Figure 2:
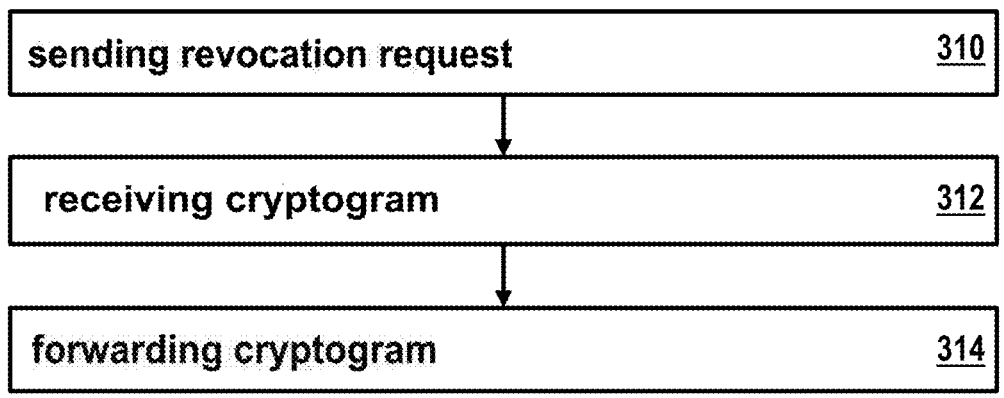
Figure 3:
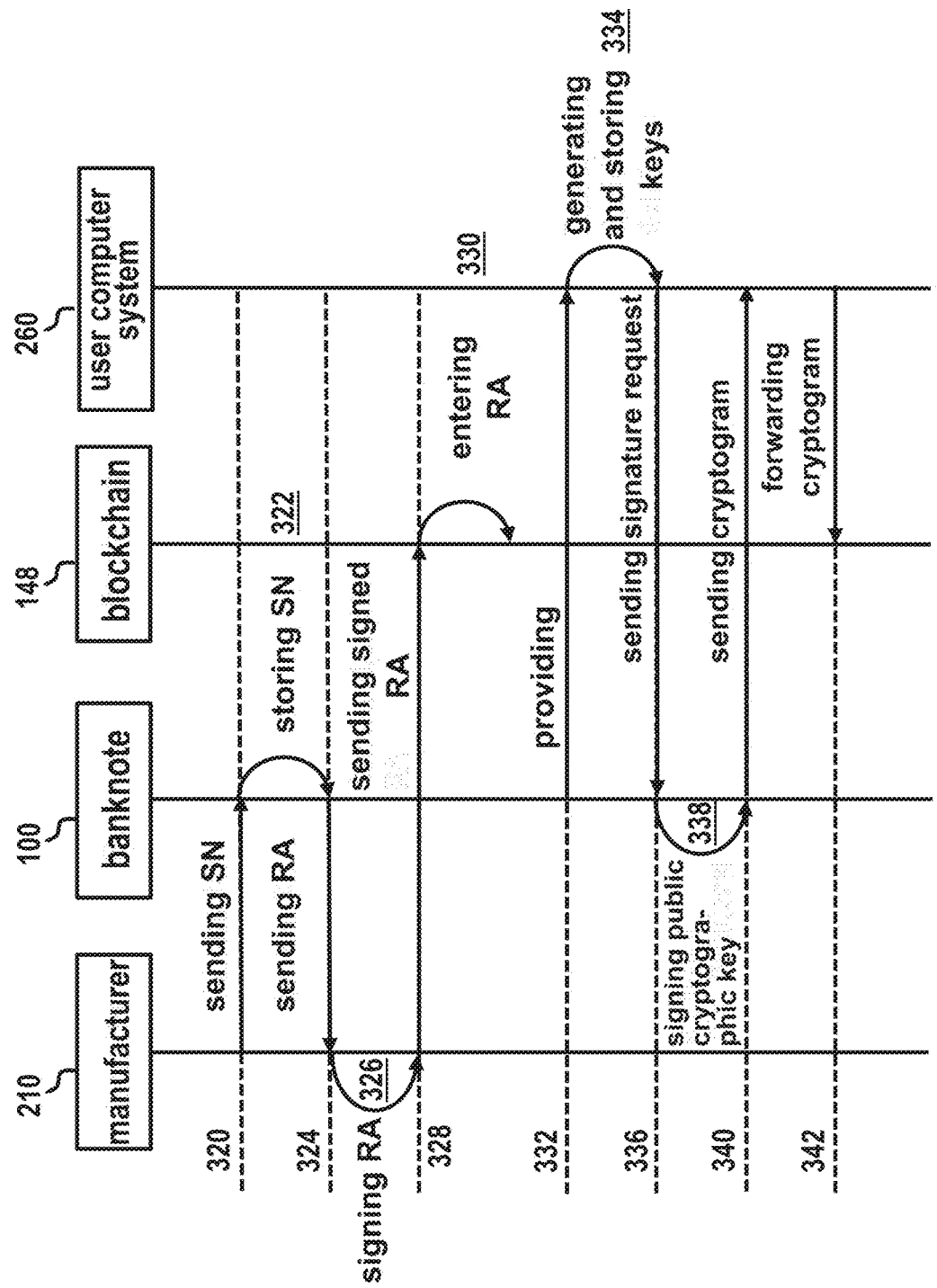
Figure 4:
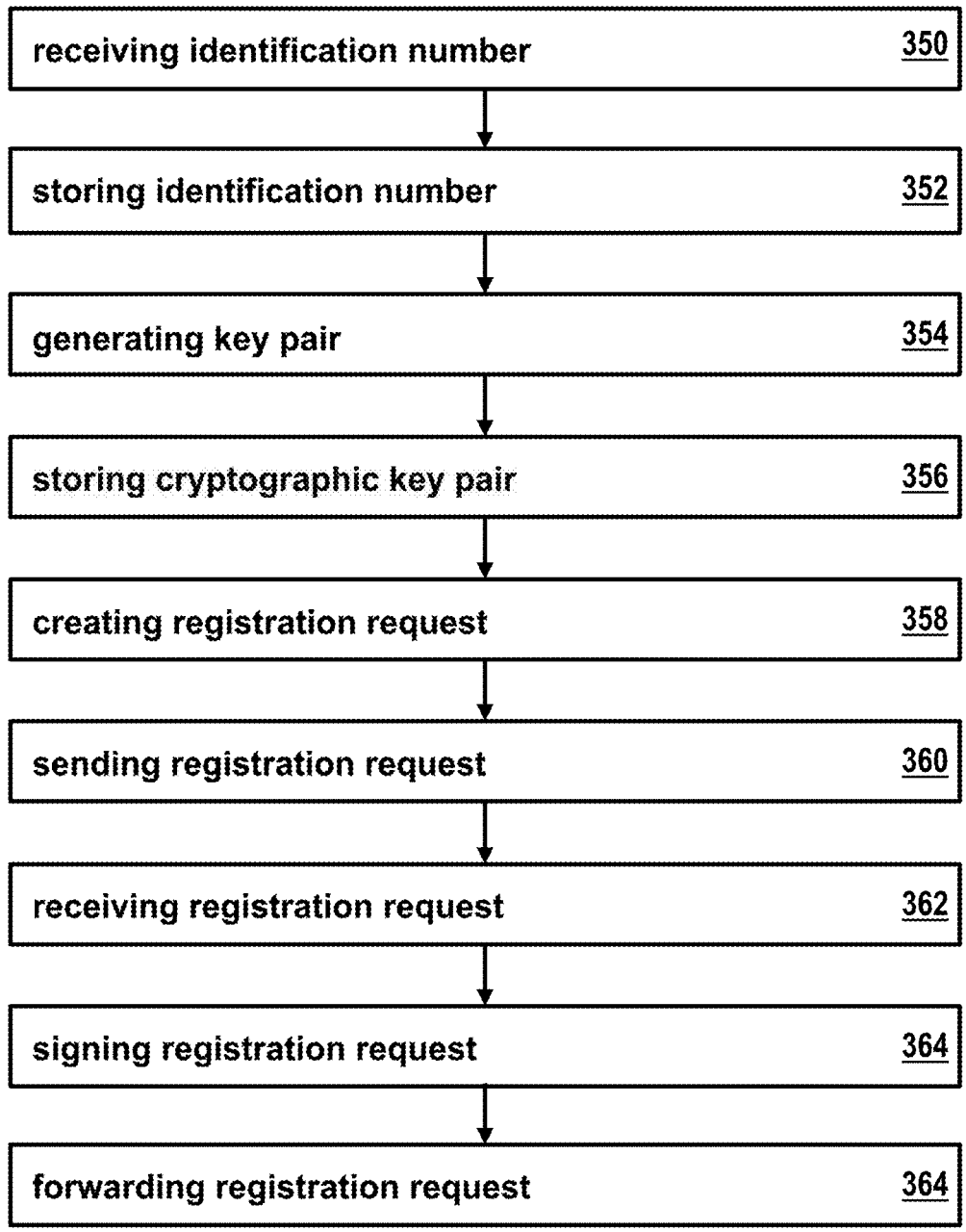
Figure 5:
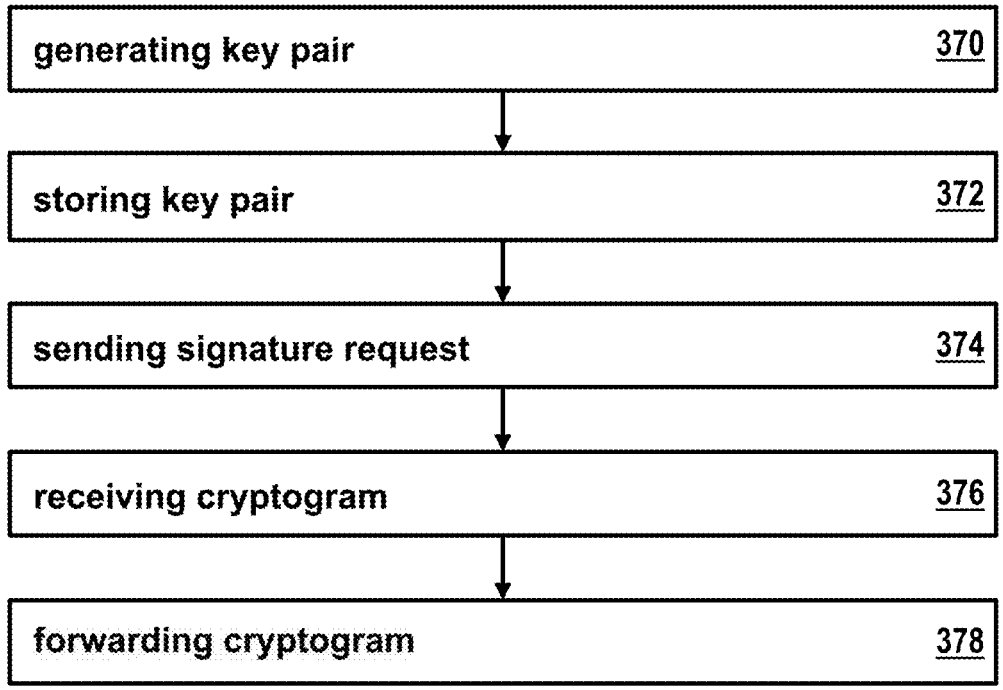
Figure 6:
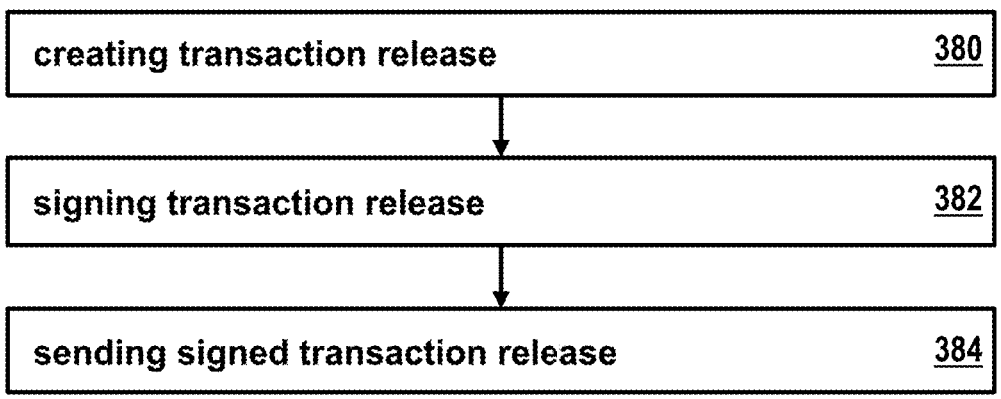
Figure 7:
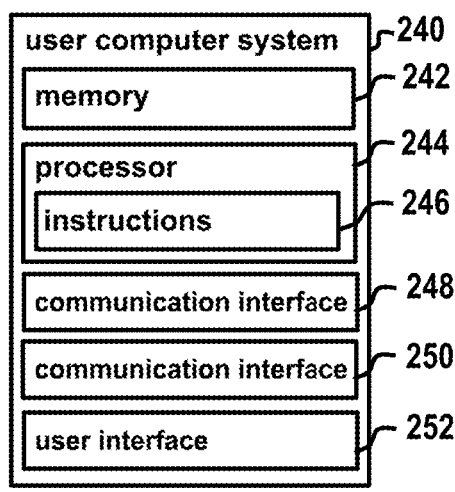
Figure 8:
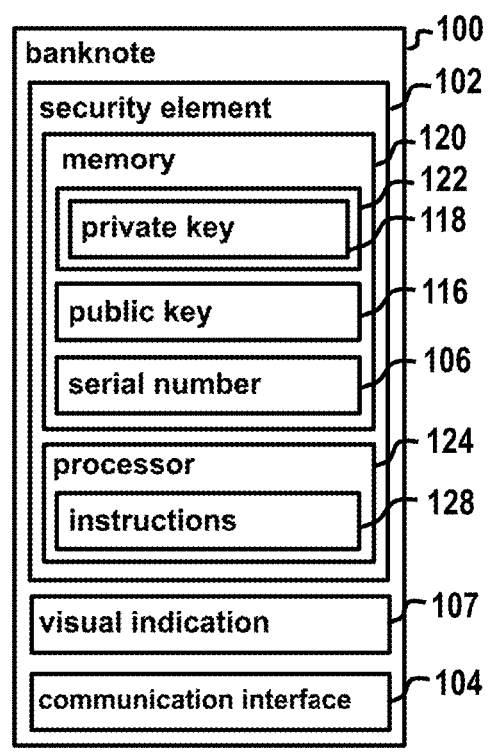
Figure 9:
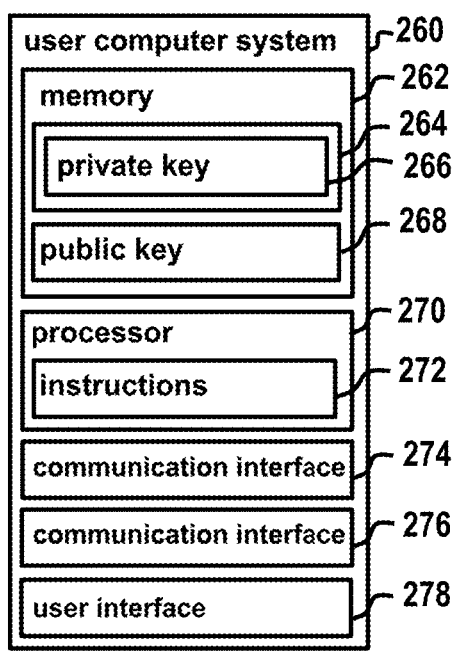
Figure 10A:
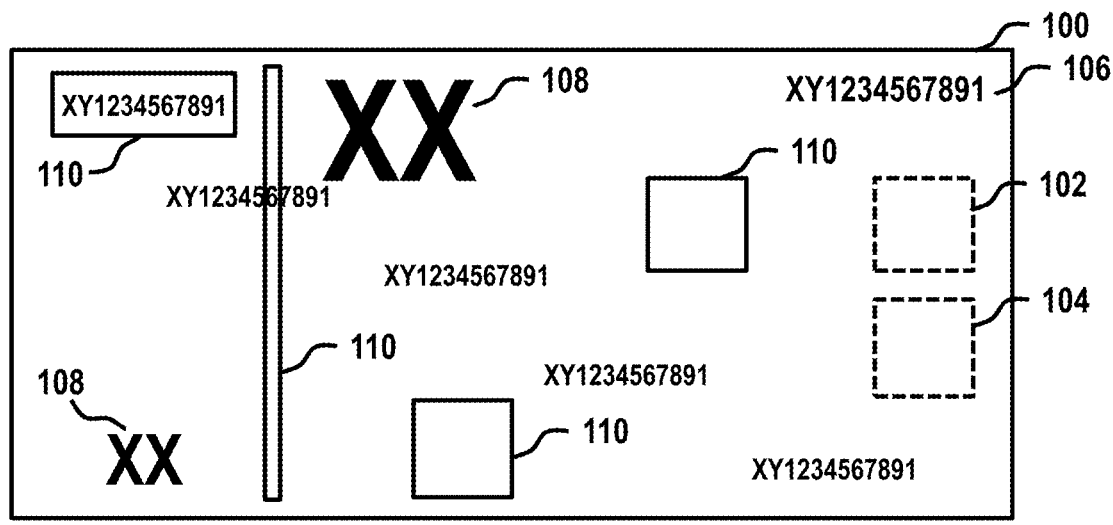
Figure 10B:
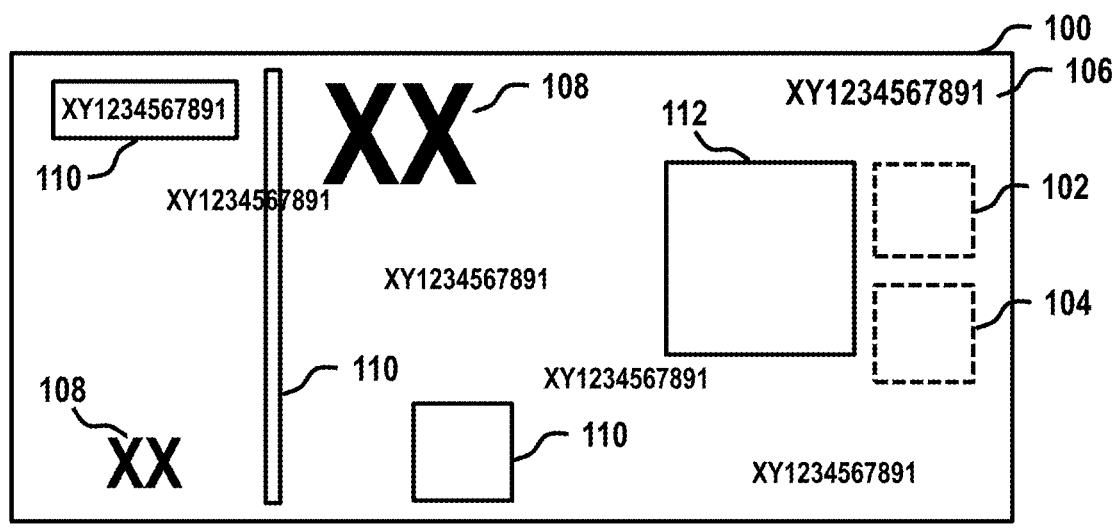
Figure 10C:
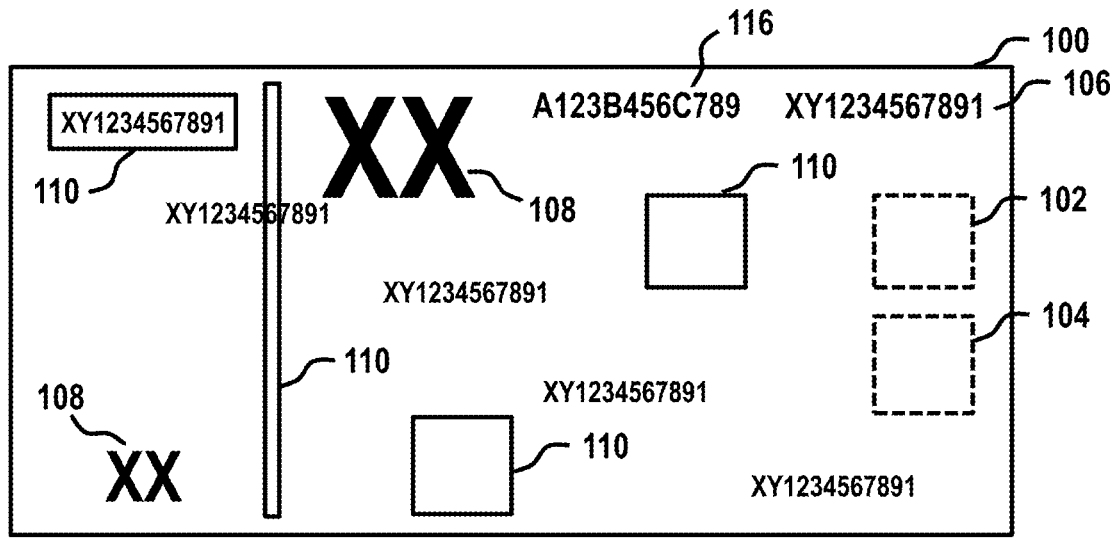
Figure 10D:
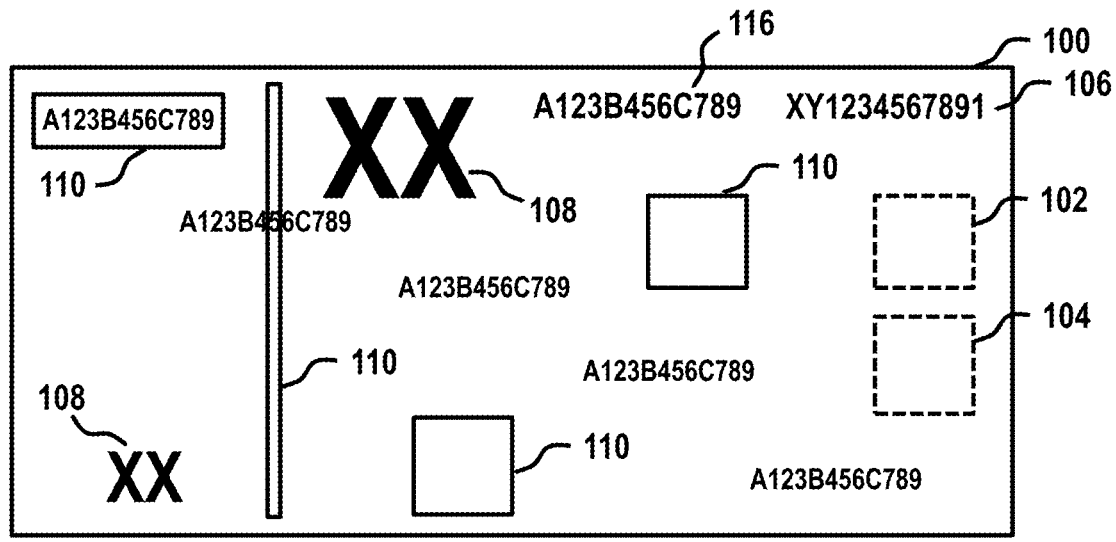
Figure 11A:
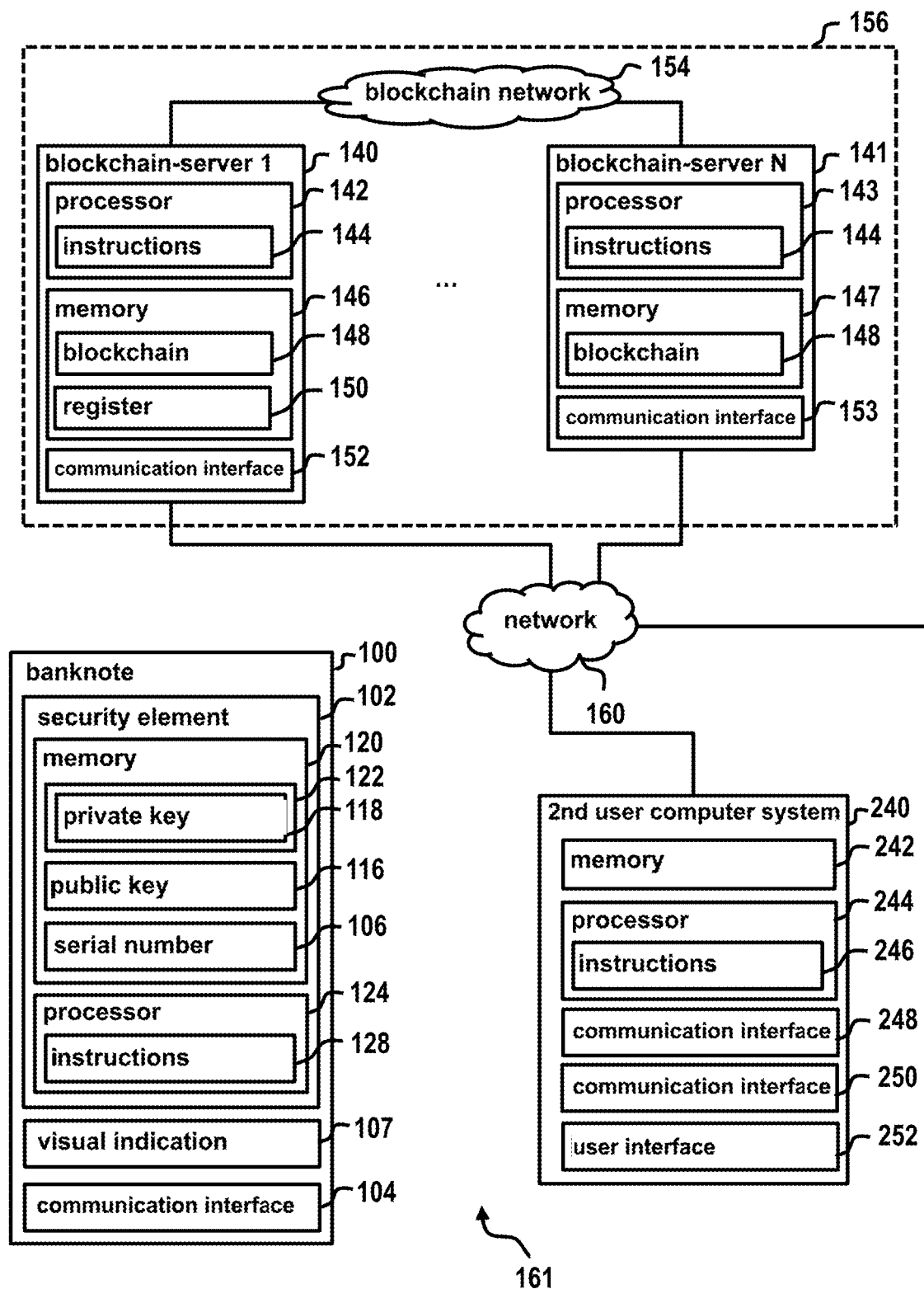
Figure 11B:
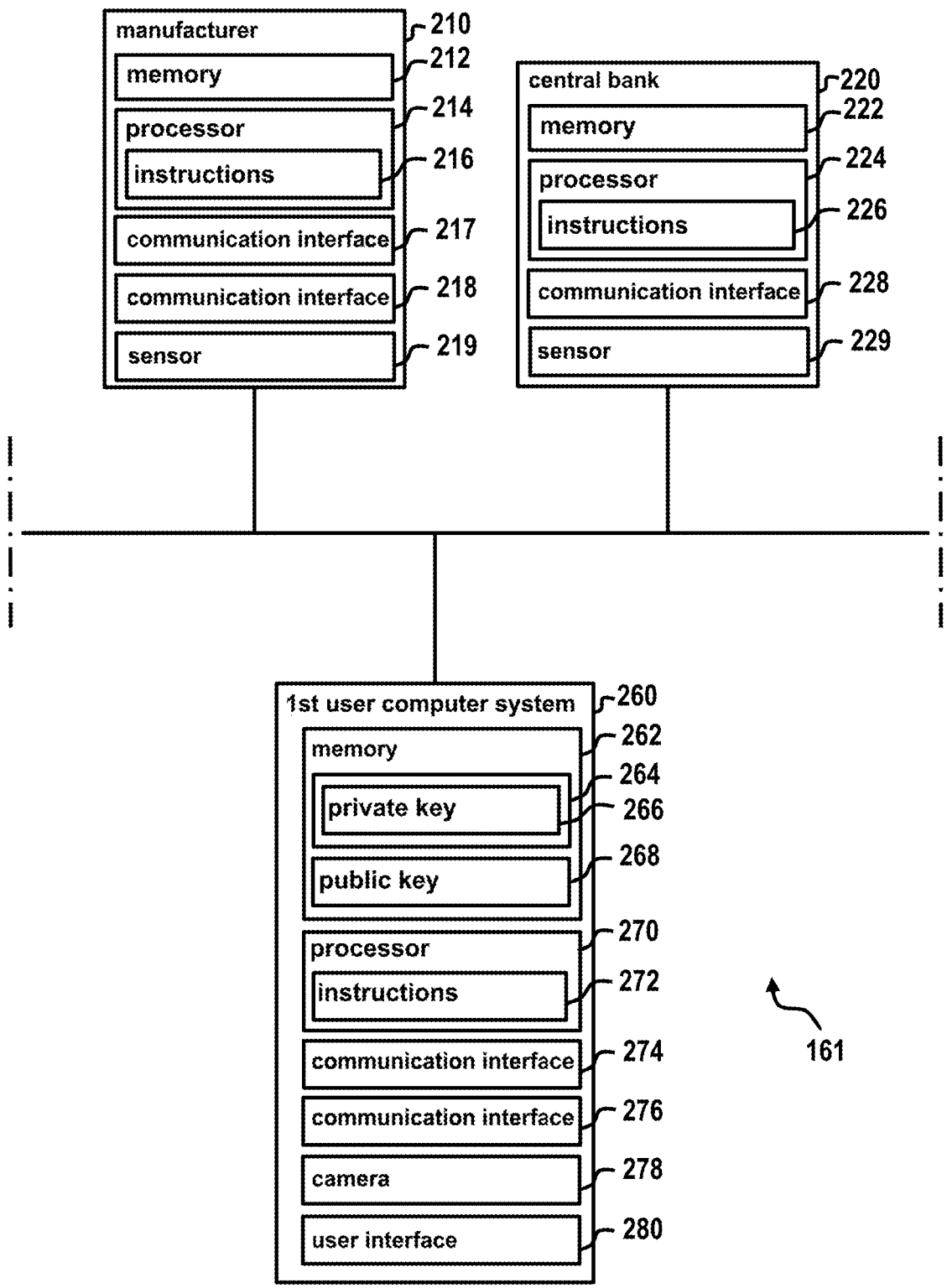
Figure 11C:
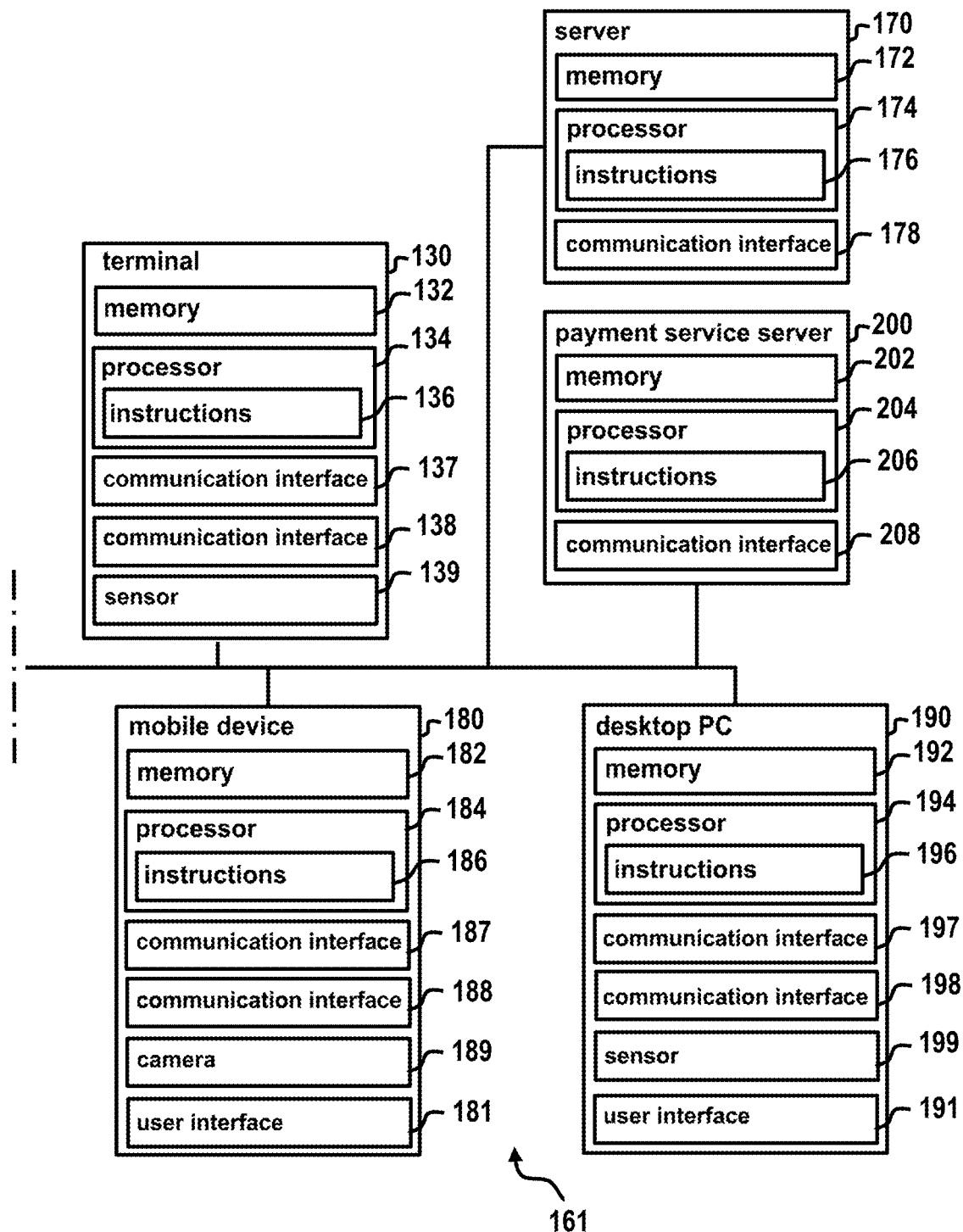
Figure 12:
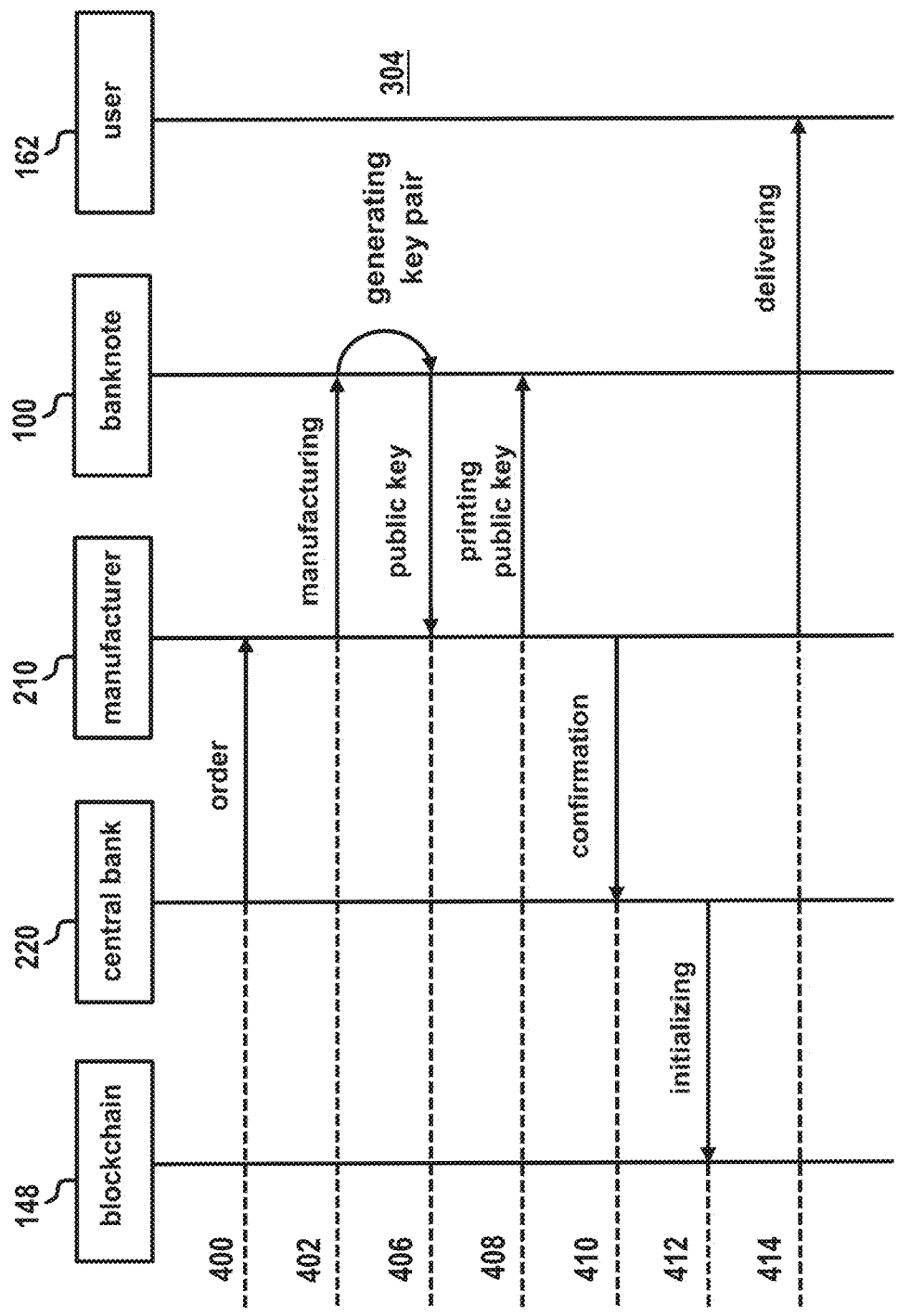
Figure 13:
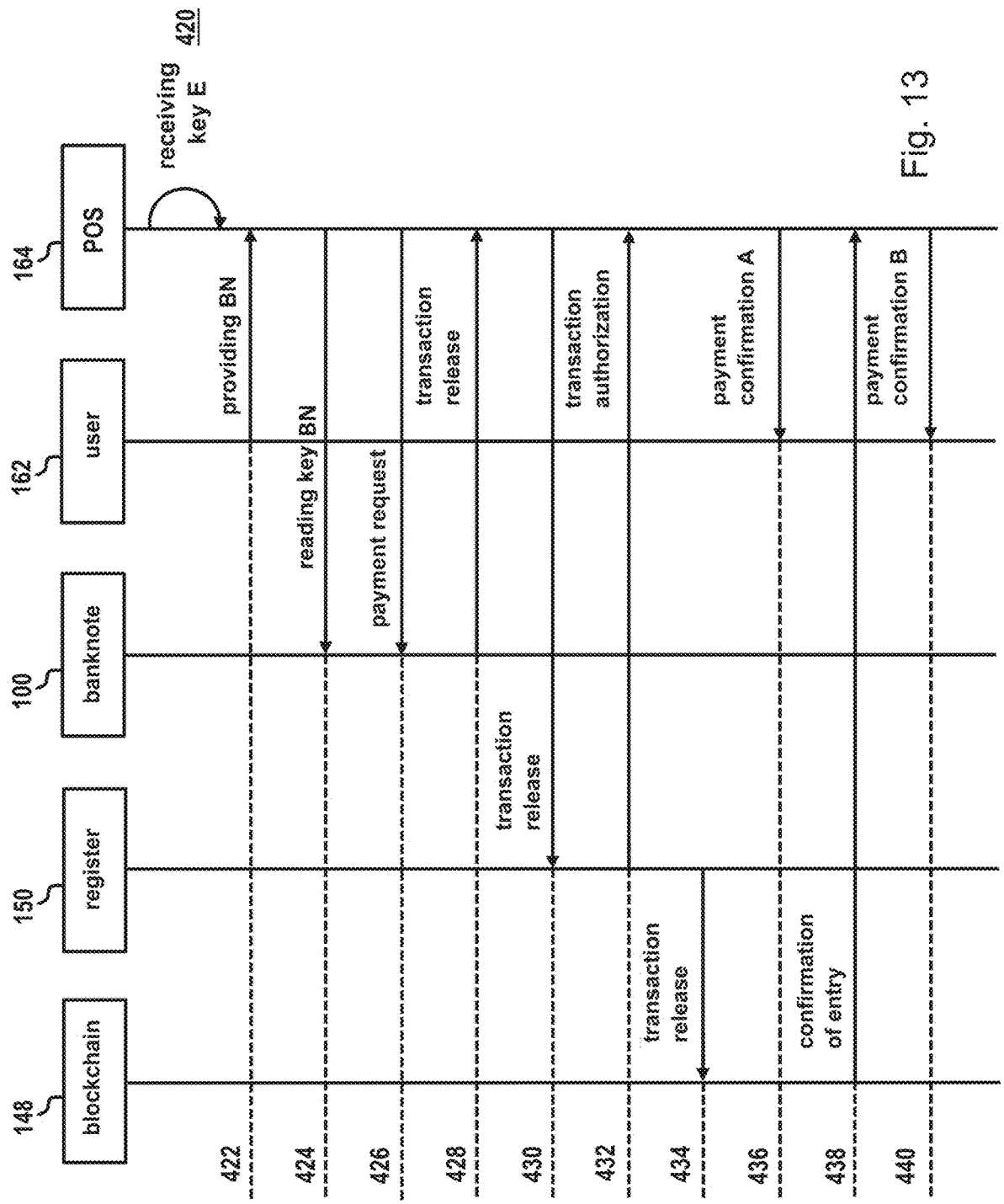
Figure 14:
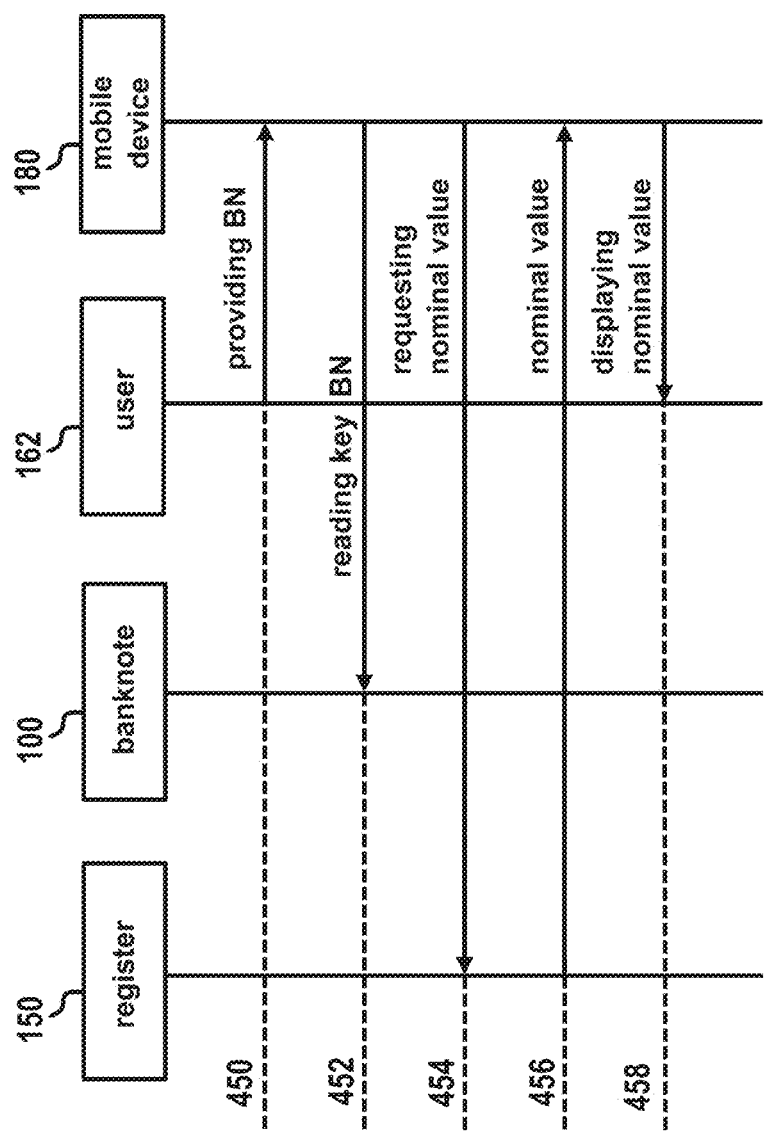
Figure 15A:
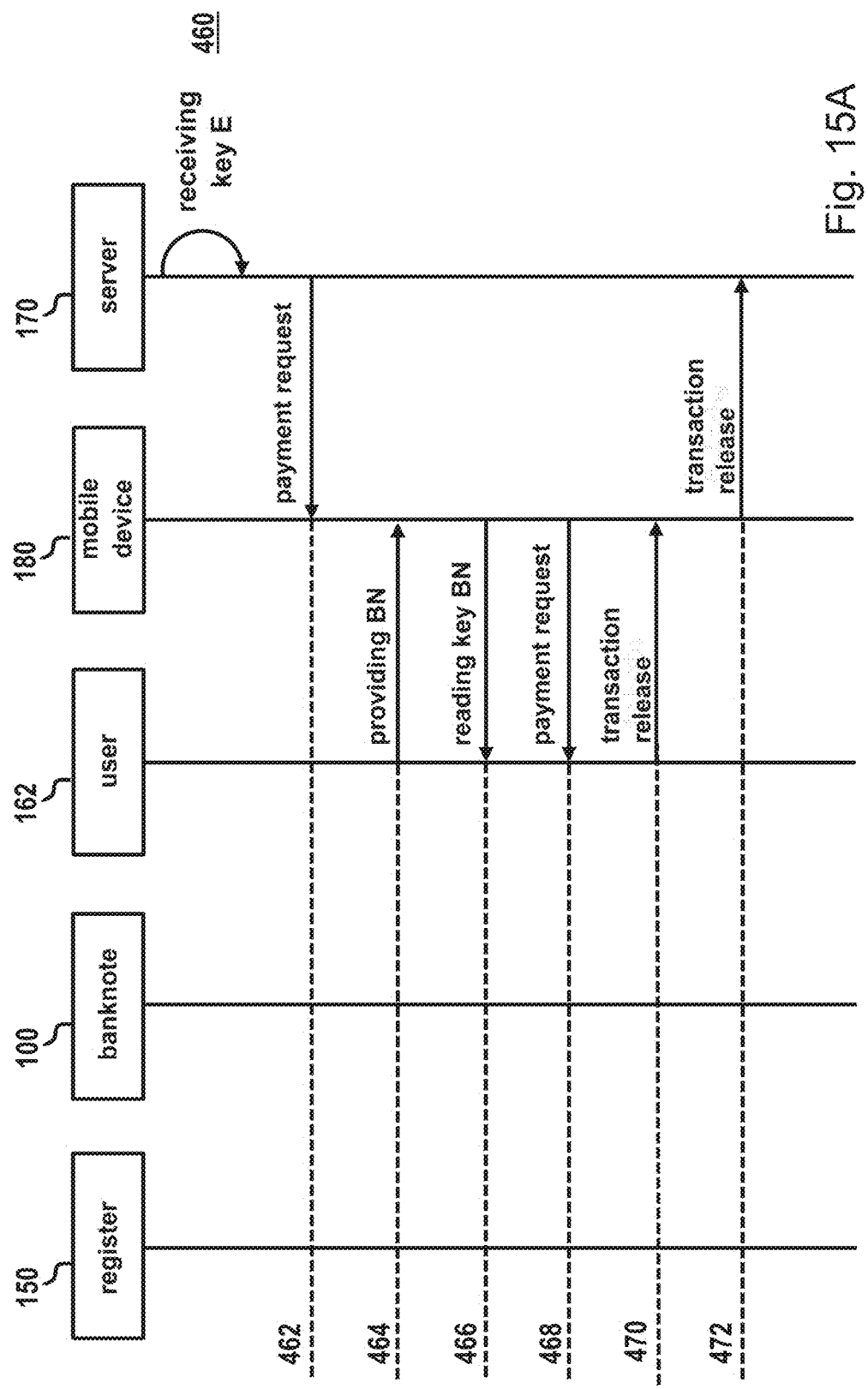
Figure 15B:
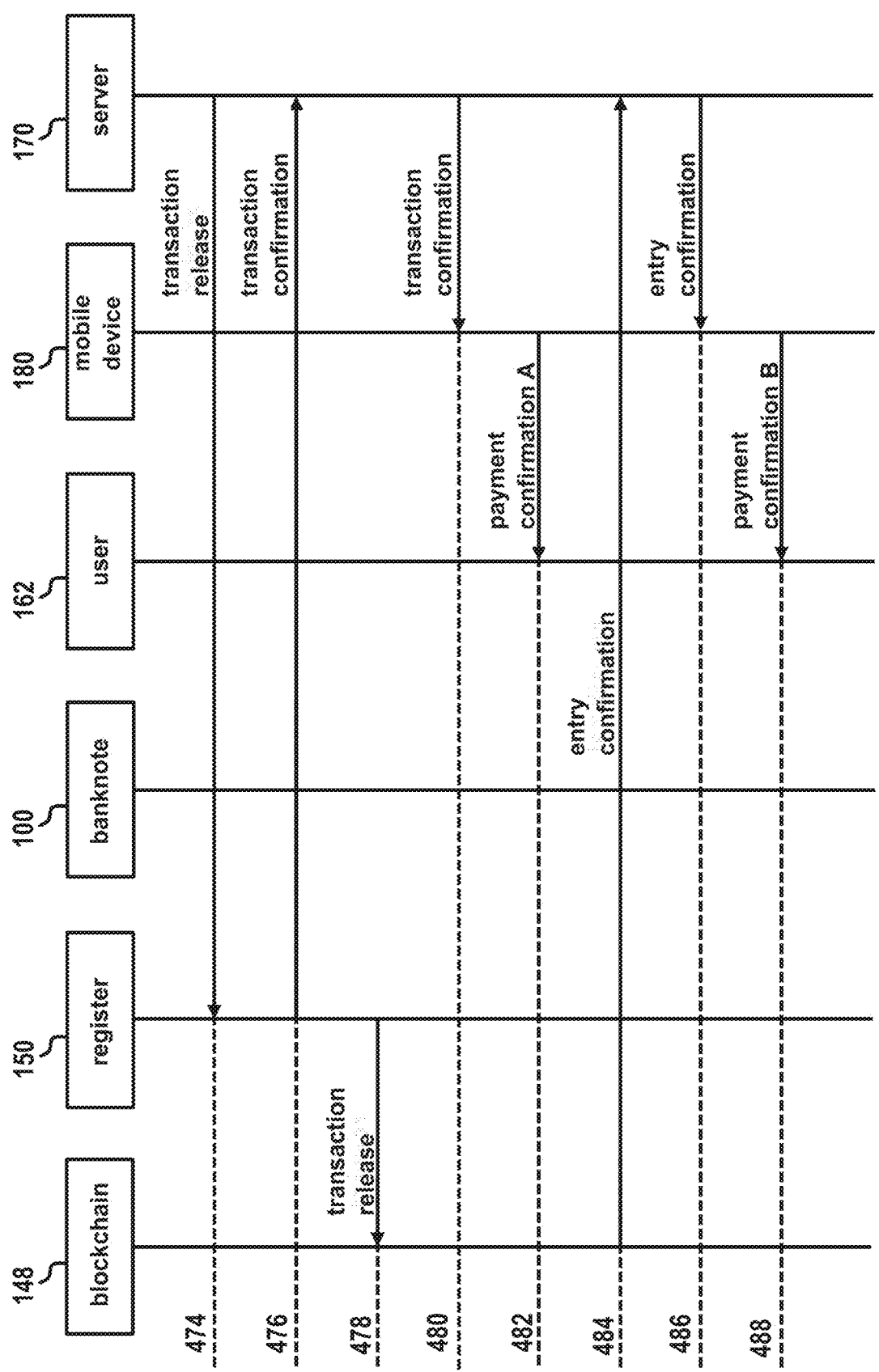
Figure 16:
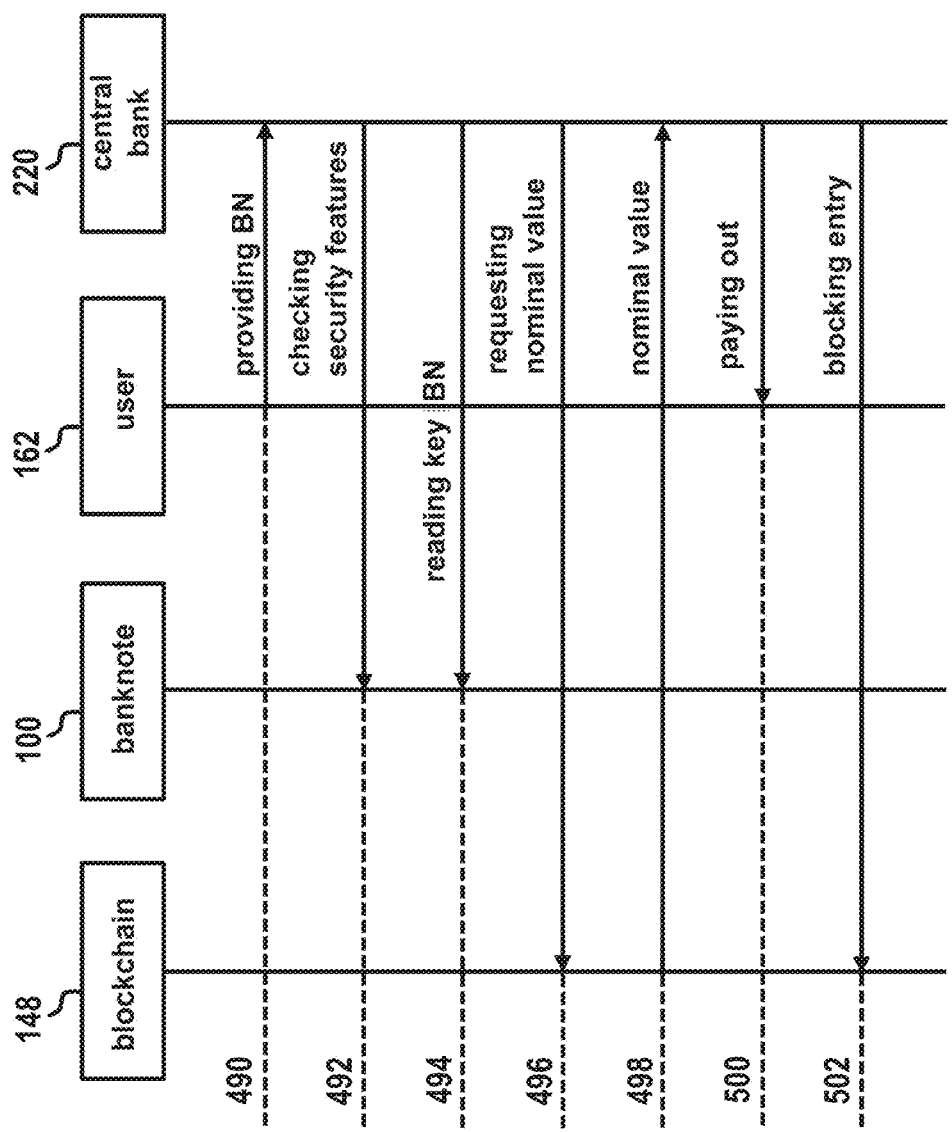
Figure 17:
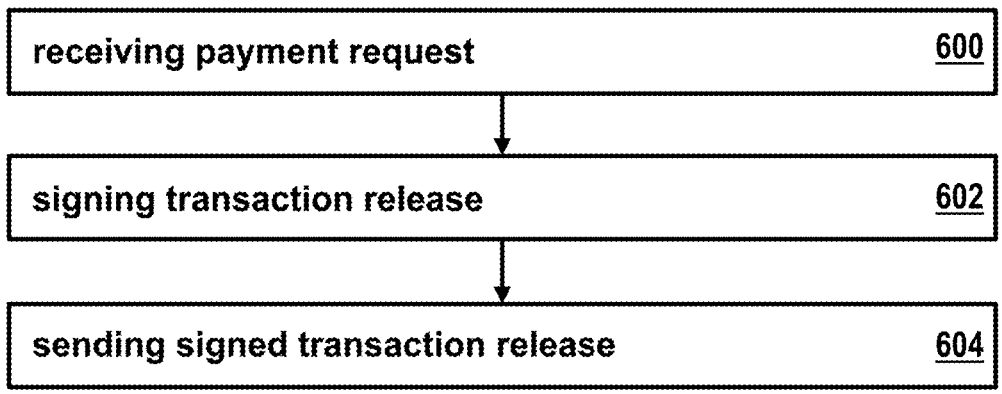
Figure 18:
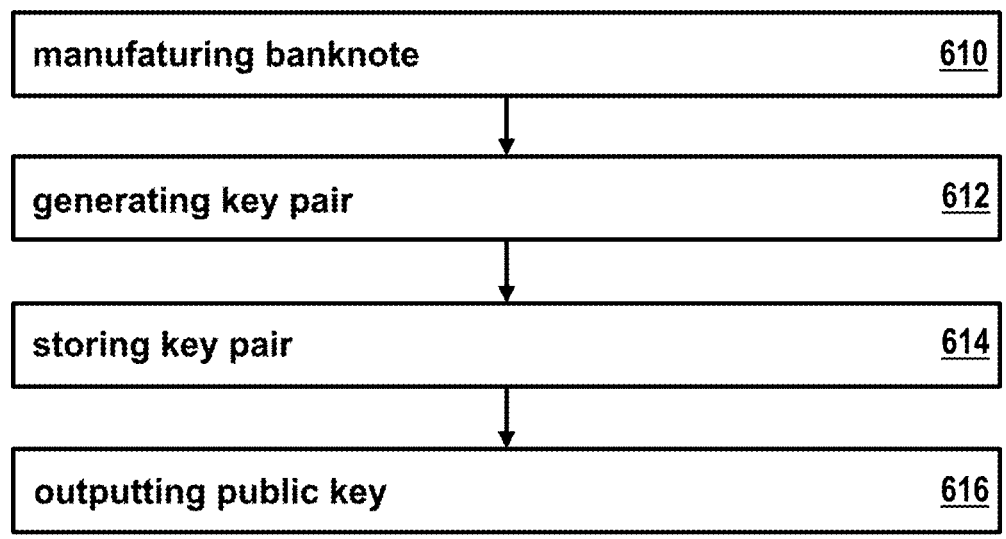
Figure 19:
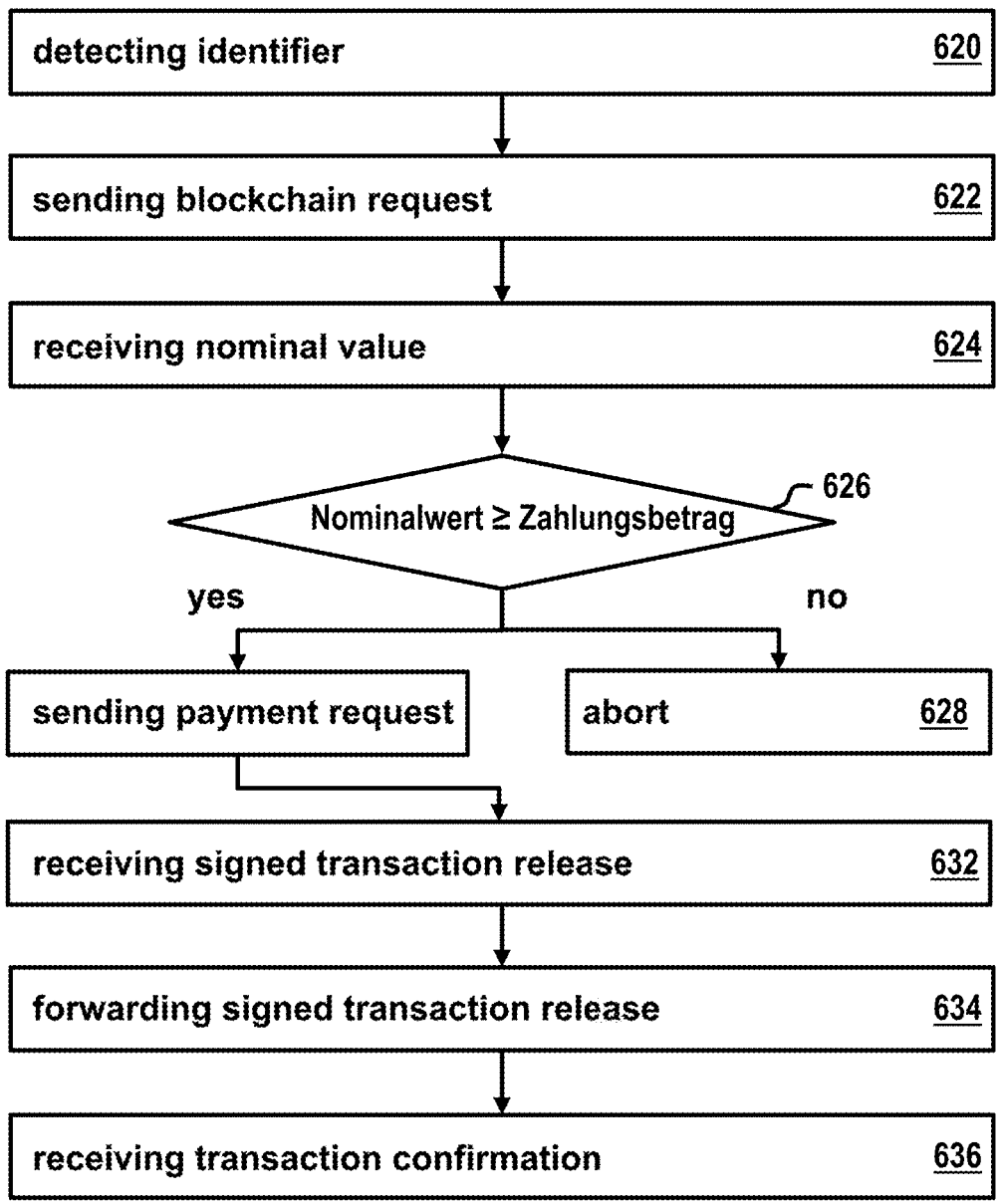
Figure 20:
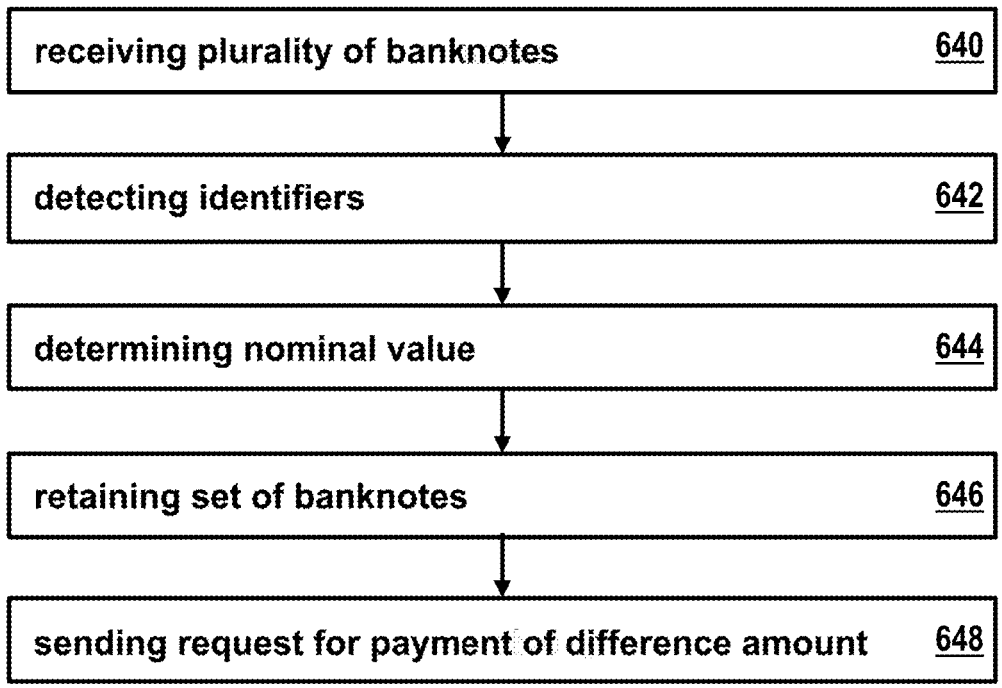
Figure 21:
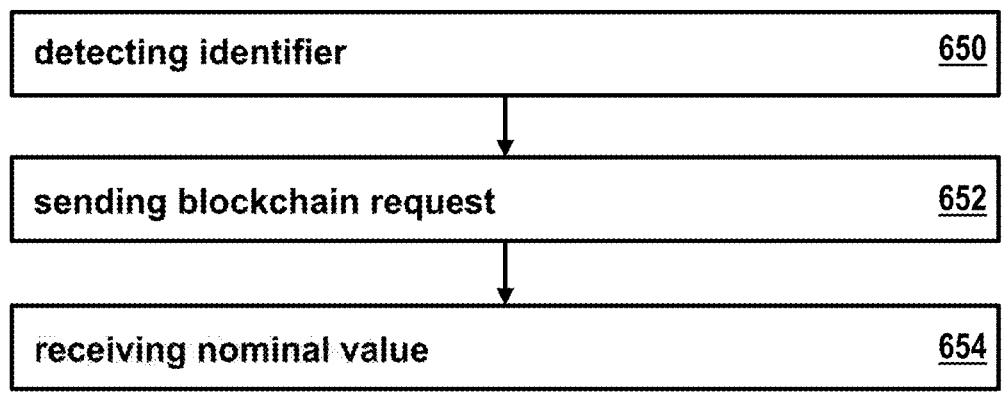
Figure 22:
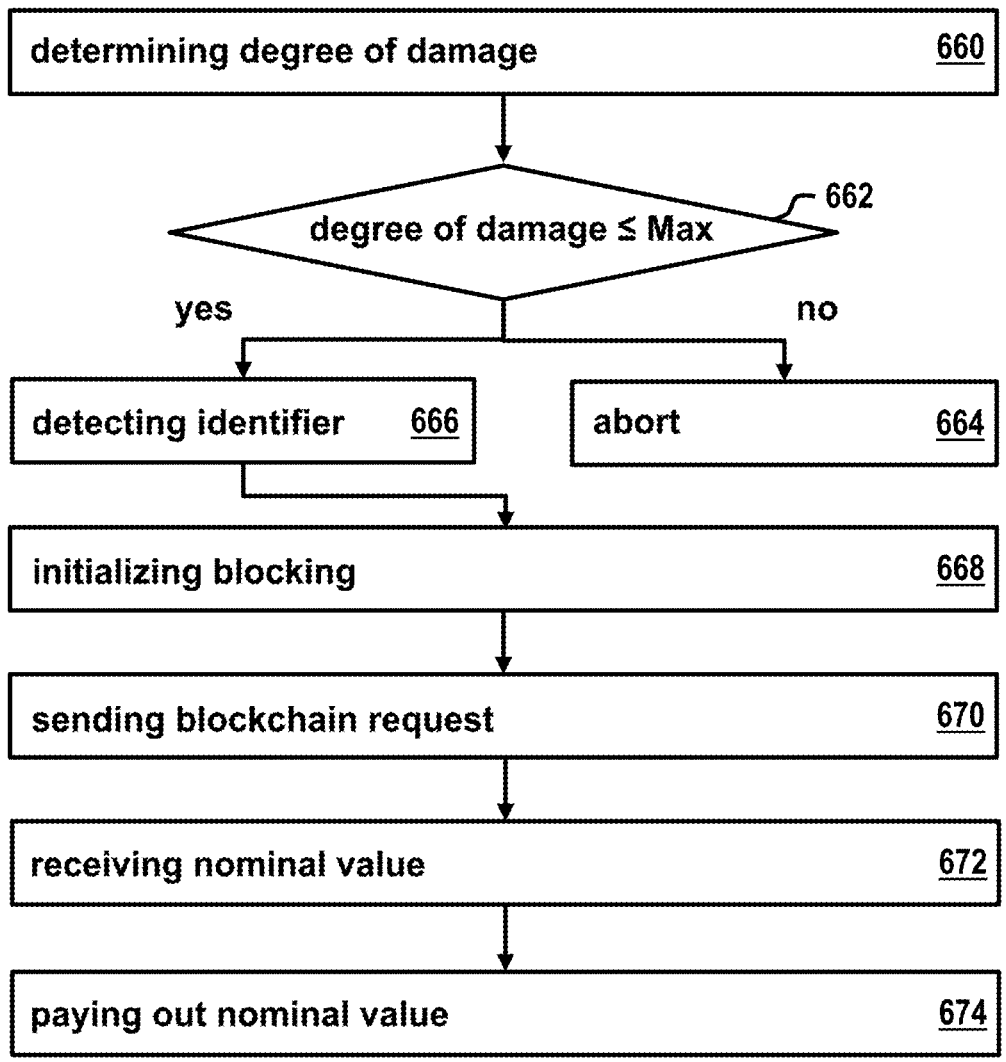

In the following, embodiments of the invention are explained in more detail with reference to the drawings, wherein:

FIG. 1 shows a schematic flowchart of an exemplary method for revoking an asymmetric key pair, FIG. 2 shows a schematic flow chart of an exemplary method for revoking an asymmetric key pair, FIG. 3 shows a schematic flowchart of an exemplary method for manufacturing a banknote and registering an asymmetric key pair, FIG. 4 shows a schematic flow chart of an exemplary method for manufacturing a banknote, FIG. 5 shows a schematic flow chart of an exemplary method for registering an asymmetric key pair, FIG. 6 shows a schematic flow chart of an exemplary method for paying with a user computer system, FIG. 7 shows a schematic block diagram of an exemplary user computer system for revoking an asymmetric key pair, FIG. 8 shows a schematic block diagram of exemplary banknotes, FIG. 9 shows a schematic block diagram of an exemplary user computer system with a registered asymmetric key pair, FIGS. 10A-D show schematic block diagrams of exemplary banknotes, FIGS. 11A-11C show a schematic block diagram of an exemplary system with an exemplary banknote, FIG. 12 shows a schematic flow chart of an exemplary method for manufacturing banknotes, FIG. 13 shows a schematic flow chart of an exemplary method for payment processing with a terminal, FIG. 14 shows a schematic flow chart of an exemplary method for determining a current nominal value, FIGS. 15A-15B show a schematic flow chart of an exemplary method for payment processing using a mobile portable communication device, FIG. 16 shows a schematic flowchart of an exemplary method for replacing a banknote, FIG. 17 shows a schematic flowchart of an exemplary method for using a banknote, FIG. 18 shows a schematic flow chart of an exemplary method for manufacturing a banknote, FIG. 19 shows a schematic flow chart of an exemplary method for processing payments with a terminal, FIG. 20 shows a schematic flow chart of an exemplary method for processing payments with a plurality of banknotes, FIG. 21 shows a schematic flow chart of an exemplary method for determining a current nominal value, and FIG. 22 shows a schematic flow chart of an exemplary method for replacing a banknote.

Elements of the following embodiments which correspond to each other are identified by the same reference signs.

FIG. 1 shows an exemplary method for revoking an asymmetric key pair of a first user computer system using a banknote 100 and a second user computer system 240. The asymmetric key pair to be revoked is registered in a blockchain 148. This registration comprises an assignment of the asymmetric key pair to the banknote 100. This assignment is cryptographically secured using a signature with a banknote-individual private cryptographic key of the banknote 100. The registration of the asymmetric key pair is a prerequisite for transactions to be entered into the blockchain 148, the releases of which are based on a signature using the private cryptographic key of the first user computer system. Thus, payments can be made via the blockchain 148 with registered asymmetric key pairs using an assigned blockchain address. It may be necessary to revoke the registered asymmetric key pair for various reasons. Reasons may include, for example, loss, theft, a defect or compromise of the security of the first user computer system and/or the registered asymmetric key pair.

For such a revocation, the user does not need the first user computer system, for example. Rather, any other user computer system is sufficient as the second user computer system 240, for example also the first user computer system, and the banknote 100 for which the asymmetric key pair to be revoked is registered. An application that enables an asymmetric key pair to be revoked is installed on the second user computer system 240. If not, a corresponding application may, for example, be initially downloaded to the second user computer system 240 and installed there. In step 300, the user provides the banknote 100, i.e. brings the banknote 100 into proximity with the second user computer system 240 so that the second user computer system 240 can establish a wireless, for example encrypted, communication link, such as via NFC, with the banknote 100. In step 302, the second user computer system 240 sends a revocation request to revoke the asymmetric key pair to the banknote 100 via the wireless communication link. Upon receiving the revocation request, the banknote 100 creates a cryptogram in step 303, which comprises an identification number of the banknote 100, such as a serial number stored in a memory of the banknote 100, and a revocation confirmation of the banknote 100. For example, the revocation confirmation may comprise the public cryptographic key of the asymmetric key pair to be revoked in order to identify it. The cryptogram or at least the revocation confirmation is signed using a private cryptographic key of the banknote 100. In step 304, the banknote 100 sends the cryptogram to the second user computer system 240. In step 306, the second user computer system 240 forwards the cryptogram to a blockchain server for entering the revocation confirmation into the blockchain 148. In step 308, the blockchain server verifies the signature of the cryptogram and, upon a successful verification, enters the revocation confirmation into the blockchain 148. The entry with the revocation confirmation comprises, for example, the identification number of the banknote 100. By entering the revocation confirmation, the asymmetric key pair is revoked for uses in the blockchain and, as a result of the revocation, entries of transactions into the blockchain whose releases are based on a signature of the asymmetric key pair revoked using the private cryptographic key are blocked.

FIG. 2 shows an exemplary method for revoking a first asymmetric key pair of a first user computer system using a banknote. The first asymmetric key pair comprises a first private cryptographic key and a first public cryptographic key. The first asymmetric key pair is assigned to a first blockchain address in a blockchain. Furthermore, an assignment to the banknote is registered in the blockchain for the first asymmetric key pair, which is signed using a banknote-individual second private cryptographic key of a banknote-individual second asymmetric key pair of the banknote.

The banknote comprises a security element with a processor and a memory with program instructions. An identification number that uniquely identifies the banknote is stored in the memory. The second private cryptographic key is stored in a protected memory area of the memory. The second asymmetric key pair is assigned to a banknote-individual second blockchain address in the blockchain.

In block 310, a revocation request to revoke the first asymmetric key pair is sent from the second user computer system to the banknote. In block 312, in response to the revocation request, the second user computer system receives a cryptogram from the banknote signed using the second private cryptographic key. The cryptogram contains the identification number of the banknote and a revocation confirmation of the banknote. The cryptogram is signed to the extent that the revocation confirmation and/or the entire cryptogram is encrypted. In block 314, the second user computer system forwards the signed cryptogram to a blockchain server of the blockchain to enter the revocation confirmation of the banknote identified by the identification number into the blockchain. By entering the revocation confirmation, the first asymmetric key pair is revoked and, as a result of the revocation, entries of transactions in the blockchain whose releases are based on a signature using the revoked first private cryptographic key are blocked.

FIG. 3 shows an exemplary method for registering a banknote 100 in the course of its manufacturing so that it can be used to register and revoke asymmetric key pairs from user computer systems 260. In step 320, the banknote 100 receives a unique identification number, such as a serial number (SN), from a manufacturer computer system 210 in the course of manufacturing. In step 322, the banknote 100 stores the received identification number in a memory of the banknote 100. After or before receiving the identification number, the banknote 100 generates, for example, an asymmetric key pair by a security element of the banknote 100. The private cryptographic key of the generated asymmetric key pair is stored by the banknote 100 in a protected memory area of the memory of the banknote 100. The public cryptographic key of the generated asymmetric key pair is stored by the banknote 100 in the memory of the banknote 100. Furthermore, the banknote 100 creates a registration request (RA) signed using the private cryptographic key of the banknote 100. This registration request comprises the identification number and the public cryptographic key of the banknote. In step 324, in response to receiving the identification number, the banknote 100 sends the registration request to the manufacturer computer system 210 for registering the identification number and the public cryptographic key of the banknote 100 in the blockchain 148 by a blockchain server. In step 326, the manufacturer computer system 210 also signs the registration request and, in step 328, forwards it to a blockchain server for registration in the blockchain 148. In step 330, the blockchain server checks the signatures of the registration request, for example, and enters them into the blockchain 148 if the check is successful. As a result, the identification number and the public cryptographic key of the banknote are registered together in the blockchain 148.

Such a registered banknote 100 can be used, for example, to register an asymmetric key pair of a user computer system 260 in the blockchain 148. In step 332, the banknote 100 is provided for registering an asymmetric key pair of the user computer system 260. For example, a user has drawn the banknote 100 from an ATM and now brings it into proximity of the user computer system 260 so that the user computer system 260 can establish a contactless communication connection to the banknote, such as via NFC. In step 334, the user computer system 260 generates and stores an asymmetric key pair. In step 336, the user computer system 260 sends a signature request to the banknote 100 to sign the generated public cryptographic key. The signature request comprises the public cryptographic key to be signed. In step 338, the banknote 100 signs the public cryptographic key of the user computer system 260. In step 340, a cryptogram is sent from the banknote 100 to the user computer system 260 with the signed public cryptographic key of the user computer system 260 and with the identification number of the banknote 100. In step 342, the user computer system 260 forwards the cryptogram to a blockchain server of the blockchain 148 for entry. By registering the cryptogram, an assignment of the asymmetric key pair of the user computer system 260 to the identification number of the banknote 100 is registered in the blockchain 148 and, as a result of the registration, entries of transactions into the blockchain 148 are enabled, the releases of which are based on a signature using the registered private cryptographic key of the user computer system 260.

FIG. 4 shows an exemplary method for manufacturing a banknote that is configured to register and revoke asymmetric key pairs from user computer systems. In block 350, the banknote receives a unique identification number, for example a serial number of the banknote, from a manufacturer computer system of a manufacturer of the banknote. In block 352, the banknote stores the identification number in a memory of the banknote. In block 354, the banknote generates an asymmetric key pair by a security element of the banknote. In block 356, the banknote stores a private cryptographic key of the generated asymmetric key pair in a protected memory area of the memory of the banknote and the public cryptographic key of the generated asymmetric key pair is stored in the memory of the banknote. For example, blocks 354 to 356 can also be executed prior to receiving the unique identification number, i.e., block 350, is received. In block 358, the banknote creates a registration request signed using its private cryptographic key. This registration request comprises the identification number and the public cryptographic key of the banknote. In block 360, in response to receiving the identification number, the banknote sends the registration request to the manufacturer computer system to register the identification number and the public cryptographic key of the banknote. By registering the identification number and the public cryptographic key of the banknote together, an assignment of the public cryptographic key and thus, for example, a corresponding blockchain address to the banknote is registered.

In block 362, the manufacturer computer system receives the registration request to re-register the identification number and the public cryptographic key of the banknote. For example, the manufacturer computer system verifies the signature of the registration request using the public cryptographic key of the banknote to be registered as the signature verification key. In block 364, the manufacturer computer system also signs the registration request. This signature is made, for example, using a private cryptographic key of an asymmetric key pair of the manufacturer computer system registered in the blockchain. In block 364, the manufacturer computer system forwards the registration request it has signed to a blockchain server to register the identification number and the second public cryptographic key in the blockchain. Registering the identification number and the second public cryptographic key in the blockchain is, for example, a prerequisite for being able to register assignments of asymmetric key pairs from user computer systems to the banknote using the banknote in the blockchain.

FIG. 5 shows an example of how to register an assignment of an asymmetric key pair of a user computer system to a banknote in a blockchain. In block 370, the user computer system generates the asymmetric key pair to be registered. In block 372, the generated asymmetric key pair is stored by the user computer system. For example, the private cryptographic key of the generated asymmetric key pair is stored in a protected memory area of a memory of the user computer system. For example, the public cryptographic key of the generated asymmetric key pair is stored in the memory of the user computer system. In block 374, the user computer system sends a signature request to the banknote to sign the generated public cryptographic key. The signature request comprises the public cryptographic key to be signed. In response to the signature request, the user computer system receives in block 376 a cryptogram from the banknote with the signed public cryptographic key of the user computer system and with the identification number of the banknote. The public cryptographic key of the user computer system is signed with the second private cryptographic key of the banknote. In block 378, the user computer system forwards the cryptogram to a blockchain server of the blockchain for entry. By registering the cryptogram, an assignment of the asymmetric key pair of the user computer system to the identification number of the banknote is registered in the blockchain and, as a result of the registration, entries of transactions into the blockchain are enabled, the releases of which are based on a signature using the registered private cryptographic key of the user computer system.

FIG. 6 shows an exemplary method for paying an amount of money with a user computer system, i.e. using a cryptographic key of an asymmetric key pair registered in a blockchain. In block 380, the user computer system creates a transaction release for releasing a transaction of the amount to be paid from a blockchain address of the user computer system to a blockchain address of a payee. The transaction release comprises, for example, the blockchain address of the user computer system to which the private cryptographic key of the user computer system is assigned, the blockchain address of the payee and the amount to be paid. In block 382, the user computer system signs the transaction release with its private cryptographic key. In block 384, the user computer system sends the signed transaction release to a blockchain server of the blockchain for entry of the transaction into the blockchain. By entering the transaction into the blockchain, the amount to be paid is assigned to the blockchain address of the payee.

FIG. 7 shows an exemplary user computer system 240, for example a mobile device such as a smartphone, which is configured to revoke an asymmetric key pair of another user computer system using a banknote. The user computer system 240 comprises a memory 242 and a processor 244. The processor 244 executes, for example, program instructions 246 stored in the memory 242. Executing the program instructions 246, for example, causes the processor 244 to control the user computer system 240 to revoke the asymmetric key pair using the banknote. For example, for this purpose, the user computer system 240 comprises a communication interface 248 for communicating with the banknote to confirm the revocation and a communication interface 250 for communicating with a blockchain server to enter the revocation into a blockchain. Furthermore, the user computer system 240 comprises, for example, a user interface 252 for a user to initiate the revocation process. A corresponding user interface 252 comprises, for example, an input and a display device.

FIG. 8 shows an exemplary banknote 100 configured to register and revoke asymmetric key pairs from user computer systems. The banknote comprises a security element 102 with a processor 124 and with a memory 120 in which a serial number 106 is stored as a unique identification number of the banknote 100. Furthermore, a public cryptographic key 116 of the banknote 100 is stored in the memory 120. A private cryptographic key 118 of the banknote 100 is stored as a signature key in a protected memory area 122 of the memory 120. The processor 124 executes, for example, program instructions 128 stored in the memory 120. By executing the program instructions 128, the processor 124 is caused, for example, to control the banknote to confirm an assignment of an asymmetric key pair of a user computer system to the banknote or to confirm a revocation of a corresponding assignment. For example, for this purpose, the banknote has a communication interface 104 for communicating with a user computer system which, for example, wishes to register an assignment of the banknote to one of its asymmetric key pairs or to revoke such an assignment for its own asymmetric key pair or an asymmetric key pair of another user computer system. Furthermore, the banknote comprises visual indications 107, such as the serial number 106 or a nominal value.

FIG. 9 shows an exemplary user computer system 260, for example a mobile device such as a smartphone, which comprises an asymmetric key pair 266, 268. The asymmetric key pair comprises a private cryptographic key 266 and a public cryptographic key 268, which are assigned to a banknote by means of a corresponding entry in a blockchain. Further, the user computer system 260 may be configured to revoke its own asymmetric key pair 266, 268 and/or an asymmetric key pair of another user computer system using a banknote. The user computer system 260 comprises a memory 262 and a processor 270. The processor 270 executes, for example, program instructions 272 stored in the memory 262. Executing the program instructions 272 causes the processor 270, for example, to control the user computer system 260, for example, to release transactions in the blockchain and/or to revoke asymmetric key pairs using a banknote. In contrast to revoking an asymmetric key pair, transactions are released in the blockchain without using a banknote. For example, the user computer system 260 has a communication interface 274 for communicating with the banknote to confirm the assignment of the asymmetric key pair 266, 268 to the corresponding banknote and/or to revoke an asymmetric key pair of a user computer system assigned to the banknote. Furthermore, the user computer system has a communication interface 276 for communicating with a blockchain server for entering transaction releases, allocation registrations and/or revocations into a blockchain. Further, the user computer system 260 comprises, for example, a user interface 278 for a user to interact with the user computer system. A corresponding user interface 278 comprises, for example, an input and a display device.

FIGS. 10A to 10D show exemplary banknotes 100. The banknote 100 shown in FIG. 10A comprises a plurality of security features 110 which prove the authenticity and validity of the banknote 100. The security features 110 are distributed across the banknote 100. For example, the security features 110 are distributed across the banknote 100 in such a way that as long as more than 50% of the banknote 100 is in an undamaged state, the authenticity and validity of the banknote 100 can be proven. The banknote 100 further comprises a visual indication of the serial number 106 of the banknote 100, which is, for example, printed on the banknote 100. For example, the banknote 100 comprises a plurality of visual indications of the serial number 106, which are distributed across the banknote 100, for example in microprint. For example, the serial number 106 is distributed across the banknote 100 in such a way that as long as more than 50% of the banknote 100 is in an undamaged state, the serial number 106 of the banknote 100 can be determined. The serial number 106 of the banknote 100 is assigned, for example, to a public cryptographic key, from which the blockchain address of the banknote 100 can be derived, and/or to a blockchain address of the banknote 100. For example, using the serial number 106 of the banknote 100, the public cryptographic key, from which the blockchain address of the banknote 100 can be derived, and/or a blockchain address of the banknote 100 can be determined.

Furthermore, the banknote comprises one or more visual indications of an initial nominal value 108 of the banknote 100. The initial nominal value 108 is, for example, a minimum nominal value of the banknote 100. For example, the banknote 100 comprises one or more visual indications of a minimum nominal value different from the initial nominal value 108 in addition to the indication of the initial nominal value 108. For example, the banknote 100 comprises the one or more visual indications of the minimum nominal value instead of visual indications of an initial nominal value 108 different from the minimum nominal value. In addition, the banknote comprises a security element 102 comprising a processor and a memory. A private cryptographic key for signing transaction releases, i.e. for authorizing transactions from a blockchain address assigned to the banknote 100, is stored in a protected memory area of the memory. Furthermore, the banknote 100 comprises a communication interface 104 for communicating with a terminal, in particular for contactless communication. Via the communication interface 104, the banknote 100 receives, for example, payment requests and sends, for example, signed transaction releases.

FIG. 10B shows an exemplary banknote 100, which corresponds to the exemplary banknote 100 in FIG. 10A. In addition, the banknote 100 in FIG. 10B comprises a user interface 112. The user interface 112 comprises, for example, an input device and/or an output device of the banknote 100. For example, the user interface 112 comprises a touchpad for inputting data, such as transaction data, into the banknote 100 and/or a display for displaying data, such as transaction data, which the banknote 100 is to process or has processed. For example, the user interface 112 comprises a touch display with which data can be entered by the user as well as data can be displayed to the user.

FIG. 10C shows an exemplary banknote 100, which corresponds to the exemplary banknote 100 of FIG. 10A. In addition to the visual indication of the serial number 106, the banknote 100 in FIG. 10C also comprises a visual indication that identifies the blockchain address of the banknote 100. The additional information is, for example, a public cryptographic key 116, from which the blockchain address of the banknote 100 can be derived, and/or the blockchain address of the banknote 100. FIG. 10D shows an exemplary banknote 100 which corresponds to the exemplary banknote 100 of FIG. 10C. In the case of the banknote in FIG. 10D, the banknote 100 comprises a plurality of additional visual indications that identify a blockchain address of the banknote 100, such as the public cryptographic key 116. These additional visual indications are arranged, for example, distributed across the banknote 100, such as in microprint. For example, the additional visual indication is distributed across the banknote 100 in such a way that as long as more than 50% of the banknote is in an undamaged state, the blockchain address of the banknote 100 can be identified.

FIG. 11 has been divided into three parts due to lack of space, i.e. FIGS. 11A, 11B and 11C, which together form FIG. 11. FIG. 11 shows an exemplary system with an exemplary banknote 100. The banknote 100 comprises a security element 102 with a processor 124 and a memory 120. The processor 124 executes program instructions 128.

These program instructions 128 comprise, for example, cryptographic program instructions for generating an asymmetric key pair 116, 118 of the banknote 100 and for signing transaction releases with a private cryptographic key 118 of the asymmetric key pair.

Furthermore, the cryptographic program instructions may be configured, for example, to derive a blockchain address of the banknote 110 from the public cryptographic key 116. The public cryptographic key 116 of the asymmetric key pair is stored in the memory 120.

Furthermore, the memory 120 stores, for example, the serial number 106 of the banknote 100. The private cryptographic key 118 of the asymmetric key pair is stored in a protected memory area 122 of the memory 120. Furthermore, the banknote 100 comprises, for example, a communication interface 104 for communicating with external devices, such as a terminal 130. The communication interface 104 is configured, for example, for contactless communication. In addition, the banknote 100 comprises visual indication 107, such as the serial number 106 and/or the public cryptographic key 116. Furthermore, the banknote 100 may further comprise, for example, a user interface comprising an input and/or output device for inputting and/or displaying data, such as transaction data.

The banknote 100 communicates using the communication interface 104 with, for example, a terminal 130. The terminal 130 is, for example, a payment terminal of a PoS. The terminal 130 comprises a processor 134 for executing program instructions 136 and a memory 132. Furthermore, the terminal 130 comprises a communication interface 137 for communicating with the banknote 100. In addition, the terminal 130 comprises a communication interface 139 for communicating via a network 160, such as the Internet. The terminal 130 is configured, for example, to process a payment with the banknote 100. For this purpose, the terminal 130 sends, for example, a payment request to the banknote 100 and receives a signed transaction release from the banknote 100, which the terminal 130 transmits via the network 160 to a blockchain server 140, 141 for entering the transaction release by the signed transaction release into the blockchain 148. The blockchain server 140, 141 belongs, for example, to a blockchain network 154. Furthermore, the terminal may comprise, for example, a sensor 139. The sensor 139 is configured, for example, to detect visual indication 107 of the banknote 100, such as the serial number 106 and/or the public cryptographic key 116. Furthermore, the sensor 139 may be configured, for example, to detect security features of the banknote 100 in order to check its authenticity and validity. For example, a blockchain address is stored in the memory 132, which the terminal 130 uses as the recipient address for receiving payments.

For example, the terminal 130 communicates with the blockchain servers 140, 141 via a remote server 170. The server 170 comprises, for example, a memory 172, a processor 174 for executing program instructions 176 and a communication interface 178 for communicating via the network 160. For example, the server 170 provides the terminal 130 with the blockchain address to be used as the recipient address. For example, the server 170 forwards signed transaction releases received via the terminal 130 to the blockchain servers 140, 141. For example, the server 170 forwards transaction confirmations and/or entry confirmations received from the blockchain servers 140, 141 to the terminal 130.

The system further comprises one or more blockchain servers 140, 141. The blockchain servers 140, 141 are, for example, part of a blockchain network 154 or form blockchain nodes of a blockchain network 154. The blockchain servers 140, 141 and/or the blockchain network 154 are, for example, managed by a central bank issuing the banknote. If the central bank is a central bank to which several countries belong, the blockchain network 154 comprises, for example, one or more blockchain servers 140, 141 per country. For example, the blockchain servers 140, 141 and/or the blockchain network 154 are part of a central banking system 156. The blockchain server 140 comprises, for example, a memory, a processor 142 for executing program instructions 144 and a communication interface 152 for communicating over the network 160. The memory 146 stores, for example, a copy of the blockchain 148 and/or a register 150. The register 150 is, for example, a register which is updated at regular intervals and which comprises a current nominal value for each of the blockchain addresses of the blockchain 148. The current nominal values are calculated from the balances of the transactions stored in the blockchain 148 for the corresponding blockchain addresses. The register 150 provides, for example, a "fast blockchain" in which the pre-calculated balance results for the blockchain addresses are provided as current nominal values of the corresponding blockchain addresses. Using such a register can have the advantage that current nominal values can be determined more quickly, as they are already available and do not have to be calculated first. The register 150 can, for example, be managed by a virtual machine (VM) of the blockchain server 140.

The blockchain server 140 may be configured to register and/or block banknotes or blockchain addresses of banknotes in the blockchain 148 at the request of the central bank. The blockchain server 140 may be configured to provide, upon request, information about current nominal values of banknotes according to the transactions stored in the blockchain 148 using the blockchain addresses of the corresponding banknotes. For example, the blockchain server 140 uses the register 150 to provide corresponding information. The blockchain network 154 may, for example, comprise one or more further blockchain servers 141. The further blockchain servers 141 each comprise, for example, a memory 147, a processor 143 for executing program instructions 145 and a communication interface 153 for communication via the network 160. A copy of the blockchain 148 is stored in each of the memories 147, for example. The blockchain servers 141 are configured, for example, to register and/or block banknotes or blockchain addresses of banknotes in the blockchain 148 at the request of the central bank.

Instead of the terminal 130, a mobile portable communication device 180 or a desktop PC 190 can also be used for payment processing, for example for payment processing via the Internet. The mobile communication device 180 or the desktop PC 190 can, for example, serve as a local PoS. For example, the payment processing is carried out using the remote server 170. For example, the payment processing is carried out using a server 200 of a payment service provider or a financial service provider.

The mobile communication device 180, such as a smartphone, comprises, for example, a memory 182 and a processor 184 for executing program instructions 186. Further, the mobile communication device 180 comprises, for example, a communication interface 187 for communicating with the banknote 100 and a communication interface 188 for communicating via the network 160. For example, the mobile communication device 180 comprises a camera for detecting visual indication 107 of the banknote 100, such as the serial number 106 or the public cryptographic key 116 of the banknote 100. For example, the mobile communication device 180 is configured to forward a payment request, such as from the server 170 or the payment service server 200, to the banknote 100 and a signed transaction release from the banknote 100 to the server 170 or the payment service server 200. For example, the mobile communication device 180 is further configured to determine the blockchain address of the banknote 100, for example by using the camera 189, and to add the blockchain address as the source address of the payment to the payment request to the banknote 100. Furthermore, the mobile communication device 180 may be configured to determine the current nominal value of the banknote 100 according to the blockchain 148 directly or through a server such as the server 170 or the payment service server 200 and to display it to a user using a user interface 181. The user interface 181 comprises, for example, an input device and an output device for communication between the user and the mobile communication device 180. The input device comprises, for example, a keyboard. The output device comprises, for example, a display. For example, the input and output devices are combined in the form of a touch display.

The desktop PC 190 comprises, for example, a memory 192 and a processor 194 for executing program instructions 196. Furthermore, the desktop PC 190 comprises, for example, a communication interface 197 for communication with the banknote 100 and a communication interface 198 for communication via the network 160. For example, the desktop PC 190 comprises a sensor, such as a camera, for detecting visual indication 107 of the banknote 100, such as the serial number 106 or the public cryptographic key 116 of the banknote 100. For example, the desktop PC 190 is configured to forward a payment request, such as from the server 170 or the payment service server 200, to the banknote 100 and a transaction release signed by the banknote to the server 170 or the payment service server 200. For example, the desktop PC 190 is further configured, for example using the sensor 199, to determine the blockchain address of the banknote 100 and to add the blockchain address as the source address of the payment to the payment request to the banknote 100. Furthermore, the desktop PC 190 may be configured to determine the current nominal value of the banknote 100 according to the blockchain 148 directly or through a server such as the server 170 or the payment service server 200 and to display it to a user using a user interface 191. The user interface 191 comprises, for example, an input device and an output device for communication between the user and the desktop PC 190. The input device comprises, for example, a keyboard and/or mouse. The output device comprises, for example, a display. For example, the input and output devices are combined in the form of a touch display.

The server 200 of the payment service provider is configured, for example, to enable payment processing using the banknote 100 and a local device for communicating with the banknote 100, such as the mobile communication device 180 or the desktop PC 190. The payment service server 200 comprises, for example, a memory 202, a processor 204 for executing program instructions 206, and a communication interface 208 for communicating over the network 160. For example, the payment service server 200 provides the local device with transaction data of a transaction to be executed, such as a blockchain address to be used as a recipient address and/or details of the amount to be paid. For example, the payment service server 200 forwards signed transaction releases received via the local device to the blockchain servers 140, 141. For example, the payment service server 200 forwards transaction confirmations and/or entry confirmations received from the blockchain servers 140, 141 to the local device.

The system comprises, for example, a manufacturer computer system 210, which is used in the course of manufacturing the banknote 100. The manufacturer computer system 210 comprises, for example, a memory 212 and a processor 214 for executing program instructions 216. Further, the manufacturer computer system 210 comprises, for example, a communication interface 221 for communicating with the banknote 100. For example, the manufacturer computer system 210 reads the public cryptographic key 116 of the banknote 100 using the communication interface 217. For example, the manufacturer computer system 210 sends data to the banknote 100 for storage, such as the serial number 106 of the banknote 100, using the communication interface 217. Further, the manufacturer computer system 210 comprises, for example, a sensor 219 for testing the banknote 100. Using the sensor 219, for example, a quality control of the banknote 100 is performed. If the banknote 100 passes the quality control, for example, a manufacturing confirmation is sent from the manufacturer computer system 210 to the central bank using a communication interface 218 for communicating with a central bank computer system, such as the central bank computer system 220. The manufacturing confirmation comprises, for example, the serial number 106 and/or the public cryptographic key 116 of the banknote 100 for initializing the banknote 100 in the blockchain 148.

The system further comprises, for example, a central bank computer system 220 having a memory 222 and a processor 224 for executing program instructions 226. Further, the central bank computer system 220 comprises, for example, a communication interface 228 for communicating with the manufacturer computer system 210 and/or with the blockchain servers 140, 141, for example via the network 160. The central bank computer system 220 is configured, for example, to register and/or lock banknotes and/or blockchain addresses of banknotes in the blockchain 148. In other words, the central bank computer system 220 is configured, for example, to send an initialization request and/or a blocking request to initialize and/or block the banknote 100 to one of the blockchain servers 140, 141. To create the initialization request, the central bank computer system 220 uses, for example, data provided by the manufacturer computer system in the form of the manufacturing confirmation. Furthermore, the central bank computer system 220 may comprise, for example, a sensor for checking security features of a damaged banknote. If the check of the security features and the degree of damage to the banknote shows that it is a valid banknote, the central bank replaces the damaged banknote. For this purpose, the central bank computer system 220 determines, for example, the current nominal value of the damaged banknote using a corresponding request to one of the blockchain servers 140, 141, pays out the current nominal value and sends a blocking request to block the blockchain address of the damaged banknote to one of the blockchain servers 140, 141.

FIG. 12 shows a schematic flowchart of an exemplary method for manufacturing banknotes 100. In step 400, the central bank 220 sends an order for manufacturing banknotes 100 to a manufacturer 210, such as a printing company. The order specifies, for example, a range of serial numbers. The range of serial numbers specifies serial numbers to be used for the banknotes 100 to be manufactured. For example, the order also specifies initial nominal values for the banknotes 100 to be manufactured. For example, the order specifies a minimum nominal value and/or a variable additional nominal value portion. In step 402, the manufacturer 210 manufactures the banknotes 100 according to the received order. The manufactured banknotes 100 each comprise, for example, a security element with a processor. In step 404, the security elements of the banknotes 100 each generate a banknote-individual asymmetric key pair. A public cryptographic key of the asymmetric key pair is stored in a memory of the corresponding security element. The private cryptographic key of the asymmetric key pair is respectively stored in a protected memory area of the corresponding memory. In step 406, the manufacturer 210 reads the public cryptographic key from the memories of the banknotes 100, respectively. For example, the banknotes 100 each comprise a visual indication of one of the serial numbers from the predetermined range of serial numbers assigned to the respective banknote 100gg during the manufacturing process. For example, the visual indications of the serial numbers of the manufactured banknotes 100 are read. For example, the serial numbers of the banknotes 100 are additionally stored in the memories of the banknotes 100. For example, the manufacturer 210 additionally reads each of the serial numbers from the memories of the banknotes 100.

In step 408, for example, a visual indication of the read-out public cryptographic key and/or a blockchain address of the banknote derived from the public cryptographic key is added to the respective banknote 100, for example printed on it. In step 410, a manufacturing confirmation is sent to the central bank 220, which identifies the manufactured banknotes 100. For example, the manufacturing confirmation indicates the serial numbers of the manufactured banknotes 100. For example, the manufacturing confirmation indicates the public cryptographic keys and/or the blockchain addresses derived from the public cryptographic key of the manufactured banknotes 100. For example, the manufacturing confirmation indicates the initial nominal values of the manufactured banknotes 100. For example, the manufacturing confirmation indicates minimum nominal values and/or variable additional nominal value portions of the initial nominal values. In step 412, the blockchain addresses of the manufactured banknotes 100 are initialized by the central bank 220 in the blockchain 148. For example, the central bank 220 adds an initialization entry to the blockchain 148. For example, the initialization entry specifies the public cryptographic keys and/or the blockchain addresses derived from the public cryptographic key of the manufactured banknotes 100. For example, the initialization entry further specifies the serial numbers of the manufactured banknotes 100. For example, the initialization entry further indicates the initial nominal values of the banknotes 100. For example, the initialization entry further indicates the minimum nominal values of the banknotes 100. In step 414, the manufactured banknotes 100 are delivered and reach users 162. For example, the banknotes reach the users 162 as cash in the course of cash-based payment transactions.

FIG. 13 shows a schematic flowchart of an exemplary method for payment processing with a terminal of a PoS ("point of sale") 164. In step 420, the PoS 164 or the terminal receives a public cryptographic key of a blockchain address or a blockchain address which the PoS 164 uses as a payee for receiving payments via the blockchain 148. In step 422, the user 162 provides a banknote 100 for a cashless payment. In step 424, the PoS 164 reads a visual indication of a public cryptographic key of the banknote 100 or a blockchain address of the banknote 100 derived from the public cryptographic key. In step 426, the PoS 164 creates a payment request and sends the payment request to the banknote 100. For example, the payment request defines a transaction of an amount to be paid from a blockchain address of the banknote 100 to the blockchain address of the PoS 164 as a payee. Alternatively, the PoS 164 could also read the serial number of the banknote 100 and send a request to the blockchain 148 or a register 148, which queries the blockchain address assigned to the corresponding serial number. If the blockchain 148 or the register 150 comprises an entry that assigns a blockchain address of the banknote 100 to the serial number of the banknote 100, the PoS 164 receives as a response to the request, for example, the blockchain address of the banknote 100 or a public key of the banknote 100 from which the blockchain address can be derived.

In step 428, the banknote 100 creates a transaction release, signs the transaction release with the private cryptographic key of the banknote 100 and sends it to the PoS 164. The transaction release comprises, for example, the blockchain address of the banknote 100, the blockchain address of the payee, i.e. the PoS 164, and the amount to be paid. Furthermore, the signature comprises, for example, a timestamp. In step 430, the PoS 164 forwards the signed transaction release to the register 150. The register 150 is, for example, a register that is updated at regular intervals and comprises a current nominal value for each of the blockchain addresses of the blockchain 148. The current nominal values are calculated from the balances of the transactions stored in the blockchain 148 for the corresponding blockchain addresses. For example, the register 150 provides a "fast blockchain" in which the pre-calculated balance results for the blockchain addresses are provided as the current nominal values of the corresponding blockchain addresses. Using such a register can have the advantage that current nominal values can be determined more quickly, as they are already available and do not have to be calculated first. The register 150 can, for example, be managed by a virtual machine (VM) of a blockchain server or blockchain node of the blockchain network. For example, the PoS 164 may also send the signed transaction release to the blockchain 148 without using a register 150.

In step 432, the register 150 or the server/virtual machine on which the register 150 is managed checks the transaction authorized by the banknote 100. For example, the register 150 checks whether the current nominal value of the banknote 100 is sufficient to pay the amount to be paid using the blockchain 148. For example, the register 150 checks whether the current nominal value of the banknote 100 is greater than or equal to the amount to be paid. For example, the register 150 checks whether the current nominal value comprises an additional nominal value portion that is sufficient to pay the amount to be paid, i.e. that the guaranteed minimum nominal value remains after payment of the amount to be paid. Furthermore, the register 150 or the server/virtual machine on which the register 150 is managed checks, for example, the signature of the transaction release.

It also checks, for example, that an identical transaction, e.g. with an identical time stamp of the transaction release, has not already been entered into the blockchain. If the check is successful, the register 150 sends a transaction confirmation, which confirms a positive check of the signed transaction release, to the PoS 164. Furthermore, the register 150 or the server/virtual machine on which the register 150 is managed forwards the signed transaction release to the blockchain 148 for entry in step 434. Alternatively or additionally, the server on which the register 150 is managed may enter the transaction in response to a positive verification of the signed transaction release and forward the entry to other servers of a blockchain network. In step 436, upon receipt of the transaction confirmation in step 432, the PoS 164 confirms the payment to the user 164. For example, the payment confirmation in step 436 is made only on the condition that the amount to be paid is less than a threshold amount. If the amount to be paid is greater than or equal to the threshold value, it is also necessary to receive a confirmation of entry to confirm the payment, which confirms the actual entry of the transaction in the blockchain. In step 438, the PoS 164 receives a confirmation of entry from the blockchain 148 or a blockchain server managing the blockchain 148 after the transaction has been entered into the blockchain 148. If the amount to be paid is greater than or equal to the threshold value, the payment is not confirmed to the user 164 until step 440.

FIG. 14 shows a schematic flowchart of an exemplary method for determining a current nominal value of a banknote 100. In step 450, the user 162 provides the banknote 100 to a reading device, such as a mobile portable communication device 180, e.g., a smartphone. In step 452, the mobile communication device 180 reads a visual indication of a public cryptographic key of the banknote 100 or a blockchain address of the banknote 100 derived from the public cryptographic key. Alternatively, the communication device 180 could also read the serial number of the banknote 100. In step 454, the communication device 180 sends a request to the register 150 for the current nominal value assigned to the blockchain address of the banknote 100. Alternatively, such a request could also be sent to the blockchain or a server managing the blockchain. To identify the banknote 100 whose current nominal value is to be determined, the request comprises, for example, the public cryptographic key of the banknote 100, from which the blockchain address of the banknote 100 can be derived. For example, the request for identifying the banknote 100 comprises the blockchain address of the banknote 100. For example, the request comprises the serial number of the banknote 100 if the blockchain 148 or the register 150 comprises an entry that assigns a blockchain address of the banknote 100 to the serial number of the banknote 100. In step 456, the register 150 or the blockchain 148 or a server managing the register 150 or the blockchain 148 sends the current nominal value to the mobile communication device 180 in response to the request. In step 458, the mobile communication device 180 displays the current nominal value of the banknote 100 to the user 162.

FIG. 15 has been divided into two parts, i.e. FIGS. 15A and 15B, due to lack of space, which together form FIG. 15. FIG. 15 shows a schematic flowchart of an exemplary payment processing method using a mobile portable communication device 180. The mobile portable communication device 180 is, for example, a smartphone. For example, payment processing with the mobile portable communication device 180 is performed using a server 170. For example, the mobile portable communication device 180 serves as a PoS for a purchase over the Internet using the server 170. In step 460, the server 170 receives a public cryptographic key of a blockchain address or a blockchain address that the server 170 uses as a payee to receive payments via the blockchain 148. In step 462, the server 170 sends a payment request to the mobile communication device 180 to process a payment. For example, the server 170 is a service server and the payment is a payment for a service provided by the service server and utilized by the user 162. For example, the server 170 is a server of a financial service provider that processes a payment for the user 162. The payment request comprises, for example, an indication of the public cryptographic key or the blockchain address of the server 170 as the payee and an indication of the amount to be paid. In step 464, the user 162 provides a banknote 100 for a cashless payment. In step 466, the mobile communication device 180 reads a visual indication of a public cryptographic key of the banknote 100 or a blockchain address of the banknote 100 derived from the public cryptographic key. In step 468, the mobile communication device 180 supplements the payment request received in step 462 and sends the supplemented payment request to the banknote 100. For example, the mobile communication device 180 adds the blockchain address of the banknote 100 to the payment request. Alternatively, the mobile communication device 180 could also read the serial number of the banknote 100 and send a request to the blockchain 148 or a register 148 that queries the blockchain address assigned to the corresponding serial number. If the blockchain 148 or the register 150 comprises an entry that assigns a blockchain address of the banknote 100 to the serial number of the banknote 100, the mobile communication device 180 receives in response to the request, for example, the blockchain address of the banknote 100 or a public key of the banknote 100, from which the blockchain address can be derived.

In step 470, the banknote 100 creates a transaction release, signs the transaction release with the private cryptographic key of the banknote 100 and sends it to the mobile communication device 180. The transaction release comprises, for example, the blockchain address of the banknote 100, the blockchain address of the payee, i.e. the server 170, and the amount to be paid. Furthermore, the signature comprises, for example, a timestamp. In step 472, the mobile communication device 180 forwards the signed transaction release to the server 170, which forwards the signed transaction release to the register 150 in step 474. The register 150 is, for example, a register which is updated at regular intervals and which comprises a current nominal value for each of the blockchain addresses of the blockchain 148. The current nominal values are calculated from the balances of the transactions stored in the blockchain 148 for the corresponding blockchain addresses. For example, the register 150 provides a "fast blockchain" in which the pre-calculated balance results for the blockchain addresses are provided as the current nominal values of the corresponding blockchain addresses. However, for example, the server 170 may also send the signed transaction release to the blockchain 148 without using a register 150. In step 476, the register 150 or the server/virtual machine on which the register 150 is managed checks the transaction authorized by the banknote 100. For example, the register 150 checks whether the current nominal value of the banknote 100 is sufficient to pay the amount to be paid using the blockchain 148.

For example, the register 150 checks whether the current nominal value of the banknote 100 is greater than or equal to the amount to be paid. For example, the register 150 checks whether the current nominal value comprises an additional nominal value portion that is sufficient to pay the amount to be paid, i.e. that the guaranteed minimum nominal value remains after payment of the amount to be paid. Furthermore, the register 150 or the server/virtual machine on which the register 150 is managed checks, for example, the signature of the transaction release. It also checks, for example, that an identical transaction, e.g. with an identical time stamp of the transaction release, has not already been entered into the blockchain. If the check is successful, the register 150 sends a transaction confirmation, which confirms a positive check of the signed transaction release, to the server 170. Furthermore, the register 150 or the server/virtual machine on which the register 150 is managed forwards the signed transaction release to the blockchain 148 for entry in step 478. Alternatively or additionally, the server on which the register 150 is managed may enter the transaction in response to a positive verification of the signed transaction release and forward the entry to other servers of a blockchain network. In step 480, the server 170 forwards the transaction confirmation to the mobile communication device 180. In step 482, the mobile communication device 180 confirms the payment to the user 164. For example, the payment confirmation in step 482 is made only on the condition that the amount to be paid is less than a threshold value. If the amount to be paid is greater than or equal to the threshold value, confirmation of the payment also requires receipt of a confirmation of entry, which confirms the actual entry of the transaction into the blockchain. In step 484, the server 170 receives a confirmation of entry from the blockchain 148 or a blockchain server managing the blockchain 148 after the transaction has been entered into the blockchain 148. In step 486, the server 170 forwards the entry confirmation to the mobile communication device 180. If the amount to be paid is greater than or equal to the threshold value, the payment is only confirmed to the user 164 in step 488.

FIG. 16 shows a schematic flowchart of an exemplary method for replacing a banknote 100. In step 490, the user 162 provides a damaged banknote 100 to the central bank 220. In step 492, the central bank 220 checks the security features of the damaged banknote 100 to determine whether the damaged banknote 100 is a valid banknote 100 that has been damaged. Furthermore, the central bank 220 checks, for example, whether more than 50% of the present banknote 100 is undamaged. If the central bank 220's check determines that the damaged banknote is a valid banknote, the central bank 220 reads, in step 494, a visual indication of a public cryptographic key of the banknote 100 or a blockchain address of the banknote 100 derived from the public cryptographic key. Alternatively, the central bank 220 could also read the serial number of the banknote 100. In step 496, the central bank 220 sends a request to the register 150 for the current nominal value assigned to the blockchain address of the banknote 100. Alternatively, such a request could also be sent to the blockchain or a server managing the blockchain. To identify the banknote 100 whose current nominal value is to be determined, the request comprises, for example, the public cryptographic key of the banknote 100, from which the blockchain address of the banknote 100 can be derived. For example, the request for identifying the banknote 100 comprises the blockchain address of the banknote 100. For example, the request comprises the serial number of the banknote 100 if the blockchain 148 or the register 150 comprises an entry that assigns a blockchain address of the banknote 100 to the serial number of the banknote 100. In step 498, the register 150 or the blockchain 148 or a server managing the register 150 or the blockchain 148 sends the current nominal value to the central bank 220 in response to the request.

In step 500, the central bank 220 pays out the current nominal value of the damaged banknote 100. For example, paying out the current nominal value of the damaged banknote 100 comprises providing one or more banknotes as a replacement for the damaged banknote 100, the current nominal values of which correspond in total to the current nominal value of the damaged banknote 100. For example, the one or more banknotes as a replacement for the damaged banknote 100 are banknotes according to one of the embodiments described above. For example, paying out the current nominal value of the damaged banknote 100 comprises entering a transaction of an amount equal to the current nominal value from a blockchain address of the central bank 220 issuing the damaged banknote 100 to a blockchain address specified by an owner of the damaged banknote 100. For example, the specified blockchain address is assigned to another banknote of the owner, i.e., owner, of the damaged banknote 100, the owner of the damaged banknote 100 personally, or another institution selected by the owner of the damaged banknote 100. In step 502, the central bank 220 sends a blocking entry to the blockchain 148. Upon entering the blocking entry into the blockchain 148, the blockchain address of the damaged banknote 100 is blocked. As a result of the block, it is not possible, for example, to execute a transaction with the blockchain address of the damaged banknote 100 as the source address or to execute a transaction with the blockchain address of the damaged banknote 100 as the destination address, i.e. to enter it into the blockchain 148. For example, as a prerequisite for entering a transaction into the blockchain 148, the system checks whether there is a blocking entry for the source address or the destination address of the transaction. If the source address or destination address of the transaction is blocked, the entry is denied, for example. Otherwise, the entry is made, for example.

FIG. 17 shows a schematic flow chart of an exemplary method for using a banknote. The banknote comprises, for example, a security element with a processor and a memory. A banknote-individual private cryptographic key of an asymmetric key pair of the banknote is stored in a protected memory area of the memory. The asymmetric key pair is assigned to a banknote-individual blockchain address blockchain, which is managed by a central bank issuing the banknote. The processor is configured to execute a payment procedure with the banknote using the program instructions.

In block 600, the banknote receives a payment request for a payment in the form of a transaction of an amount to be paid from the blockchain address of the banknote to a blockchain address of a payee. The payment request specifies the amount to be paid and the blockchain address of the payee. In block 602, a transaction release is signed with the banknote's private cryptographic key. The transaction release comprises the blockchain address of the banknote, the blockchain address of the payee and the amount to be paid. The signature also comprises a timestamp. The signed transaction release is sent in block 604.

FIG. 18 shows a schematic flowchart of an exemplary method for manufacturing a banknote. In block 610, the banknote is manufactured. The banknote comprises a visual indication of a serial number of the banknote uniquely identifying the banknote from a predefined range of serial numbers and an initial nominal value of the banknote. The banknote further comprises a security element with a processor and a memory. In block 612, the banknote generates a banknote-individual asymmetric key pair with a private and a public cryptographic key. In block 614, the banknote stores the generated banknote-individual asymmetric key pair in the memory. The private cryptographic key is stored in a protected memory area of the memory. In block 616, the banknote outputs the generated public cryptographic key for initializing a banknote-individual blockchain address derived from the public cryptographic key by a central bank issuing the banknote in a blockchain. The initial nominal value is assigned to the blockchain address of the banknote during initialization.

FIG. 19 is a schematic flow chart of an exemplary procedure for payment processing with a terminal. The payment is made with a banknote, which comprises, for example, a visual indication of an identifier that uniquely identifies a blockchain address of the banknote. The banknote comprises a communication interface for communicating with the terminal and a security element with a processor and a memory. A banknote-individual private cryptographic key of an asymmetric key pair of the banknote is stored in a protected memory area of the memory. The asymmetric key pair is assigned to a banknote-individual blockchain address, which is managed by a central bank issuing the banknote. For example, the identifier of the banknote's blockchain address is also stored in the memory. The identifier is, for example, the serial number of the banknote, the public cryptographic key of the banknote, or the blockchain address of the banknote itself. The terminal comprises a processor, a memory and a communication interface for communicating with the banknote.

In block 620, the terminal detects the identifier of the blockchain address of the banknote, which uniquely identifies the blockchain address of the banknote. The detected identifier is, for example, the serial number of the banknote, the public cryptographic key of the banknote, or the blockchain address of the banknote itself. The detection may comprise an optical detection of a visual indication of the identifier with an optical sensor and/or a readout of the identifier stored in the memory via the communication interface of the banknote. In block 622, the terminal sends a blockchain request for the current nominal value of the blockchain address of the banknote, which is identified by the detected identifier. In block 624, the terminal receives the current nominal value of the blockchain address of the banknote. In block 626, the terminal checks whether the received current nominal value is greater than or equal to the amount to be paid. If the current nominal value is not greater than or equal to the amount to be paid, i.e. the check is unsuccessful, the procedure continues with block 628. The procedure is aborted in block 628. If the current nominal value is greater than or equal to the amount to be paid, i.e. the check is successful, the procedure continues with block 630. In block 630, the terminal sends a payment request to the banknote in the form of a transaction of an amount to be paid from the blockchain address of the banknote to a blockchain address of a payee. The payment request specifies the amount to be paid and the blockchain address of the payee. In block 632, the terminal receives a signed transaction release from the banknote. The transaction release is signed with a private cryptographic key of the banknote. The transaction release comprises the blockchain address of the banknote, the blockchain address of the payee and the amount to be paid. The signature also comprises a timestamp, for example. In block 634, the terminal forwards the signed transaction release of the banknote to a blockchain server of the blockchain for checking and entering the transaction into the blockchain. In block 636, the terminal receives a transaction confirmation upon successful verification of the signed transaction release.

FIG. 20 shows a schematic flowchart of an exemplary method for payment processing with a plurality of banknotes. A plurality of banknotes is received in block 640. In block 642, the identifiers of the blockchain addresses of the received banknotes are detected, i.e., for example, the serial numbers, public cryptographic keys and/or blockchain addresses of the corresponding banknotes. In block 644, a current nominal value is determined for each of the detected identifiers, which is stored under the corresponding blockchain address. A blockchain request for the corresponding nominal value is used for this purpose. In block 646, a set of banknotes is selected and retained from the plurality of received banknotes whose summed current nominal values result in an amount that is less than an amount to be paid. A remaining difference amount between the amount to be paid and the summed amount of the set of selected banknotes is less than a current nominal value of another banknote of the plurality of banknotes that is not included in the set of selected banknotes. In block 648, a payment request for payment of the difference amount is sent to the further banknote.

FIG. 21 shows a schematic flowchart of an exemplary method for determining a current nominal value. The banknote comprises a visual indication of an identifier that uniquely identifies the blockchain address of the banknote. The banknote comprises a communication interface for communicating with the terminal and a security element with a processor and a memory. A banknote-individual private cryptographic key of an asymmetric key pair of the banknote is stored in a protected memory area of the memory. The asymmetric key pair is assigned to a banknote-individual blockchain address blockchain, which is managed by a central bank issuing the banknote. The identifier is, for example, the serial number, the public cryptographic key and/or the blockchain address of the banknote.

The terminal comprises a processor, a memory and a communication interface for communicating with the banknote. In block 650, the terminal detects an identifier of the blockchain address of the banknote, which uniquely identifies the blockchain address of the banknote. The detected identifier is, for example, the serial number of the banknote, the public cryptographic key of the banknote, or the blockchain address of the banknote itself. In block 652, the terminal creates and sends a blockchain request for the current nominal value of the blockchain address of the banknote, which is identified by the detected identifier. In block 654, the terminal receives the current nominal value of the blockchain address of the banknote.

FIG. 22 shows a schematic flow chart of an exemplary method for replacing a banknote. The banknote comprises, for example, a visual indication of an identifier of a blockchain address of the banknote. The banknote comprises the visual indication of the identifier, for example, distributed several times across the banknote. Furthermore, the banknote further comprises a plurality of security features distributed across the banknote. The banknote comprises a security element with a processor and a memory with program instructions. A banknote-individual private cryptographic key of an asymmetric key pair of the banknote is stored in a protected memory area of the memory. The asymmetric key pair is assigned to a banknote-individual blockchain address in a blockchain that is managed by a central bank that issues the banknote.

The banknote is damaged. A degree of damage to the banknote is determined in block 660. Block 662 checks whether the banknote's degree of damage exceeds a predefined maximum permissible degree of damage. If the degree of damage of the banknote exceeds the predefined maximum permissible degree of damage, the procedure is aborted in block 664. If the degree of damage of the banknote does not exceed a predefined maximum permissible degree of damage, the method is continued in block 666 by detecting the identifier of the blockchain address of the damaged banknote, which uniquely identifies the blockchain address of the damaged banknote. The detected identifier is, for example, the serial number of the damaged banknote, the public cryptographic key of the damaged banknote, or the blockchain address of the damaged banknote itself. In block 668, a blocking of the blockchain address of the damaged banknote is initialized using the detected identifier. In block 670, a blockchain request is sent for the current nominal value of the blockchain address of the damaged banknote. In block 672, the current nominal value of the corresponding blockchain address is received and paid out in block 674. Block 668 can, for example, take place before block 670 or after block 672.

REFERENCE NUMERALS 100 banknote
102 security element
104 communication interface
106 serial number
107 visual indication
108 nominal value
110 security feature
112 user interface
116 public key
118 private key
120 memory
122 protected memory area
124 processor
128 program instructions
130 terminal
132 memory
134 processor
136 program instructions
137 communication interface
138 communication interface
139 sensor
140 blockchain server
141 blockchain server
142 processor
143 processor
144 program instructions
146 memory
147 memory
148 blockchain
150 register
152 communication interface
153 communication interface
154 blockchain network
156 central banking system
160 network
162 users
164 PoS
170 server
172 memory
174 processor
176 program instructions
178 communication interface
180 mobile portable communication device
181 user interface
182 memory
184 processor
186 program instructions
187 communication interface
188 communication interface
189 camera
190 desktop PC
191 user interface
192 memory
194 processor
196 program instructions
197 communication interface
198 communication interface
199 sensor
200 payment service server
202 memory
204 processor
206 program instructions
208 communication interface
210 manufacturer computer system
212 memory
214 processor
216 program instructions
217 communication interface
218 communication interface
219 sensor
220 central bank computer system
222 memory
224 processor
226 program instructions
228 communication interface
229 sensor
240 user computer system
242 memory
244 processor
246 program instructions
248 communication interface
250 communication interface
252 user interface
260 user computer system
262 memory
264 protected memory area
266 private key
268 public key
270 processor
272 program instructions
274 communication interface
276 communication interface
278 user interface

The invention claimed is:

1. Method for revoking a first asymmetric key pair of a first user computer system using a banknote,
wherein the first asymmetric key pair comprises a first private cryptographic key and a first public cryptographic key,
wherein the first asymmetric key pair is assigned to a first blockchain address in a blockchain,
wherein an assignment to the banknote is further registered in the blockchain for the first asymmetric key pair, which assignment is signed using a banknote-individual second private cryptographic key of a banknote-individual second asymmetric key pair of the banknote,
wherein the banknote comprises a security element with a processor and a memory with program instructions,
wherein an identification number uniquely identifying the banknote is stored in the memory, wherein the second private cryptographic key is stored in a protected memory area of the memory, wherein the second asymmetric key pair is assigned to a banknote-individual second blockchain address in the blockchain, the method comprising, using a second user computer system:

sending a revocation request to revoke the first asymmetric key pair from the second user computer system to the banknote, in response to the revocation request, receiving a first cryptogram signed using the second private cryptographic key from the banknote by the second user computer system, the first cryptogram comprising the identification number of the banknote and a revocation confirmation of the banknote, forwarding the signed first cryptogram by the second user computer system to a blockchain server of the blockchain for entering the revocation confirmation of the banknote identified by the identification number into the blockchain, the entry of the revocation confirmation revoking the first asymmetric key pair and, as a result of the revocation, blocking entries of transactions into the blockchain whose releases are based on a signature using the revoked first private cryptographic key.

2. Method according to claim 1, wherein the first blockchain address is the first public cryptographic key or a blockchain address derived from the first public cryptographic key.

3. Method according to claim 1, wherein the identification number is a serial number of the banknote or a number derived from the serial number of the banknote.

4. Method according to claim 1, wherein the entry of the revocation confirmation revokes all asymmetric key pairs for whose public cryptographic key an assignment to the banknote is registered in the blockchain at the time of the entry, which is signed using the banknote-individual second private cryptographic key, wherein, as a result of the revocations, entries of transactions in the blockchain whose releases are based on a signature using a private cryptographic key of one of the revoked asymmetric key pairs are blocked.

5. Method according to claim 1, wherein the entry of the revocation confirmation revokes, up to a predefined maximum number, all asymmetric key pairs for whose public cryptographic key an assignment to the banknote is registered in the blockchain at the time of the entry, which assignment is signed using the banknote-individual second private cryptographic key.

6. Method according to claim 5, wherein the revocation is performed up to the predefined maximum number of asymmetric key pairs in chronologically ascending order starting with the asymmetric key pair for whose public cryptographic key a chronologically earliest assignment to the banknote is registered in the blockchain and which is not revoked.

7. Method according to claim 5, wherein the revocation is performed up to the predefined maximum number of asymmetric key pairs in chronologically descending order starting with the asymmetric key pair for whose public cryptographic key a chronologically latest assignment is registered in the blockchain and which is not revoked.

8. Method according to claim 1, wherein the revocation confirmation comprises the first public cryptographic key identifying the revoked first asymmetric key pair.

9. Method according to claim 8, wherein the revocation request comprises the first public cryptographic key for identifying the first asymmetric key pair to be revoked by the banknote.

10. Method according to claim 8, wherein the first public cryptographic key is stored in the memory of the banknote.

11. Method according to claim 10, wherein an assignment of the first public cryptographic key to the first user computer system is stored in the memory of the banknote, wherein the assignment comprises an identifier of the first user computer system, wherein the revocation request comprises the identifier of the first user computer system for identifying the first asymmetric key pair to be revoked by the banknote.

12. Method according to claim 1, wherein the first user computer system and the second user computer system are the same user computer system.

13. Method according to claim 1, wherein the first user computer system and the second user computer system are different user computer systems.

14. Method according to claim 1, wherein the first user computer system is a first mobile portable device.

15. Method according to claim 1, wherein the second user computer system is a second mobile portable device.

16. Method according to claim 1, wherein the blockchain is a blockchain managed by a central bank issuing the banknote.

17. Method according to claim 1, wherein an amount of money assigned to the first blockchain address at the time of revocation of the first asymmetric key pair is transferred to the second blockchain address of the banknote.

18. Method according to claim 1, the method further comprising manufacturing the banknote, wherein the manufacturing comprises:

receiving the identification number by the banknote, storing the identification number in the memory of the banknote, generating the second asymmetric key pair by the security element of the banknote, storing the second private cryptographic key in the protected memory area of the memory of the banknote, storing the second public cryptographic key in the memory of the banknote, generating a registration request signed using the second private cryptographic key by the banknote, the registration request comprising the identification number and the second public cryptographic key of the banknote, in response to receiving the identification number, sending the registration request to register the identification number and the second public cryptographic key in the blockchain by a blockchain server.

19. Method according to claim 18, wherein a manufacturer computer system of a manufacturer of the banknote sends the identification number to the banknote and receives the registration request in response to sending the identification number, wherein the manufacturer computer system comprises a processor and a memory with program instructions, wherein a third private cryptographic key of a third asymmetric key pair assigned to a third blockchain address of the manufacturer in a blockchain is stored in a protected memory area of the memory, the method further comprising:

signing the registration request using the third private cryptographic key by the manufacturer computer system, forwarding the registration request signed by the manufacturer computer system to a blockchain server for registering the identification number and the second public cryptographic key in the blockchain.

20. Method according to claim 1, wherein the method further comprises registering the assignment of the first asymmetric key pair to the banknote in the blockchain, wherein the registering comprises:
generating the first asymmetric key pair by the first user computer system,
storing the first private cryptographic key in a protected memory area of a memory of the first user computer system,
storing the first public cryptographic key in the memory of the first user computer system,
sending a signature request for signing the first public cryptographic key to the banknote, wherein the signature request comprises the first public cryptographic key,
in response to the signature request, receiving a second cryptogram with the signed first public cryptographic key and with the identification number of the banknote, wherein the first public cryptographic key is signed with the second private cryptographic key of the banknote,
forwarding the second cryptogram to a blockchain server of the blockchain for registration, the registration of the second cryptogram registering the assignment of the first asymmetric key pair to the identification number of the banknote in the blockchain and, as a result of the registration,
enabling entries of transactions in the blockchain, whose releases are based on a signature using the registered first private cryptographic key.

21. Method according to claim 1, wherein a payment of an amount using the first private cryptographic key of the first user computer system comprises:
creating a transaction release by the first user computer system for a transaction of the amount to be paid from the first blockchain address to a fourth blockchain address of a payee, wherein the transaction release comprises the first blockchain address to which the first private cryptographic key is assigned, the fourth blockchain address of the payee, and the amount to be paid,
signing the transaction release with the first private cryptographic key of the first user computer system,
sending the signed transaction release to a blockchain server of the blockchain for entering the transaction into the blockchain, wherein by entering the transaction, the amount to be paid is assigned to the fourth blockchain address of the payee.

22. User computer system for revoking a first asymmetric key pair of another user computer system using a banknote,
wherein the first asymmetric key pair comprises a first private cryptographic key and a first public cryptographic key,
wherein the first asymmetric key pair is assigned to a first blockchain address in a blockchain,
wherein the user computer system comprises a processor and a memory with program instructions,
wherein for the first asymmetric key pair an assignment to the banknote is further registered in the blockchain, which is signed using a banknote-individual second private cryptographic key of a banknote-individual second asymmetric key pair of the banknote,
wherein the banknote comprises a security element with a processor and a memory with program instructions,
wherein an identification number uniquely identifying the banknote is stored in the memory,
wherein the second private cryptographic key is stored in a protected memory area of the memory,
wherein the second asymmetric key pair is assigned to a banknote-individual second blockchain address in the blockchain,
wherein execution of the program instructions of the user computer system by the processor causes the processor to control the user computer system to revoke the first asymmetric key pair, wherein the revoking comprises:
sending a revocation request to revoke the first asymmetric key pair from the user computer system to the banknote,
in response to the revocation request, receiving a cryptogram signed using the second private cryptographic key from the banknote by the user computer system, the cryptogram comprising the identification number of the banknote and a revocation confirmation of the banknote,
forwarding the signed cryptogram by the user computer system to a blockchain server of the blockchain for entering the revocation confirmation of the banknote identified by the identification number into the blockchain, the entry of the revocation confirmation revoking the first asymmetric key pair and, as a result of the revocation,
blocking entries of transactions into the blockchain whose releases are based on a signature using the revoked first private cryptographic key.

23. Banknote for revoking a first asymmetric key pair of a first user computer system using a second user computer system, the first asymmetric key pair comprising a first private cryptographic key and a first public cryptographic key, wherein the first asymmetric key pair is assigned to a first blockchain address in a blockchain,
wherein an assignment to the banknote is further registered in the blockchain for the first asymmetric key pair, which assignment is signed using a banknote-individual second private cryptographic key of a banknote-individual second asymmetric key pair of the banknote,
wherein the banknote comprises a security element with a processor and a memory with program instructions,
wherein an identification number uniquely identifying the banknote is stored in the memory,
wherein the second private cryptographic key is stored in a protected memory area of the memory,
wherein the second asymmetric key pair is assigned to a banknote-individual second blockchain address in the blockchain,
wherein execution of the program instructions of the banknote by the processor causes the processor to control the banknote to revoke the first asymmetric key pair,
wherein revoking comprises:
receiving, by the banknote, a revocation request to revoke the first asymmetric key pair from the second user computer system,
generating a cryptogram signed using the second private cryptographic key from the banknote by the banknote, the cryptogram comprising the identification number of the banknote and a revocation confirmation of the banknote,
in response to the revocation request, sending the signed cryptogram from the banknote to the second user computer system for forwarding to a blockchain server of the blockchain for entering the revocation confirmation of the banknote identified by the identification number into the blockchain, the entry of the revocation confirmation revoking the first asymmetric key pair and, as a result of the revocation, blocking entries of transactions into the blockchain whose releases are based on a signature using the revoked first private cryptographic key.

\* \* \* \* \*